United States Patent [19]
Mizutani et al.

[11] Patent Number: 6,013,724
[45] Date of Patent: Jan. 11, 2000

[54] RAINDROP FOULING-RESISTANT PAINT FILM, COATING COMPOSITION, FILM-FORMING METHOD, AND COATED ARTICLE

[75] Inventors: Keita Mizutani; Yoichi Tozaki, both of Suita; Toshihiro Okai, Katano; Hozumi Endou; Takeshi Sawai, both of Kitakyusyu; Nobuyuki Matsuzoe, Kawasaki, all of Japan

[73] Assignee: Nippon Paint Co., Ltd., Osaka, Japan

[21] Appl. No.: 09/035,332

[22] Filed: Mar. 5, 1998

[30] Foreign Application Priority Data

| Mar. 5, 1997 | [JP] | Japan | 9-069070 |
| Oct. 21, 1997 | [JP] | Japan | 9-307914 |
| Dec. 24, 1997 | [JP] | Japan | 9-367347 |

[51] Int. Cl.⁷ ............................................. C08L 83/00
[52] U.S. Cl. ................ 524/588; 106/15.05; 523/212; 524/448; 524/837; 524/449
[58] Field of Search ...................... 524/588, 837, 524/448, 449; 523/212; 106/15.05

[56] References Cited

U.S. PATENT DOCUMENTS

| 4,172,187 | 10/1979 | Fabel .............................. 525/61 |
| 5,824,736 | 10/1998 | Kobayashi et al. .............. 528/588 |
| 5,834,584 | 11/1998 | Itani et al. ..................... 528/588 |
| 5,854,336 | 12/1998 | Diuone, Jr. et al. ............ 528/588 |

FOREIGN PATENT DOCUMENTS

| 0 730 015 A1 | 9/1996 | European Pat. Off. . |
| 0 757 079 A1 | 2/1997 | European Pat. Off. . |

OTHER PUBLICATIONS

Patent Abstracts of Japan, vol. 018, No. 462 (C–1243), Aug. 29, 1994 and JP 06 145453 A, May 24, 1994.

*Primary Examiner*—Morton Foelak
*Attorney, Agent, or Firm*—Pollock, Vande Sande & Amernick

[57] ABSTRACT

The present invention relates to a paint film embodying a new parameter representing the resistance to raindrop fouling and having very satisfactory fouling resistance, particularly resistance to raindrop fouling, even ultra-low foulability, as well as high water resistance, acid resistance, alkali resistance, and crack resistance; a coating composition capable of providing said paint film; a method for forming a satisfactory paint film using said coating composition; and an article coated with said paint film. A coating composition comprising (I) a tetramethoxysilane partial hydrolyzed condensate and at least one member selected from (A) a film-forming resin and (B) an inorganic binder containing alkoxysilyl as a reactive curing group and having a water dynamic reverse tension (Tr) of not less than 55 dyn/cm; and an antifouling paint film containing the coating composition is provided.

44 Claims, 12 Drawing Sheets

No. 1: Polyfluorovinilidene-acrylic mixed resin type paint
No. 2: Acrylic-silicon type resin paint
No. 3: No. 1 + dry-process type silica
No. 4: No. 1 + wet-process type silica
No. 5: No. 1 + wet-process hydrophobic silica
No. 6: No. 1 + dry-process hydrophobic silica
No. 7: No. 1 + organosilicon compound
No. 8: No. 1 + sodium sulfosuccinate No. 9: Polyfluorovinilidene-acrylic mixed resin type paint
No. 10: 1% Alkoxysilyl-containing polymer
No. 11: 2% Alkoxysilyl-containing polymer
No. 12: 4% Alkoxysilyl-containing polymer
No. 13: 6% Alkoxysilyl-containing polymer
No. 14: 8% Alkoxysilyl-containing polymer
No. 15: 10% Alkoxysilyl-containing polymer

RAINDROP FOULING-RESISTANT PAINT FILM, COATING COMPOSITION, FILM-FORMING METHOD, AND COATED ARTICLE

TECHNICAL FIELD

The present invention relates to an raindrop fouling-resistant paint film; a coating composition capable of providing the same paint film; a coating composition capable of providing a paint film which not only is resistant to fouling by raindrops but also has high hardness, high strength, and resistant to scratch; a method for forming a paint film from these coating compositions; and a coated article.

PRIOR ART

Various architectures, signboards, guard fences and certain machines which are to be installed or used outdoors are generally coated with a decorative and/or protective paint film. Such a paint film should of course have various functional characteristics for withstanding rugged outdoor conditions, such as weatherability, impact resistance, acid resistance, water resistance, etc. but, at the same time, is required to be fouling-resistant from aesthetic points of view. Furthermore, the demand exists today for the so-called "ultra-low foulability", i.e. the resistance to raindrops and other outdoor foulants over a long period of time.

The term "fouling-resistant" as used in this specification means the resistance of a paint film to many kinds of fouling inclusive of solvent-based marker fouling, carbon fouling, oil fouling, food fouling, raindrop fouling, etc. Resistance to raindrop falling, in particular, is one of the most important qualities required of paint films on outdoor structures. Raindrop fouling occurs as the rainwater impinging upon the surface of a coated architecture erected in a vertical or inclined position forms waterdrops containing various foulants, leaving deposits of the foulants as they tumble down the coated surface. It is also known as rain-flow fouling.

Generally, outdoor architectures and signboards are seldom cleaned; therefore, the paint films on those architectures must be persistently resistant to raindrop fouling over years. Moreover, since many precipitations these days involve the acid rain, resistance to rainwater originating from acid rain fouling is an important requirement.

Many proposals have been made in recent years for protection against raindrop fouling. Takayanagi et al. (Synopsis of the Lectures at the 1995 Congress of Japanese Society of Architectural Finishing, p.207–210) reported that raindrop stains on the exterior wall of a building can be expected to be self-shedding with the aid of rainwater when the particular exterior wall is hydrophilic.

As paints for exterior finishing of buildings and the like, paints each comprising a highly weather- and heat-resistant silicone resin (polysiloxane) and an inorganic binder such as an organosiliced-condensation product have sometimes been employed in view of their capability to yield films having such functional qualities as weather resistance, impact resistance, acid resistance, and water resistance. Generally, organosilicone resins and organosiliced-condensation products have SiOR groups as reactive curing groups, and an integral paint film is formed as those reactive curing groups undergo hydrolysis-condensation reaction in the presence of a catalyst such as an acid, a base, or a metal chelate compound to give Si—O—Si bonds.

As a paint containing an organopolysiloxane polymer as the binder component, Japanese Kokai Publication Sho-64-1769 discloses a coating composition comprising an organopolysiloxane resin, a zirconium compound, and a silyl-containing vinyl resin. According to this technology, the zirconium compound catalyzes the crosslinking reaction between the organopolysiloxane resin and the silyl-containing vinyl resin to thereby yield a hardened paint film and this film features good chemical resistance, acceptable surface gloss, and insures a uniform, smooth coated surface. However, because of the low density of crosslinks formed, the film is inadequate in hardness as well as in adhesion to the substrate.

As a paint containing a hydrolytic condensation product of methyltrimethoxysilane as the binder component, Japanese Kokai Publication Sho-51-2736 discloses a coating system in which methyltrimethoxysilane and tetraethoxysilane undergo hydrolysis-condensation to provide the necessary binder. This technology provides a water repellent film because of the existence of Si—$CH_3$ groups.

As a paint containing a hydrolytic condensation product of methyltrimethoxysilane as the binder component and an alkoxysilyl-containing acrylic polymer, Japanese Kokai Publication Hei-4-117473 discloses a coating composition which comprises methyltrimethoxysilane, an alkoxysilyl-containing acrylic resin, an aluminum compound, and tetramethylsilane. According to this technology, the aluminum compound catalyzes the hydrolysis-condensation reaction of SiOR groups in the composition to give a cured paint film. This film has good surface gloss, hardness, adhesion, alkali resistance, acid resistance, water resistance, and weather resistance. Moreover, the technology allows a thick coat to be formed.

As a paint containing a hydrolysis-condensation product of methyltrimethoxysilane as the binder compound in combination with an oxide such as silica sol or alumina sol, Japanese Patent Publication Sho-53-5042 discloses a coating composition available upon addition of a pigment to a condensation reaction product of methyltrimethoxysilane, water-based colloidal silica, and an organic acid. According to this technology, the hydrolytic condensation of methyltrimethoxysilane itself and the SiOH groups on the surface of colloidal silica take part in the curing reaction. However, because a large amount of water exists in its formulation, the paint has a poor pot life requiring use within 24 hours and because of the low degree of condensation of methyltrimethoxysilane, the resulting film, if formed in a thickness of more than 3 $\mu$m, tends to develop cracks.

Japanese Kokai Publication Sho-61-268770 discloses an alumina series paint comprising colloidal alumina and methyltrimethoxysilane. According to this technology, alumina sol is included in the formulation to cause the coat surface electrostatically charged positively so as to prevent adhesion of airborn dust, dirt, and other foulants under dry conditions.

Japanese Kokai Publication Sho-63-46272 discloses a colloidal alumina-containing paint containing a methyltrimethoxysilane condensate having a molecular weight of 3000–50000. Since this technology employs an organopolysiloxane of high molecular weight, the percent reduction in volume at condensation is low so that the film is not easily cracked.

The above-mentioned paints containing a silicone resin or an organosiliced-condensate are all capable of forming coats more or less satisfactory in durability, heat resistance, wear resistance, chemical resistance, and weather resistance but invariably fail to provide a sufficiently hydrophilic coated surface. Thus, the paint films provided by the prior art technologies are not satisfactory in raindrop fouling resistance. For example, any paint containing an organopolysiloxane polymer as the binder component does not provide a hydrophilic surface and, hence, is unable to insure the necessary resistance to raindrop fouling. Any paint using a hydrolytic condensation product of methyltrimethoxysilane as the binder component produces a water-repellent surface so that the rainwater stains once formed cannot be flushed off with water, thus being inadequate in the resistance to raindrop fouling.

The paint containing a hydrolytic condensation product of methyltrimethoxysilane as the binder component in combination with an alkoxysilyl-containing acrylic polymer has the disadvantage that since most of the SiOR groups capable of being hydrolyzed to hydrophilic SiOH groups in the composition are consumed in the curing reaction, the film surface cannot be rendered hydrophilic so that no sufficient resistance to raindrop fouling develops.

The paint containing a methyltrimethoxysilane hydrolyzed condensate as the binder component in combination with an oxide such as silica sol or alumina sol may provide a hydrophilic surface by insuring that SiOH groups will remain on the surface during formation of the film. However, in order that this may be done, the degree of condensation cannot be increased so that the film-forming property of the composition is sacrificed to increase the risk for cracking. Conversely if the baking temperature is increased to improve the film-forming property, the number of SiOH groups available on the surface is decreased to adversely affect wettability with water, with the result that no satisfactory resistance to raindrop fouling can be expected. The paint containing alumina sol yields a film having a basic surface which, rather, has an affinity for acidic foulants, thus detracting from the resistance to raindrop fouling.

On the other hand, antifouling paints containing an organic binder have also been proposed. As such a paint, Japanese Kokai Publication Hei-1-141952 discloses a thermosetting resin coating composition comprising a hydroxyl-containing resin and an alkoxysilyl (hereinafter referred to briefly as SiOR)-containing copolymer of the following general formula

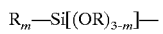

wherein m represents 0, 1, or 2.

Japanese Kokai Publication Hei-2-75649 discloses a thermosetting resin coating composition comprising a hydroxyl-containing fluorine series copolymer, a hydrolyzable silyl-containing vinyl polymer, and a curing catalyst.

According to those technologies, the hardening of an organic binder and the hydrolysis-condensation reaction of SiOR groups yielding Si—O—Si or Si—O—C bonds join forces to provide a cured film, while the residual SiOR groups in the film are gradually hydrolyzed during exposure to weather or aging to form hydrophilic SiOH groups to thereby enhance the surface hydrophilicity of the paint film, thus allowing the foulants deposited on the surface to be flushed away by rainwater and contributing to the raindrop fouling resistance of the coat.

However, in those technologies, heating the paint film for enhancing its hardness causes the SiOR groups to take part in the curing reaction, leaving a relatively few SiOR groups on the film surface, so that the quantity of hydrophilic SiOH groups generated upon hydrolysis is insufficient, with the result that the hydrophilicity of the film surface cannot be maintained over many months of exposure and, hence, no satisfactory raindrop fouling resistance can be implemented.

Conversely, if an attempt is made to leave a sufficient number of SiOR groups for retaining a sufficient surface hydrophilicity, the necessary film hardness cannot be obtained and by the action of acid rain or the like, a hydrolytic condensation of SiOR groups takes place on or in the paint film, with the consequent time-dependent hardening of the paint film causes an increased incidence of cracking and decreases in acid and alkali resistance.

Therefore, the demand exists for development of a paint composition capable of producing a paint film having raindrop fouling resistance in addition to the favorable inherent characteristics of both an inorganic binder-containing paint and an organic binder-containing paint. To meet this demand, several coating compositions each containing a hydrophilic component such as an alkoxysilane condensate have been proposed. Japanese Kokai Publication Hei-6-145453 discloses a hydrophilic curable coating composition comprising an alkoxysilyl-containing acrylic copolymer, a tetralkyl silicate and/or a condensation product thereof, and a curing catalyst. WO 94/06879 discloses a coating composition comprising an organosilicate and/or a condensation product thereof and capable of yielding a coated surface with a water contact angle of not larger than 70° C. after an acid treatment.

Japanese Kokai Publication Hei-7-286126 discloses a binder for inorganic/organic composite coating system which comprises a hydrolyzate of a fluorine-containing copolymer having hydrolyzable silyl groups and a siloxane compound and/or a hydrolyzate of an acrylic copolymer having hydrolyzable silyl groups. Japanese Kokai Publication Hei-7-68217 discloses a liquid formulation comprising an alkoxysilane hydrolyzate and a polyester resin.

According to those technologies, a cured coat is formed as Si—O—Si or Si—O—C bonds are generated by the hydrolytic condensation of SiOR groups and urethane bonds are formed by the blocked isocyanate component, while SiOR groups in the partial hydrolyzed condensate of an alkoxysilane are hydrolyzed, by acid treatment or outdoor exposure, to hydrophilic SiOH groups to thereby increase the hydrophilicity of the coat surface. As a result, the foulants deposited on the coat are flushed away by rainwater, thus producing the objective raindrop fouling resistance.

However, those technologies are disadvantageous in that the hydrolysis-condensation reaction of residual SiOR groups in the film after curing causes cracking of the coat and/or it takes time for the alkoxysilane partial hydrolyzed condensate to express its hydrophilic effect. This is because whereas the terminal SiOR groups of the alkoxysilane partial hydrolyzed condensate are easily hydrolyzed, the remaining SiOR groups are not easily hydrolyzed. Therefore, an acid treatment is necessary for accelerating the expression of the hydrophilic property of the surface. If this acid treatment is not thorough, the necessary hydrolysis does not proceed early during exposure so that the degree of surface hydrophilicity is insufficient until the hydrolysis reaction has progressed to a sufficient effect, with the result that the deposited fouling matter is firmly stuck to the surface during the intervening period.

Furthermore, the partial hydrolyzed condensate of an alkoxysilane has only a low degree of polymerization and the number of SiOR groups available from this partial hydrolyzed condensate is about 2 at most per molecule. Therefore, in order that sufficient surface hydrophilicity may be expressed in an initial phase of exposure to weather, the alkoxysilane partial hydrolyzed condensate must be added in a substantial proportion but such a practice would increase the incidence of cracking and detract from the stability of the coating composition. Moreover, a low degree of polymerization means a low molecular weight and, therefore, in a baked-on enamel system, a substantial portion of the alkoxysilane partial hydrolyzed condensate is lost through vaporization, thus resulting in poor raindrop fouling resistance.

Meanwhile, in such applications as the inner lining of a speedway tunnel, roadside facilities such as the guard rail, fence, snow-slide systems, etc., architectural materials such as the siding of buildings and the screen panel for a mansion room, it is inevitable that hydrophobic carbon particles, dirt, and dust are deposited on their surfaces and brush cleaning is necessary for removal of the deposits. However, such forceful cleaning involving rubbing actions tends to scratch and injure the coat. Therefore, antifouling coats in such applications are required to have sufficient surface hardness and scratch resistance as additional characteristics.

In districts frequented by heavy snowfalls, the coatings to be applied to roof shingles and other materials are required to have snow-shedding properties. However, as it is true of rain, snow frequently contains not only air-born foulants but also comparatively large dust particles and even stones which injure the surface of the roofing tiles in the event of sliding of the deposited snow and, therefore, not only snow slidability but also resistance to such injuries is additionally required.

However, it is difficult to concurrently satisfy the antifouling requirement, e.g. resistance to raindrop fouling, and the hardness and other performance requirements. Thus, it is possible to satisfy only a few of those antifouling and other performance requirements by thoughtful designing of a resin formulation but it is difficult to satisfy all the above-mentioned requirements. For example, the ordinary hydrophobic contamination caused by fast-drying oil-based ink, for instance, can be well controlled by incorporating a parting agent, e.g. a silicone or fluororesin additive, in the resin formulation but such a practice does not assist in meeting the raindrop fouling resistance, hardness, and other requirements.

On the other hand, for enhancing the hardness and other physical strength of the coat, addition of an aggregate material such as inorganic aggregates and organic aggregates, e.g. resin granules, has been proposed. However, addition of any such aggregate material to the resin results in the settling and segregation problem, thus detracting markedly from the shelf-life of the product paint and causing a failure to provide a homogeneous coat. Therefore, the demand exists for development of a coating composition capable of producing a coat with improved resistance to raindrop fouling and free from the various drawbacks mentioned above.

Meanwhile, it is generally thought that a paint film expressing a good resistance to raindrop fouling has a small contact angle with water. According to WO 94/06879 referred to hereinbefore, for instance, a coat with a contact angle, that is to say a static contact angle, of not over 70 degrees with water may show satisfactory resistance to raindrop fouling. Seno et al. (Synopsis of the Lectures at the 1995 Congress of Japanese Society for Architectural Finishing, pp. 211–214) who compared a conventional fluororesin series enamel with an antifouling version thereof, reported that the decease in the static contact angle of water with the paint film was consonant with the decrease in the degree of raindrop fouling. They even introduced the concepts of dynamic forward contact angle and dynamic reverse contact angle for a waterdrop deposited on the paint film.

Actually, however, there are paint films showing satisfactory resistance to raindrop fouling even though their static contact angles with water are large. For example, when a silicon-containing compound is included in a polyvinylidene fluoride series paint formulation, the coat surface is roughened to the extent of shifting to the water repellent grade on account of an increased contact angle with water but the resistance to raindrop fouling is rather improved. This is supposedly because as water is pooled in the small recesses of the coat surface, a film of water is formed so that raindrops containing various foulants flow rapidly down the water film. Moreover, when an alkoxysilyl-containing polymer is included in a polyvinylidene fluoride enamel formulation and the resulting enamel is applied, the static contact angle of the coat with water is little changed from the case in which the polymer is not added but the surface of the coat is efficiently wetted so that a satisfactory resistance to raindrop fouling is obtained.

The foregoing is apparent from FIG. 4 and FIG. 5 which were constructed by measuring the static water contact angles of the conventional coats inclusive of the above-mentioned coats, evaluating raindrop fouling resistance of the coats after 2 months of exposure to weather, and analyzing the possible relation. It can be seen from FIG. 4 that there is no correlation between the static contact angle of a coat with water and the resistance to raindrop fouling of the coat but rather there is a large variation. Referring to FIG. 5, it is clear that although the static contact angle is substantially unchanged regardless of the amount of the alkoxysilyl-containing polymer added, the resistance to raindrop fouling is improved with an increasing amount of the polymer, thus endorsing the above proposition that the decrease in static contact angle is not necessarily consonant with the decrease in the resistance to raindrop fouling.

Those phenomena can be attributed to the fact that because the static water contact angle is a mere parameter representing the ease of spread of waterdrops on a horizontal surface or the ease of spread of waterdrops in an early phase of wetting of a vertical or inclined surface, the resistance to the raindrop fouling which occurs as the rainwater impinging on a vertical or inclined surface, e.g. a wall surface or a roof surface, falls down the surface cannot be accurately evaluated by means of said contact angle alone. Thus, the static contact angle is not necessarily be correlated with the resistance to raindrop fouling and in order that the raindrop fouling resistance of a coat may be accurately evaluated, we must have a parameter representing the wettability of a surface by waterdrops falling down a vertical or inclined surface.

As a parameter relevant to the state in which waterdrops tumble down a vertical or inclined surface, the contact angle of a moving waterdrop at its front (forward) end or at its rear (reverse) end may for example be contemplated. The above report of Seno et al. suggests that when the dynamic forward contact angle of water is small, rain water will efficiently flush away the dust and other foulants deposited on a surface. However, such removal of dust cannot be an exclusive criterion of the resistance to raindrop fouling. Moreover, although the above report refers to the dynamic reverse contact angle of water, Seno et al. mention it merely as a parameter representing the morphological change of a waterdrop when the dynamic forward contact angle of water is small. This dynamic reverse contact angle is the contact angle of a backwardly urged waterdrop on an inclined coated surface and, as such, varies with different angles of inclination of the surface and it is not easy to evaluate the resistance to raindrop fouling of a coat by means of such parameter. In other wards, the dynamic reverse contact angle is not a pertinent parameter for discussing the relationship to the resistance to raindrop fouling. In the report of Seno et al., the relationship to the resistance to raindrop fouling is discussed exclusively with reference to the aspect of forward movement of a waterdrop and they do not present a parameter by which the wetting effect of waterdrops falling down a surface may be accurately estimated.

OBJECTS OF THE INVENTION

In view of the above state of the art, the present invention has for its object to provide a paint film embodying a new parameter representing the resistance to raindrop fouling and having very satisfactory fouling resistance, particularly resistance to raindrop fouling, even ultra-low foulability, as well as high water resistance, acid resistance, alkali resistance, and crack resistance, thus overcoming the above-mentioned disadvantages of the prior art, a coating composition capable of providing said paint film, a method for forming a satisfactory paint film using said coating composition, and an article coated with said paint film.

SUMMARY OF THE INVENTION

The present invention relates to an raindrop fouling-resistant paint film comprising
(I) a tetramethoxysilane partial hydrolyzed condensate available upon partial hydrolysis at a hydrolysis degree of less than 100% and condensation of tetramethoxysilane, which has a silanol (SiOH) group/methoxysilyl (SiOMe) group molar ratio of SiOH/SiOMe=not greater than $\frac{1}{10}$, a dimer through octamer content of 0–30 weight %, and a weight average molecular weight of 1500–5000 and
  (A) at least one film-forming resin selected from the group consisting of thermoplastic resins, thermosetting resins, and room-temperature setting resins and/or
  (B) at least one inorganic binder containing alkoxysilyl as a reactive curing group as selected from the group consisting of alkoxysilane compounds, partial hydrolyzed condensates of alkoxysilane compounds, and siloxane polymers; and
having a water dynamic reverse tension (Tr) of not less than 55 dyn/cm.

The present invention further provides a coating composition comprising
(I) a tetramethoxysilane partial hydrolyzed condensate available upon partial hydrolysis at a hydrolysis degree of less than 100% and condensation of tetramethoxysilane and having a silanol (SiOH) group/methoxysilyl (SiOMe) group molar ratio of (SiOH)/(SiOMe)=not more than $\frac{1}{10}$, a dimer through octamer content of 0–30 weight %, and a weight average molecular weight of 1500–5000, and
  (A) at least one film-forming resin selected from the group consisting of thermoplastic resins, thermosetting resins, and room-temperature setting resins, and/or
  (B) an inorganic binder component containing alkoxysilyl as a reactive curing group which comprises at least one member selected from the group consisting of alkoxysilane compounds, partial hydrolyzed condensate of said alkoxysilane compounds, and siloxane polymers; and
the final paint film having a water dynamic reverse tension (Tr) being not less than 55 dyn/cm.

In another aspect, the present invention provides a method for forming a fouling-resistant paint film, which comprises applying a primer to a metallic substrate and then applying the above coating composition of the invention.

In a further aspect, the present invention provides a fouling-resistant coated article as coated with a fouling-resistant paint film formed by the above film-forming method according to the present invention.

DETAILED DISCLOSURE OF THE INVENTION

Figure 1:
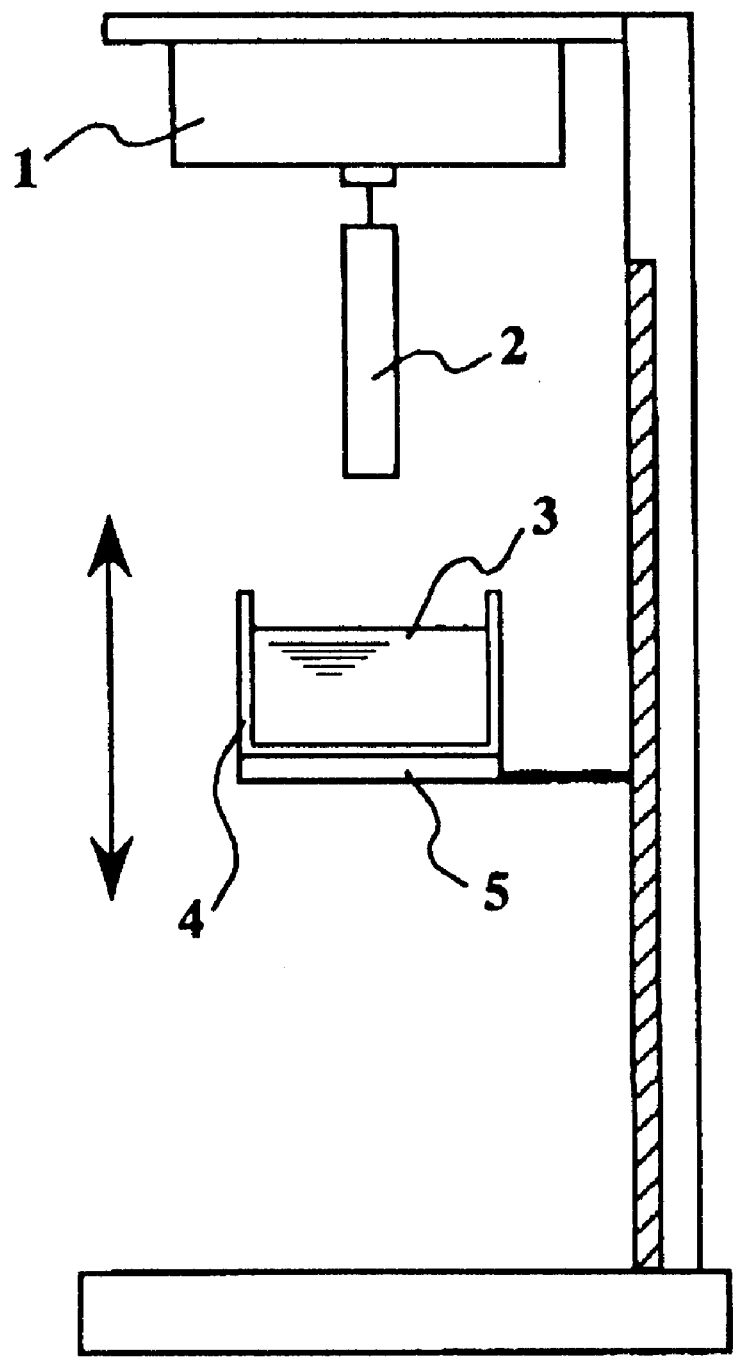
FIG. 1 illustrates apparatus that can be used to measure water dynamic reverse tension (Tr).

The present invention is now described in detail.

The tetramethoxysilane partial hydrolyzed condensate (I) for use in the raindrop fouling-resistant paint film according to the present invention is a partial hydrolyzed condensate available upon partial hydrolysis at a hydrolysis degree of less than 100% and condensation of tetramethoxysilane of the following formula:

In the raindrop fouling-resistant paint film of the present invention, said tetramethoxysilane partial hydrolyzed condensate (I) plays the role of a hydrophilicity imparting agent.

The above tetramethoxysilane partial hydrolyzed condensate (I) improves the hardness of the paint film.

In said tetramethoxysilane partial hydrolyzed condensate (I), SiOH and SiOMe are available as functional groups. Here, Me represents a methyl group. The molar ratio of SiOH to SiOMe should be (SiOH)/(SiOMe)=not more than $\frac{1}{10}$. When too many SiOH groups are available, a hard paint film is obtained but the coating composition undergoes reaction during storage to cause troubles such as viscosity buildup and gelation. Therefore, the above-mentioned ratio should be adhered to.

The tetramethoxysilane partial hydrolyzed condensate (I) mentioned above can be produced by the per se known technology except that the level of addition of water is controlled as mentioned below. For example, the desired tetramethoxysilane partial hydrolyzed condensate (I) can be obtained by the steps of adding the necessary amount of water and a catalyst to tetramethoxysilane and heating the mixture in methanol under reflux for a few hours to let the hydrolysis-condensation reaction proceed until a predetermined molecular weight is attained with the byproduct alcohol resulting from hydrolysis being removed from the reaction system as necessary. After the formation of an oligomer of tetramethoxysilane, this oligomer may be further polymerized to give a condensate of higher molecular weight.

The amount of water added for the production of said tetramethoxysilane partial hydrolyzed condensate (I) depends on the desired hydrolysis degree. In the case of tetramethoxysilane, the hydrolysis reaction proceeds in the following manner.

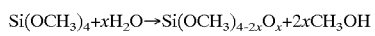
$$Si(OCH_3)_4 + xH_2O \rightarrow Si(OCH_3)_{4-2x}O_x + 2xCH_3OH$$

Therefore, the hydrolysis degree can be written as follows.

$$\text{Hydrolysis degree } (\%) = (2x/4) \times 100 = (x/2) \times 100.$$

Assuming that this hydrolysis-condensation reaction is carried out in the presence of an amount of water theoretically required to hydrolyze all the methoxysilyl groups in the system, the hydrolysis degree of 100% is obtained. As can be easily seen from the above equation, the hydrolysis degree is the percentage ratio of hydrolysis calculated on the assumption that the hydrolysis degree is 100% when the reaction is carried out using water in a molar proportion of one-half of all the methoxysilyl groups available in tetramethoxysilane or its oligomer (the above-mentioned amount of water includes the amount of water added for the formation of the oligomer).

In the present invention, the hydrolysis degree of said tetramethoxysilane partial hydrolyzed condensate (I) should be less than 100%. The preferred hydrolysis degree is not less than 10% and less than 100%. When the hydrolysis degree is less than 10%, the monomer tends to remain unreacted. Conversely when the hydrolysis degree is as high as 100%, the stability of the partial hydrolyzed condensate is adversely affected. The still more preferred hydrolysis degree is 35–70%. When the hydrolysis degree is less than 35%, the molecular weight is not sufficiently increased, thus making it difficult to provide a tetramethoxysilane partial hydrolyzed condensate (I) meeting the object of the invention. When the hydrolysis degree is more than 70%, the molecular weight of the condensate (I) can hardly be controlled within the range defined hereinbefore. Thus, coarse particles tend to form which are not well compatible with the other components so that its stability in the paint is adversely affected.

The kind of water which can be used for the hydrolysis of tetramethoxysilane is not particularly restricted but since the presence of ions and other impurities in the paint film detracts from the performance of the coat, it is preferable to use deionized water, pure water, or ultrapure water according to the desired physical properties of the coat.

The catalyst for use in the hydrolysis and condensation of tetramethoxysilane is not particularly restricted but includes inorganic acids such as hydrochloric acid, acetic acid, sulfuric acid, phosphoric acid, etc.; organic acids such as formic acid, propionic acid, oxalic acid, p-toluenesulfonic acid, benzoic acid, phthalic acid, maleic acid, etc.; basic catalysts such as potassium hydroxide, sodium hydroxide, calcium hydroxide, ammonia, etc.; organometal compounds; metal alkoxides; organotin compounds such as dibutyltin laurate, dibutyltin octoate, dibutyltin diacetate, etc.; metal chelate compounds such as aluminum tris(acetylacetonate), titanium tetrakis(acetylacetonate), titanium bis(butoxy)bis-(acetylacetonate), titanium bis(isopropoxy)bis-(acetylacetonate), zirconium tetrakis(acetylacetonate), zirconium bis(isopropoxy)bis(acetylacetonate), etc.; and boron compounds such as boron butoxide, boric acid, and so forth. Those catalysts can be used each alone or in combination. From the standpoint of shelf-life of the tetramethoxysilane partial hydrolyzed condensate (I) and of the product coating composition, one or more members are preferably selected from among carboxylic acids, metal chelate compounds, and boron compounds.

The level of addition of the above-mentioned catalyst is not particularly restricted but the preferred amount is generally 0.1–10 parts by weight relative to 100 parts by weight of tetramethoxysilane. The still more preferred range is 0.5–5 parts by weight.

The tetramethoxysilane partial hydrolyzed condensate (I) produced in the above manner is generally a mixture of the monomer, dimer, trimer, and polymers. If the proportion of the monomer and other low-molecular-weight fraction is large, the shelf life of the tetramethoxysilane partial hydrolyzed condensate (I) itself and that of the coating composition containing it will be unsatisfactory. Moreover, the performance characteristics of the paint film, such as water resistance, acid resistance, alkali resistance, and crack resistance, are also adversely affected. Therefore, it is preferable to remove the monomeric tetramethoxysilane beforehand. Thus, the tetramethoxysilane (monomer) content is preferably not more than 1 weight % in the tetramethoxysilane partial hydrolyzed condensate (I) after such removal. The more preferred monomer content is not more than 0.3 weight %. The procedure for removal of the monomer is not restricted but the known method can be employed.

While tetramethoxysilane (monomer) can be removed by the above-mentioned method, other low molecular substances inclusive of the dimer to the octamer may not be so easily removed. Therefore, it is necessary to suppress the formation of the dimer-octamer by designing a suitable production system for the tetramethoxysilane partial hydrolyzed condensate (I).

For use in the present invention, the dimer-octamer content is 0–30 weight % in the tetramethoxysilane partial hydrolyzed condensate (I). When the proportion of such a low molecular fraction exceeds 30 weight %, the film characteristics are adversely affected and, moreover, because the volatile fraction is large, the hydrophilic component on the surface layer of the film is decreased on baking so that the surface cannot be sufficiently rendered hydrophilic. The term "dimer-octamer content" as used in this specification means the value determined by gas chromatography (GC) using a TCD detector with the detection sensitivity for the dimer and other low molecular condensates being aligned with the sensitivity for the dimer.

In the present invention, the weight average molecular weight of said tetramethoxysilane partial hydrolyzed condensate (I) should be 1500–5000 in terms of standard polypropylene glycol as determined by gel permeation chromatography (GPC). When this molecular weight is less than 1500, the film characteristics are not fully satisfactory and the amount of evaporation is increased. Moreover, because of the large low molecular weight fraction, the hydrolyzed condensate tends to be anchored in the interior of the film rather than migrating onto the surface. Conversely when the molecular weight is larger than 5000, the partial hydrolyzed condensate has a poor storage stability and tends to undergo gelation. In addition, its compatibility with the film-forming resin (A) tends to be decreased so that a homogeneous coating composition can hardly be obtained.

As said tetramethoxysilane partial hydrolyzed condensate (I), commercial products can be utilized. For example, MKC Silicate MSSGNP (Mitsubishi Chemical) can be mentioned as an example.

MKC Silicate MSSGNP, mentioned above, is a product prepared by heating the starting tetramethoxysilane in methanol in the presence of a catalyst amount of hydrochloric acid under reflux for several hours. The amount of water added for hydrolysis is the equivalent of 60–80% rate of hydrolysis. In an organic solvent, this compound exists as fine particles having an inertial radius which can be measured by small-angle X-ray diffractometry. To be specific, particles having a weight average molecular weight of 1500–3500 and an inertial radius of 5–20 Å at the hydrolysis degree of 60% and a weight average molecular weight of 2500–5000 and an inertial radius of 15–40 Å at the hydrolysis rate of 70% has been confirmed.

MKC Silicate MSSGNP, mentioned above, has a GPC weight average molecular weight of 1500–5000 in terms of standard polypropylene glycol. A major proportion of this product is within the molecular weight range of 1800–3000, and the molar ratio of the hydroxyl group to the methoxy group is not more than ⅒. While this product contains methanol as the solvent, the solvent can be replaced with a nonpolar solvent such as xylene.

When a tetramethoxysilane partial hydrolyzed condensate with a dimer-octamer content of 0–30 weight %, a GPC weight average molecular weight of 1500–5000 in terms of standard polypropylene glycol, and a (SiOH)/(SiOMe) molar ratio of not more than ⅒, such as MKC Silicate MSSGNP mentioned above, is used in combination with, for example, a thermoplastic fluororesin binder in accordance with the present invention, a very high water dynamic reverse tension (Tr) value of 60–68 dyn/cm is obtained, with the film surface being rendered very effectively hydrophilic, thus insuring an excellent resistance to raindrop fouling.

The preferred formulating amount of said tetramethoxysilane partial hydrolyzed condensate (I) is 0.1–100 parts by weight relative to 100 parts of the total nonvolatile matter of the coating composition including at least one of film-forming resin (A) and inorganic binder (B). When the amount of said condensate (I) is less than 0.1 part by weight, the hydrophilicity imparting effect is insufficient. On the other hand, if more than 100 parts by weight of (I) is employed, no commensurate increase in hydrophilicity can be obtained but, rather, the shelf-life of the coating composition will be decreased and, because of its high structural viscosity, the coatability will also be sacrificed.

The raindrop fouling-resistant paint film of the present invention comprises said tetramethoxysilane partial hydrolyzed condensate (I) and at least one member selected from the group consisting of a film-forming resin (A) and an inorganic binder (B) containing alkoxysilyl as a reactive curing group. The film-forming resin (A) is at least one member selected from the group consisting of thermoplastic resins, thermosetting resins, and room-temperature setting resins. The inorganic binder (B) is at least one member selected from the group consisting of said alkoxysilane compounds, partial hydrolyzed condensates of said alkoxysilane compounds, and siloxane polymers. Those components will be discussed in further detail hereinafter.

One preferred raindrop fouling-resistant paint film embodying the principles of this invention comprises said tetramethoxysilane partial hydrolyzed condensate (I), said film-forming resin (A), and an organosilica sol (C) with a particle diameter of 10–100 nm and a degree of hydrophobicity corresponding to a hexane tolerance value of not less than 15.0 ml.

The above-mentioned organosilica sol (C) preferably has particle diameters between 10 nm and 100 nm. The organosilica sol (C) is a colloidal solution in which isolated amorphous colloid particles are dispersed in water or an organic solvent. The colloidal solution generally contains not greater than 50 weight % of silica and is available in the particle size range up to 300 nm. In the present invention, it is preferable to use an organosilica sol with a particle diameter of 10–100 nm. If the particle diameter is outside the above range, the storage stability of the coating composition and the uniformity, gloss and other characteristics of the paint film may not be easily controlled.

The degree of hydrophobicity of said organosilica sol is expressed in hexane tolerance value, and this value is preferably not less than 15.0 ml. When the hexane tolerance value is less than 15.0 ml, too many SiOH groups remain unreacted so that the shelf-life cannot be improved. The still more preferred range is 15.0–50.0 ml. However, if the limit of 50.0 ml is exceeded, the reactivity will be reduced too much to provide a tough film so that the desired hardness and chemical resistance will not be obtained.

The hexane tolerance value, mentioned above, is an evaluation parameter of hydrophobicity, and it is postulated that the higher the hexane tolerance value of a sample is, the higher is its hydrophobicity. The hexane tolerance value can be determined as follows.

Using a beaker, 2 g of silica sol ($SiO_2$ content: 30%) is dispersed in 10 ml of acetone. Then, hexane is added gradually and the amount of hexane (ml) needed to cause opacification of the system is measured. This measured amount of hexane (ml) is the hexane tolerance value of the sample. The principle of this assay is that when the surface of the test organosilica sol is initially hydrophilic, the sol is well compatible with acetone but as a small amount of hexane is added to the system, the silica sol and acetone become incompatible so that the system is opacified. Conversely when the surface of an organosilica sol is initially hydrophobic, the amount of hexane needed to cause opacification of the system is larger with an increasing hydrophobicity of the silica sol surface. In this manner, the degree of hydrophilicity/hydrophobicity of the silica sol surface can be determined.

Regarding said organosilica sol (C), several grades are commercially available. Thus, a silica sol containing xylene-butanol as the dispersion medium (XBA-ST, Nissan Kagaku Kogyo, hexane tolerance value 15.3 ml, slightly hydrophobic) and a silica sol containing methyl isobutyl ketone (MIBK) as the dispersion medium (MIBK-ST, Nissan Kagaku Kogyo, hexane tolerance value 18.0 ml, hydrophobic) can be mentioned as examples. This organosilica sol (C) will be further explained when the coating composition of the present invention is discussed in further detail hereinafter.

While said organosilica sol (C) is a sol rendered hydrophobic by blocking its SiOH groups to a certain extent, the residual SiOH groups are considered to contribute to the curing reaction of the coat. Thus, those SiOH groups react with the hydroxyl groups of the self-condensing resin which are located especially on the coat surface to form intimate bonds and this bonding coupled with the action of the curing agent described hereinafter for use in the present invention contribute to an enhanced raindrop fouling resistance of the coat. On the other hand, because some of the SiOH groups have been blocked as mentioned above, the shelf-life of the coating composition and the chemical resistance of the paint film are protected against deterioration and the breadth of compatibility of organosilica sol (C) and film-forming resin (A), which is an organic binder, is expanded, with the result that certain film characteristics such as gloss are improved.

The preferred formulating amount of said organosilica sol (C) is 0.1–100 parts by weight on a nonvolatile matter basis with respect to 100 parts by weight of the total nonvolatile matter of the coating composition including said film-forming resin (A). If the proportion of organosilica sol (C) is less than 0.1 part by weight, the strength of the paint film will be insufficient. The use of organosilica sol (C) in excess of 100 parts by weight will increase the hardness of the paint film but since many SiOR and SiOH groups will remain in the coat, the chemical resistance and water resistance of the paint film will be decreased and the incidence of cracking increased. The shelf-life and coatability of the coating composition will also be adversely affected.

The raindrop fouling-resistant paint film according to the present invention has a water dynamic reverse tension (Tr) of not less than 55 dyn/cm. The water dynamic reverse tension (Tr) can be measured in accordance with the method of Kubo and Ueda [Synopsis of the Lectures at the 43rd Rheology Panel of The Society of Rheology, Japan, p. 233, 1995] using the apparatus depicted in FIG. 1. Thus, a coated testpiece 2 is suspended from a load cell 1 secured to the top of the apparatus and a vessel containing a test fluid 3 is set on the platform 5. Then, the platform 5 is moved up and down to cause the testpiece 2 cyclically dipped in the test fluid 3 and withdrawn and the change in the load F acting on the testpiece 2 is measured.

Figure 2:
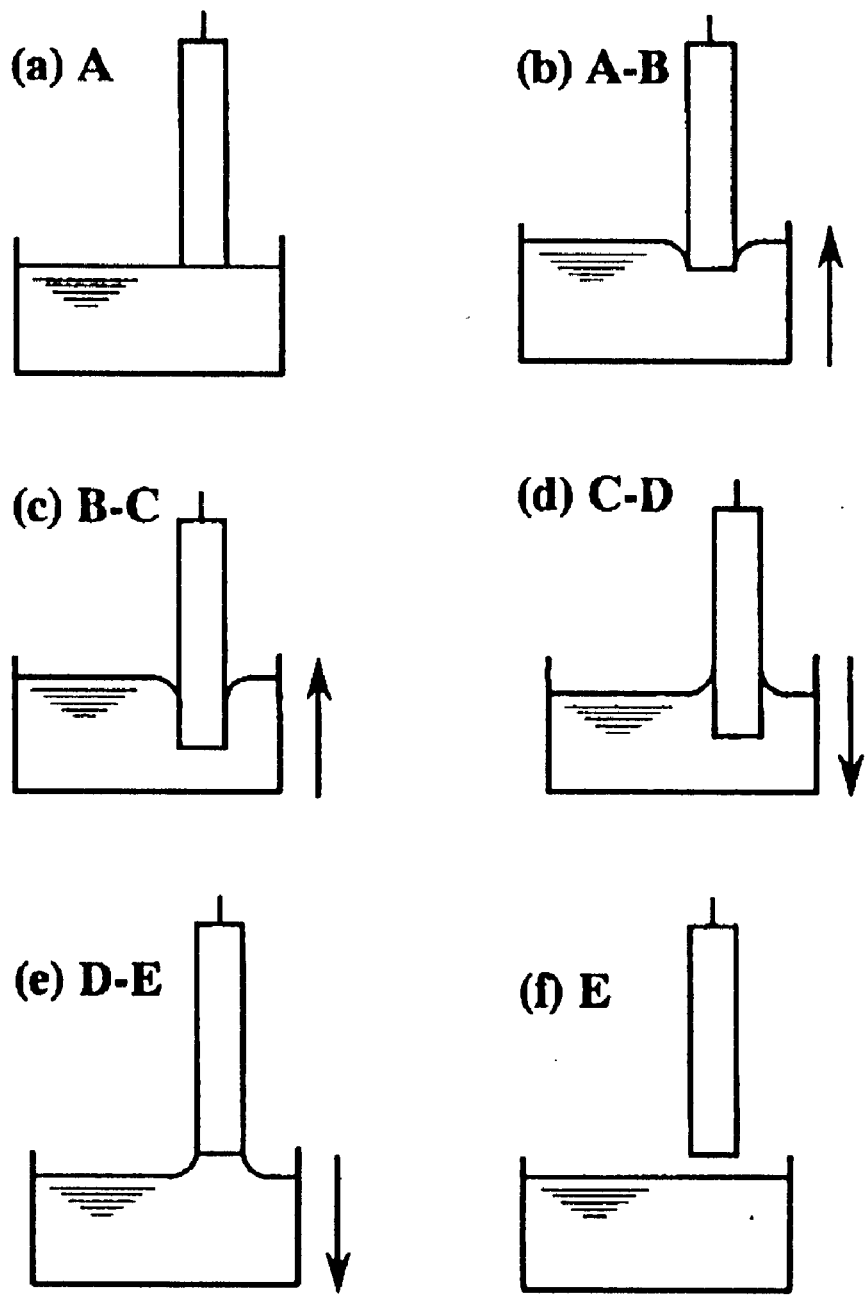
FIGS. 2(a) to 2(f) illustrate the positioning of the test piece during different points in the measuring of the Tr.
Figure 3:
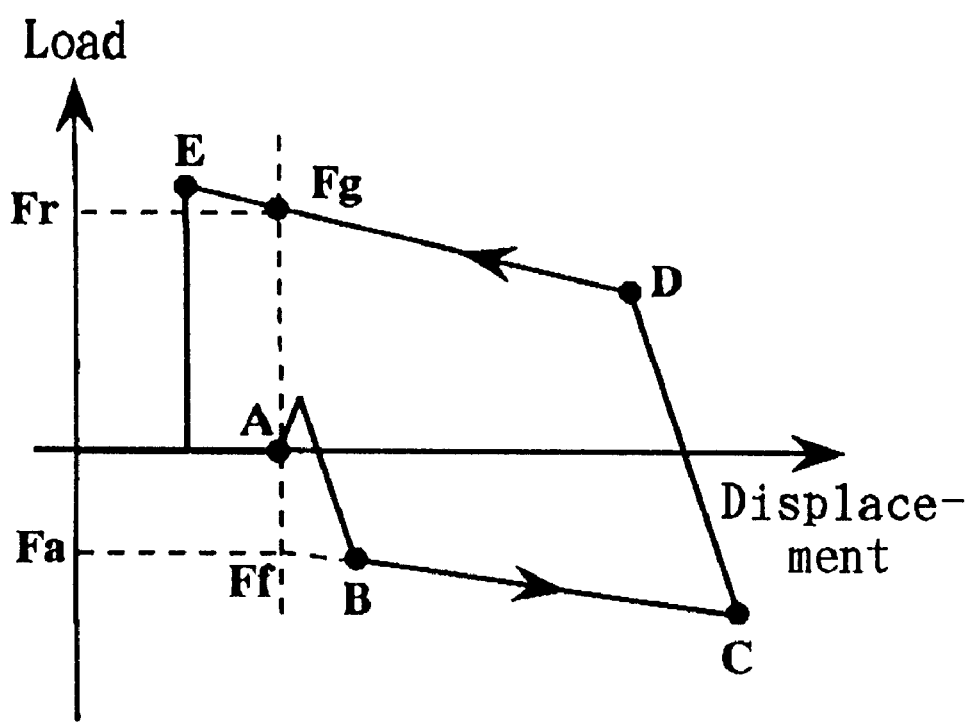
FIG. 3 illustrates the changing of the load F on a test piece during one measuring cycle.

When the mass of the testpiece 2 prior to immersion in the test fluid 3 is taken as a reference, the load F on the testpiece 2 changes during one measuring cycle as shown in FIG. 3. In the diagram, A represents the immersion start point shown in FIG. 2 (a), B represents the point, as shown in FIG. 2 (b), at which the testpiece 2 overcoming the surface tension of test fluid 3 begins to penetrate into test fluid 3, C represents the point at which the testpiece 2 begins to be withdrawn, and Fg represents the point at which the displacement of the load cell is equal to that at A.

The load at this point Fg corresponds to the reverse tension (Fr) of water. From this value, the water dynamic reverse tension (Tr) can be calculated by means of the following equation.

$$Tr = (Fr - Fb)/P$$

wherein Fb represents a buoyancy acting on the testpiece 2 and is 0 at point Fg and P is the girth (mm) of the immersed portion of the testpiece 2.

Thus, the water dynamic reverse tension (Tr) is a value which can be measured only physically and is not predicated on any theoretical premise.

As described in Japanese Patent Application Hei-8-301339, the inventors of the present invention previously discovered that a paint film showing a water dynamic reverse tension (Tr) of not less than 47 dyn/cm expresses a definite resistance to raindrop fouling. Furthermore, as disclosed in this specification, the inventors found that the use of a defined silicate improves said water dynamic reverse tension (Tr) to not less than 55 dyn/cm and that a paint film meeting this definition shows a more satisfactory resistance to raindrop fouling. The still more satisfactory is a paint film with a water dynamic reverse tension (Tr) of not less than 60 dyn/cm.

Preferably the raindrop fouling-resistant paint film according to the present invention is such that, as analyzed by secondary ion mass spectrometry (SIMS), the total amount of elemental Si on the level from 0 nm to 400 nm deep from the paint film surface is not less than double the total amount of elemental Si on the level from 0 to 400 nm deep from the surface of a paint film formed from the remainder of the same raindrop fouling-resistant film of the invention after elimination of tetramethoxysilane partial hydrolyzed condensate (I). Moreover, the total amount of elemental Si on the level from 0 nm to 400 nm deep from the paint film surface is preferably not less than double the total amount of elemental Si on the level from 400 nm to 600 nm deep from the surface of the same film surface. SIMS, mentioned above, is a technique for mass spectrometric analysis of the secondary ion generated by the sputtering which occurs when the surface of a solid sample is bombarded with a primary ion beam at an energy level of about 5–15 keV. This technique permits not only a high-sensitivity mass spectrometric analysis of an element contained in the specimen but also an analysis of the distribution of the element across the depth of the specimen. By utilizing this SIMS technique, the depth analysis for elemental Si is performed to estimate the distribution of elemental Si in the paint film.

When the total amount of elemental Si on the level from 0 nm to 400 nm deep from the paint film surface is less than double the total amount of elemental Si on the level from 0 to 400 nm deep from the surface of a paint film formed from the remainder of the same raindrop fouling-resistant film of the invention after elimination of tetramethoxysilane partial hydrolyzed condensate (I), the number of SiOR groups available on the surface of the paint film is too small to make the surface hydrophilic so that no satisfactory resistance to raindrop fouling can be expected. More preferably, the differential multiple is not less than three.

Furthermore, the raindrop fouling-resistant paint film of the present invention is preferably such that the secondary ion intensity of Si element on any level from 0 to 30 nm deep from surface of the paint film is not less than double the secondary ion intensity of Si element at a depth of 400 nm from the same film surface. If the former intensity is less than double the latter intensity, the number of SiOR groups in the surface layer of the paint film is too small to render the surface hydrophilic so that no satisfactory resistance to raindrop fouling can be obtained.

The thickness of the raindrop fouling-resistant paint film is not particularly restricted. However, for insuring satisfactory durability and abrasion resistance, is preferably 5–100 μm on a dry film basis.

Since the raindrop fouling-resistant paint film of the present invention comprises said tetramethoxysilane partial hydrolyzed condensate (I) and at least one member selected from the group consisting of said film-forming resin (A) and said inorganic binder (B) containing alkoxysilyl as a reactive curing group, the SiOH groups and/or SiOR groups in said tetramethoxysilane partial hydrolyzed condensate are localized on the surface of the paint film, with the result that the coat is rendered hydrophilic. Moreover, since said tetramethoxysilane partial hydrolyzed condensate (I) has a (SiOH)/(SiOMe) group ratio of not more than $\frac{1}{10}$, a low molecular dimer-octamer content of 0–30 weight %, and a weight average molecular weight of 1500–5000 as defined herein, its vaporization on baking is less remarkable as compared with the conventional hydrophilicity imparting component so that it is quite instrumental for rendering the paint film surface hydrophilic. Thus, in the raindrop fouling-resistant paint film according to the present invention, said SiOH and/or SiOR groups are localized on the film surface to render it sufficiently hydrophilic so that greater resistance to raindrop fouling is insured.

When the raindrop fouling-resistant paint film of the present invention comprises said tetramethoxysilane partial hydrolyzed condensate (I), said film-forming resin (A), and said organosilica sol (C), the formulating proportion of tetramethoxysilane partial hydrolyzed condensate (I) can be decreased so that the shelf-life of the coating composition may be increased.

Furthermore, when said tetramethoxysilane partial hydrolyzed condensate (I) and said organosilica sol (C) are used in combination, the resistance to raindrop fouling is definitely improved as compared with the case in which only the organosilica sol is added to the film-forming resin (A). Thus, fouling matter is hard to deposit even during long-term exposure to weather involving raindrops, so that even the so-called ultra-low foulability is attained. Though the precise mechanism for this effect remains to be fully known, the inventors propose the following tentative mechanism. Thus, since the particle diameter of tetramethoxysilane partial hydrolyzed condensate (I) is smaller than the particle diameter of organosilica sol (C), there occurs a differential in their distribution in the paint film, with the result that while the SiOH groups in organosilica sol (C) are retained in the inner stratum of the film to form a sufficiently hard and yet flexible film, the SiOH and/or SiOR groups of tetramethoxysilane partial hydrolyzed condensate (I) are retained on the surface of the paint film to form a dense hydrophilic layer.

Thus, the raindrop fouling-resistant paint film according to the present invention exhibits a high degree of surface hydrophilicity because of the above-mentioned retention of SiOH and/or SiOR groups in the surface layer. Moreover, since this paint film has a water dynamic reverse tension (Tr) value of not less than 55 dyn/cm, it is highly resistant to raindrop fouling and even implements ultra-low foulability. The raindrop fouling-resistant paint film of the invention can be easily provided by using the coating composition of the invention, which is now described in detail hereinafter.

The coating composition of the present invention comprises
  (I) a tetramethoxysilane partial hydrolyzed condensate having a silanol (SiOH)-methoxysilyl (SiOMe) group molar ratio of not more than (SiOH)/(SiOMe)=$\frac{1}{10}$, a dimer through octamer content of 0–30 weight %, and a weight average molecular weight of 1500–5000 as available upon partial hydrolysis at a hydrolysis degree of less than 100% and condensation of tetramethoxysilane and
at least one member selected from the group consisting of
  (A) at least one film-forming resin selected from the group consisting of thermoplastic resins, thermosetting resins and room-temperature setting resins and
  (B) at least one inorganic binder having alkoxysilyl as a reactive curing group as selected from the group consisting of an alkoxysilane compound, a partial hydrolyzed condensate of said alkoxysilane compound, and a siloxane polymer,
the final paint film having a water dynamic reverse tension (Tr) of not less than 55 dyn/cm.

The formulating amount of said tetramethoxysilane partial hydrolyzed condensate (I) is preferably 0.1–100 parts by weight based on 100 parts by weight of the total nonvolatile matter of the coating composition including at least one of said film-forming resin (A) and said inorganic binder (B). If its proportion is less than 0.1 part by weight, the hydrophilicity-imparting effect will not be sufficient. On the other hand, when its proportion exceeds 100 parts by weight, the hydrophilicity-imparting effect is not improved any further but rather the shelf-life of the coating composition is sacrificed and, because of the resulting high structural viscosity, the coatability of the composition is also adversely affected.

The above-mentioned film-forming resin (A) may be any one of thermoplastic resin, thermosetting resin, and room-temperature setting resin. Since this resin is blended with said tetramethoxysilane partial hydrolyzed condensate (I), a thermoplastic resin which does not require a catalyst is preferred. The rationale for this is that the tetramethoxysilane partial hydrolyzed condensate (I) contains alkoxysilyl groups as mentioned above and when it comes into contact with a catalyst such as an acid or a tin compound, the alkoxysilyl groups are liable to undergo hydrolysis and condensation in the event of infiltration of water to impair the shelf-life of the coating composition. When a thermosetting resin or a room-temperature setting resin is used as film-forming resin (A), it is preferable to provide a two-package coating system in which said tetramethoxysilane partial hydrolyzed condensate (I) and said catalyst are supplied in independent packages.

The thermoplastic resin, thermosetting resin, and room temperature setting resin for use as said film-forming resin (A) are now described in detail.

1. Thermoplastic Resin

The thermoplastic resin mentioned above is not particularly restricted in kind but includes polyvinylidene fluoride, vinylidene fluoride-acrylic copolymer, polyvinylidene fluoride-acrylic resin alloy, plastisol resin, etc.

The polyvinylidene fluoride is a polymer of vinylidene fluoride which can be typically produced by a polymerization reaction using a radical polymerization initiator at high temperature and pressure.

The vinylidene fluoride-acrylic copolymer mentioned above is a copolymer which can be produced by copolymerizing vinylidene fluoride or a prepolymer thereof with an acrylic monomer such as acrylic acid, methacrylic acid, methyl (meth)acrylate, ethyl (meth)acrylate, or the like. This copolymerization reaction between vinylidene fluoride or a prepolymer thereof and an acrylic monomer is typically carried out in the presence of a radical polymerization initiator.

The preferred monomer charge ratio is (vinylidene fluoride)/(acrylic monomer)=99/1 through 50/50, by weight.

The polyvinylidene fluoride-acrylic resin alloy mentioned above is a blend of said polyvinylidene fluoride and an acrylic resin prepared by polymerizing said acrylic monomer. The preferred blending ratio is (polyvinylidene fluoride)/(acrylic resin)=95/5–40/60. The more preferred ratio is 90/10–50/50.

The plastisol mentioned above is not particularly restricted in kind but includes polyolefin sols such as polyvinyl chloride sol and polyethylene sol.

2. Thermosetting Resin

The above-mentioned thermosetting resin is not particularly restricted, either. Preferred, however, is a polyol resin (a1) to be used in combination with a curing agent (a2) which is reactive therewith.

The polyol resin (a1) mentioned above is preferably a polyol resin with a hydroxyl value of 5–300 mg KOH/g. When the hydroxyl value is less than 5 mg KOH/g, the reactive groups taking part in the curing reaction are too few to realize a thorough cure. On the other hand, if the hydroxyl value exceeds 300 mg KOH/g, many unreacted hydrophilic groups remain in the film to detract from the water resistance, acid resistance, and alkali resistance of the coat. The still more preferred hydroxyl value is 30–200 mg KOH/g.

The preferred polyol resin (a1) has a number average molecular weight of 500–20000. When the number average molecular weight is less than 500, the mechanical strength of the paint film is not sufficiently high. If the upper limit of 20000 is exceeded, the viscosity of the coating composition will be increased to the extent of affecting coatability. The still more preferred range is 1800–20000.

The polyol resin (a1) mentioned above is not particularly restricted but includes acrylic polyol resin, polyester polyol resin, fluorine-containing polyol resin, and silicon-containing polyol resin, among others. Those resins may be used each alone or in combination. Those resins are described in further detail below.

(2-1) Acrylic Polyol Resin

The acrylic polyol resin mentioned above can be produced by copolymerizing a hydroxyl-containing acrylic monomer with one or more other ethylenically unsaturated monomers. The hydroxyl-containing acrylic monomer mentioned just above is not particularly restricted in species but includes hydroxyalkyl (meth)acrylates such as 2-hydroxyethyl (meth)acrylate, 2-hydroxypropyl (meth)acrylate, 4-hydroxybutyl (meth)acrylate, and so forth.

The above-mentioned ethylenically unsaturated monomer copolymerizable with said hydroxyl-containing acrylic monomer is not particularly restricted but includes various alkyl (meth)acrylates such as methyl (meth)acrylate, ethyl (meth)acrylate, propyl (meth)acrylate, n-butyl (meth)acrylate. i-butyl (meth)acrylate, t-butyl (meth)acrylate, 2-ethylhexyl (meth)acrylate, lauryl (meth)acrylate, etc.; aromatic vinyl compounds such as styrene, vinyltoluene, etc.; other vinyl compounds such as acrylonitrile, vinyl acetate, acrylic acid, methacrylic acid, etc.; epoxy-containing monomers such as glycidyl (meth)acrylate etc.; amino-containing monomers or acrylamides such as dimethylaminoethyl (meth)acrylate, diethylaminoethyl (meth)acrylate, (meth)acrylamide, N-ethyl (meth)acrylamide, N,N-butoxymethyl (meth)acrylamide, N-methylacrylamide, and so forth. Those monomers can be used each alone or in combination.

The acrylic polyol resin mentioned above is a resin synthesized using a soft segment-containing monomer, such as a lactone-modified acrylic monomer as modified by, for example, ε-caprolactone for imparting flexibility to the paint film and improving processability in precoated metal (PCM) applications.

As examples of the above-mentioned soft segment-containing monomer, several commercial monomers can be mentioned. For example, 2-hydroxyethyl (meth)acrylate-ε-caprolactone addition polymer and polyalkylene glycol mono(meth)acrylate are available as Placcel FA Series and Placcel FM Series (all from Daicel Chemical).

Where necessary, said acrylic polyol resin may have been alkoxysilylated.

(2-2) Polyester Polyol Resin

The above-mentioned polyester polyol resin is a product of polycondensation of an acid component composed predominantly of a polycarboxylic acid with an alcohol component composed predominantly of a polyhydric alcohol.

The acid component mentioned above includes but is not limited to aromatic dicarboxylic acids such as terephthalic acid, isophthalic acid, phthalic acid, 2,6-naphthalenedicarboxylic acid, 2,7-naphthalenedicarboxylic acid, etc., inclusive of their acid anhydrides; and aliphatic dicarboxylic acids such as succinic acid, adipic acid, azelaic acid, sebacic acid, dodecanedicarboxylic acid, 1,4-cyclohexanedicarboxylic acid, and so forth.

In addition to the above-mentioned acids, the acid component may contain, in minor amounts, lactone compounds such as γ-butyrolactone, ε-caprolactone, etc.; the corresponding hydroxycarboxylic acids; aromatic hydroxymonocarboxylic acids represented by p-hydroxyethoxybenzoic acid; and tri- and polycarboxylic acids such as trimellitic acid, trimesic acid, pyromellitic acid, and so forth.

The above-mentioned alcohol component includes but is not limited to ethylene glycol, 1,3-propanediol, 1,4-butanediol, 1,5-pentanediol, 1,5-hexanediol, diethylene glycol, triethylene glycol, 1,4-cyclohexanediol, 1,4-cyclohexanedimethanol, bisphenol A-alkylene oxide adducts, bisphenol S-alkylene oxide adducts; aliphatic glycols having a side chain, such as 1,2-propanediol, neopentyl glycol, 1,2-butanediol, 1,3-butanediol, 1,2-pentanediol, 2,3-pentanediol, 1,4-pentanediol, 1,4-hexanediol, 2,5-hexanediol, 3-methyl-1,5-pentanediol, 1,2-dodecanediol, 1,2-octadecanediol, and so forth.

In addition to the above-mentioned alcohols, the alcohol component may contain tri- and polyhydric alcohols such as trimethylolpropane, glycerol, pentaerythritol, etc. in minor proportions.

Where necessary, the above-mentioned polyester polyol resin may have been coupled to other components such as silicon-containing components and acrylic components. Commercial products are available as such polyester polyol resin coupled to a silicone component. Thus, for example, TA22-293J (hydroxyl value: ca 170 mg KOH/g; number average molecular weight: ca 2400, manufactured by Hitachi Kasei Kogyo) can be mentioned.

(2-3) Fluorine-containing Polyol Resin

The above-mentioned fluorine-containing polyol resin is either a resin produced by copolymerizing a hydroxyl-containing radical-polymerizable unsaturated monomer with a fluoroolefin monomer, optionally further with one or more other radical-polymerizable unsaturated monomers, or an alloy consisting of either a fluoroolefin monomer or a hydroxyl-free fluorine-containing polymer prepared by polymerizing a fluoroolefin monomer with one or more other radical-polymerizable unsaturated monomers and an acrylic polyol resin.

The hydroxyl-containing radical-polymerizable unsaturated monomer mentioned above includes but is not limited to hydroxyalkyl vinyl ethers such as hydroxyethyl vinyl ether, hydroxypropyl vinyl ether, hydroxybutyl vinyl ether, hydroxypentyl vinyl ether, etc.; and hydroxyallyl ethers such as ethylene glycol monoallyl ether, diethylene glycol monoallyl ether, triethylene glycol monoallyl ether, and so forth.

The fluoroolefin monomer mentioned above includes olefin difluoride monomers, olefin trifluoride monomers, and olefin tetrafluoride monomers. Thus, vinyl fluoride, vinylidene fluoride, chloroethylene trifluoride, ethylene tetrafluoride, etc. can be typically mentioned.

The other radical-polymerizable unsaturated monomer mentioned above is not particularly restricted but can be judiciously selected from among the known monomers according to the desired physical properties of the paint film. As typical examples, there can be mentioned α-olefins such as ethylene, propylene, isobutylene, etc.; vinyl ethers such as ethyl vinyl ether, isobutyl vinyl ether, butyl vinyl ether, cyclohexyl vinyl ether, etc., and fatty acid esters such as aliphatic isopropenyl compounds, e.g. vinyl acetate, vinyl lactate, vinyl butyrate, vinyl isobutyrate, vinyl caproate, vinyl caprylate, and so forth.

The polyol resin to be blended with said fluorine-containing polymer includes but is not limited to copolymers of said hydroxyl-containing radical-polymerizable unsaturated monomers; hydroxyl-containing acrylic monomers such as 2-hydroxyethyl (meth)acrylate, hydroxypropyl (meth)acrylate, etc.; alkyl esters of acrylic acid or methacrylic acid; ethylenically unsaturated carboxylic acids such as acrylic acid, methacrylic acid, etc.; aromatic vinyl monomers such as styrene, α-methylstyrene, vinyltoluene, etc.; amides of such acids as acrylic acid, methacrylic acid, etc. and amides of derivatives of such acids; acrylonitrile, methacrylonitrile, and so forth.

As the fluorine-containing polyol resin mentioned above, a resin having an acid value may be used where necessary. For example, acidic groups can be introduced into the fluorine-containing polyol resin by causing a polybasic acid anhydride, such as succinic anhydride, to react with some of the hydroxyl groups of the fluorine-containing polyol resin by the conventional addition reaction technology.

Some grades of said fluorine-containing polyol resin and said fluororesin are commercially available. Among them are polyvinylidene fluoride (PVDF) series which are of the difluoride type, fluoroethylene vinyl ether copolymer (FEVE) series of the trifluoride type, and FEVE series of the tetrafluoride type. For example, as a PVDF of the difluoride type, Kiner 500 (Elf Atkem) can be used. Since this resin contains no hydroxyl function, it is used in combination with a hydroxyl-containing acrylic polyol resin. As the trifluoride type FEVE resin, Lumiflon Series (Asahi Glass), Ceflual Coat Series (Central Glass), etc. can be used, and the tetrafluoride type FEVE resin, Zeflu Series (Daikin Kogyo), among others, can be used. Aside from the above, as the so-called fluoride acrylic resin, Coatax (Toray) can also be used. Among those resins, trifluoride type FEVE resins and tetrafluoride type FEVE resins are preferred. Those resins may be used either as they are or after blending them with a hydroxyl-containing acrylic polyol resin and adjusting the hydroxyl value.

(iv) Silicone Polyol Resin

The above-mentioned silicone polyol resin is either an organopolysiloxane containing at least two alcoholic hydroxyl groups per molecule or a silicone polyol resin prepared by graft-modifying or blending said organopolysiloxane with one or more other resins. The above-mentioned silicone polyol resin includes polymers of the following general formula (8), which are described in Japanese Kokoku Publication Hei-2-61481.

$$R^i_y \cdot R^j_z \cdot SiO_{(4-y-z)/2} \quad (8)$$

(wherein $R^i$ represents hydrogen, methyl, $C_{1-20}$ alkoxy, aryl or aryloxy, or an organic group containing at least one ester bond, ether bond, urethane bond, or carbon-carbon unsaturated bond in a $C_{2-100}$ chain; $R^j$ represents a hydroxyl-containing organic group containing at least one ester bond, ether bond, urethane bond, or carbon-carbon unsaturated bond in its $C_{2-100}$ chain; y and z independently represent a positive integer satisfying the relations 0<y<4, 0<z<4, and 2≦y+z<4). Particularly preferred, from the standpoints of ease of production, coatability, and curability are polymers of general formula (8) wherein $R^i$ is methyl, propyl, or phenyl; $R^j$ is $HOC_2H_4OC_3H_6$—, and y and z represent positive integers satisfying the relations 0<y<2, 0<z<2, y+z<3. In view of their good compatibility with other resins, polymers of the following general formula (9) are still more preferred.

$$(R^{i'})_f(R^{i''})_{3-f}SiO\text{—}[(R^{i'})_2SiO]_g\text{—}[(R^{i'})(R_{i'})SiO]_2\text{—}SiO(R^{i'})_f(R^{i''})_{3-f} \quad (9)$$

wherein $R^{i'}$ represents methyl or phenyl, with phenyl accounting for 10–50 mole %; $R^{j'}$ represents $HOC_2H_4OC_3H_6$—; f is equal to 0 or 1; and g is equal to 1–20.

The above silicone polyol resin can be used in combination with other polyol resin. The other polyol resin mentioned just above may be any hydroxyl-containing polyol resin with a hydroxyl value of 5–300 mg KOH/g, preferably 30–200 mg KOH/g. As examples, the acrylic polyol resin, polyester polyol resin, and fluorine-containing polyol resin mentioned hereinbefore can be used. Aside from those resins, other resins such as acryl-modified acrylic resin, acryl-modified polyester resin, and epoxy resin available from bisphenol A and epichlorohydrin can also be employed.

The preferred blending ratio of said silicone polyol resin and said other polyol resin is 3–70 parts by weight of the silicone polyol resin/97-30 parts by weight of the other polyol resin. If the proportion of silicone polyol resin is less than 3 parts by weight, the weather resistance, chemical resistance, and other inherent characteristics of silicones will not be sufficiently expressed. If the proportion of the silicone polyol resin exceeds 70 parts by weight, its compatibility with the other polyol will be sacrificed.

When the above silicone polyol resin is used as polyol resin (a1), its compatibility with other components, pigment dispersibility and stability, adhesion, elongation, hardness and other film characteristics can be modified as desired by using said other polyol resin in combination.

The curing agent (a2) reactive with said polyol resin (a1) is not particularly restricted in kind but includes isocyanate compounds, blocked isocyanate compounds, amino resin, etc. Particularly preferred is a blocked isocyanate compound or an amino resin.

The above-mentioned isocyanate compound may practically be any compound having at least two isocyanate groups per molecule and includes aliphatic diisocyanates such as hexamethylene diisocyanate (HMDI), trimethylhexamethylene diisocyanate (TMDI), etc.: alicyclic diisocyanates such as isophorone diisocyanate (IPDI) etc.; aralkyl diisocyanates such as xylylene diisocyanate (XDI) etc.; aromatic diisocyanates such as tolylene diisocyanate (TDI), 4,4-diphenylmethane diisocyanate (MDI), etc.; dimer acid diisocyanate (DDI), hydrogenated diisocyanates such as hydrogenated TDI (HTDI), hydrogenated XDI (H6XDI), hydrogenated MDI (H12MDI), etc.; the corresponding dimers, trimers, tetramers and polymers; their adducts to polyhydric alcohols such as trimethylolpropane etc., water, or a low molecular weight polyester resin.

The above-mentioned isocyanate compound is generally used in the form of a blocked isocyanate compound prepared by masking the reactive groups with a suitable blocking agent for enhanced stability of the resulting coating composition. The blocking agent mentioned above is not restricted in type but includes oxime series blocking agents such as methyl ethyl ketoxime, acetoxime, cyclohexanone oxime, acetophenone oxime, benzophenone oxime, etc.; phenolic blocking agents such as m-cresol, xylenol, etc.; alcohol series blocking agents such as methanol, ethanol, butanol, 2-ethylhexanol, cyclohexanol, ethylene glycol monoethyl ether, etc.; lactam series blocking agents such as ε-caprolactam etc.; diketone series blocking agents such as diethyl malonate, acetoacetic esters, etc.; mercaptan series blocking agents such as thiophenol etc.; urea series blocking agents such as thiourea etc.; imidazole series blocking agents; and carbamic acid series blocking agents. Preferred are lactam series, oxime series, and diketone series blocking agents.

The above-mentioned blocked isocyanate compound can be prepared by reacting any of said isocyanate compounds with said blocking agent until disappearance of free isocyanate groups. Such blocked isocyanates are commercially available, too. Thus, for example, Desmodur Series (Sumitomo-Byer Urethane), Burnock D Series (Dainippon Ink and Chemicals, Inc.), Takenate B Series (Takeda Chemical Industries), Coronate 2500 Series (Nippon Polyurethane), etc. can be mentioned.

When the above-mentioned blocked isocyanate compound is used as said curing agent (a2), the formulating amount of the blocked isocyanate compound may be an amount providing isocyanate groups equivalent to the hydroxyl value of said polyol resin (a1) and is preferably 0.8–1.5 equivalents in most cases. If the amount of said blocked isocyanate compound is too small, the hardness of the paint film will be decreased and, in addition, the acid resistance, alkali resistance, and fouling resistance of the paint film will also be insufficient. If the blocked isocyanate compound is used in excess, no commensurate increase in the effect will be obtained and, moreover, because of the high proportion of the blocked isocyanate compound contained, the strength and hardness of the paint film, processability, and other physical characteristics designed based on the physical properties of polyol resin (a1) will not be obtained and the acid resistance and alkali resistance of the paint film will also be decreased. Moreover, the paint film tends to undergo yellowing and its weather resistance tends to be adversely affected. The still more preferred proportion is 1.0–1.2 equivalents.

When the above-mentioned isocyanate compound or blocked isocyanate compound is used as said curing agent (a2), it is generally preferable to add a known tin compound or a known metal chelate compound as the catalyst for promoting its reaction with said polyol resin (a1).

The tin compound mentioned above includes but is not limited to organotin compounds such as dibutyltin laurate, dibutyltin octoate, dibutyltin diacetate, and so forth. The above-mentioned metal chelate compound is not restricted in kind, either, but includes aluminum tris(acetylacetonate), titanium tetrakis(acetylacetonate), titanium bis (acetylacetonate), titanium bis(butoxy)-bis(acetylacetonate), titanium bis(isopropoxy)bis-(acetylacetonate), zirconium bis(butoxy)bis(acetylacetonate), zirconium bis(isopropoxy) bis(acetylacetonate), and so forth. Among them, tin compounds are preferred.

The amino resin mentioned above is not particularly restricted in kind but includes melamine resin, guanamine resin, glycolylurea resin, and urea resin, among others. While the melamine resin is generally groupified into high-imino alkyl etherified melamine resin, methylol type alkyl-etherified melamine resin, alkyl-etherified melamine resin, and mixed alkyl-etherified melamine resin, any of those kinds of melamine resins can be used selectively according to the baking temperature and the physical properties of the paint film. Since imino- or methylol-containing melamine resins generally detract from water resistance, it is preferable to select an alkyl-etherified melamine resin or a mixed alkyl-etherified melamine resin from the standpoint of water resistance. The alkyl ether melamine resin and mixed alkyl-etherified melamine resin are advantageous not only in that the shelf-life of the coating composition is satisfactory but also in that because the melamine resin has been made hydrophobic, this resin is distributed in the superficial layer of the paint film to increase the density of crosslinks in the superficial layer and thereby inhibit penetration of foulants into the inner layer of the coat, thus realizing enhanced fouling resistance.

The alkyl-etherified melamine resin mentioned above includes butylolmelamine resins as etherified by n-butyl, i-butyl, or the like, methylolmelamine resins as etherified by methyl, and methylol/butylolmelamine resins as mix-etherified by methyl, n-butyl, and i-butyl groups. As such resins, commercial resins can be used.

The guanamine resin mentioned above includes various commercial resins such as Cymel 1123 and 1128, Mycoat 105, etc. (benzoguamine resins, Mitsui Cytech).

The glycolylurea resin mentioned above includes various commercial resins such as Cymel 1170, 1171, and 1172 (Mitsui-Cytech).

The urea resin mentioned above includes but is not limited to such commercial products as UFR 65,300 (Mitsui Cytech).

When the above-mentioned amino resin is used as said curing agent (a2), its formulating amount may be just sufficient to provide alkoxy groups at least equivalent to the hydroxyl value of said polyol resin (a1), and generally the preferred [polyol resin (a1)]/[amino resin] ratio is 9/5 through 5/5 by weight. More preferably, the ratio is 8/2 through 6/4 by weight.

When the amino resin is used as said curing agent (a2), it is necessary to employ (E) an catalyst which promotes the reaction of the resin with said polyol resin (a1). The catalyst (E) is preferably an acid catalyst. The acid catalyst mentioned just above is not particularly restricted but includes aromatic sulfonic acids such as dodecylbenzenesulfonic acid, p-toluenesulfonic acid, dinonylnaphthalenesulfonic acid, etc., inclusive of their salts; organic phosphates; and organic phosphonic acids such as aminotri (methylenephosphonic acid), 1-hydroxyethylidene-1,1-diphosphonic acid, etc. and their amine salts. Particularly preferred are aromatic sulfonic acids and aromatic sulfonic acid amine salts. The preferred counter cation for such an acid catalyst is an amine.

The preferred formulating amount of said acid catalyst is generally 0.5–3 parts by weight with respect to 100 parts by weight of said polyol resin (a1) and amino acid compound combined. If the amount of the catalyst is less than 0.5 part by weight, the paint film will not have sufficient hardness but be too soft and fragile and, in addition, the acid resistance, alkali resistance, and fouling resistance of the film will also be insufficient. If the catalyst is used in excess of 3 parts by weight, no commensurate enhancement of the effect will be obtained.

3. Room-temperature Setting Resin

The room-temperature setting resin is not particularly restricted in kind but is preferably a polyol resin (a3). This polyol resin is used in combination with an isocyanate curing agent (a4) reactive therewith.

The polyol resin (a3) is preferably a polyol resin having a hydroxyl value of 5–300 mg KOH/g. If the hydroxyl value is less than 5 mg KOH/g, the number of available reactive curing groups is too few to insure adequate hardness. On the other hand, if the OH value exceeds 300 mg KOH/g, the resulting coat will contain many residual hydrophilic groups which detract from the water resistance, acid resistance, and alkali resistance of the paint film. The still more preferred hydroxyl value is 30–200 mg KOH/g.

The above polyol resin (a3) is preferably a polyol resin having a number average molecular weight of 500–20000. If the number average molecular weight is less than 500, the mechanical strength of the paint film will be insufficient. If it exceeds 20000, the viscosity of the coating composition will become too high to insure satisfactory coatability. The still more preferred molecular weight range is 1800–20000.

The above-mentioned polyol resin (a3) is not particularly restricted but includes the polyol resin (a1) mentioned as an example of said thermosetting resin. Particularly, acrylic polyol resin, polyester polyol resin, fluorine-containing polyol resin, or silicon-containing polyol resin is preferred. Those polyol resins can be used each alone or in combination.

The isocyanate curing agent (a4) mentioned above is an isocyanate compound not masked by any blocking agent. If a blocked isocyanate compound is used as said curing agent (a4), the paint cannot be cured at room temperature. The above-mentioned isocyanate compound not masked by a blocking agent is not particularly restricted but includes the species mentioned as examples of said curing agent (a2).

The film-forming resin (A) may contain, where necessary, a pigment component such as a color pigment, an extender pigment, and/or a rust-inhibitor pigment.

The inorganic binder (B) for use in the present invention is a binder containing SiOH or SiOR as a reactive curing group and, as such, capable of forming a Si—O—Si bond on hydrolysis and condensation to give a crosslinked film.

The above-mentioned inorganic binder (B) is at least one member selected from the group consisting of an organoalkoxysilane compound (B-1), a partial hydrolyzed condensate (B-2) of said organoalkoxysilane compound (B-1), a tetrafunctional alkoxysilane compound (B-3), a partial hydrolyzed condensate (B-4) of said tetrafunctional alkoxysilane compound (B-3), and a siloxane polymer (B-5).

The organoalkoxysilane compound (B-1) mentioned above is represented by the following general formula (1):

$$R^1_a\text{—Si}(OR^2)_{4-a} \quad (1)$$

wherein $R^1$ represents a $C_{1-10}$ alkyl group, a $C_{2-11}$ epoxyalkyl group, a $C_{6-12}$ aryl group, a $C_{2-11}$ alkenyl group, a $C_{7-11}$ aralkyl group, a $C_{2-4}$ acyl group, a $C_{1-5}$ aminoalkyl group, a $C_{1-5}$ mercaptoalkyl group, or a $C_{1-5}$ haloalkyl group; $R^2$ represents a $C_{1-10}$ alkyl group or a $C_{2-4}$ acyl group; a is equal to 1, 2, or 3.

Thus, $R^1$ represents a $C_{1-10}$ alkyl group, a $C_{2-11}$ epoxyalkyl group, a $C_{6-12}$ aryl group, a $C_{2-11}$ alkenyl group, a $C_{7-11}$ aralkyl group, a $C_{2-4}$ acyl group, a $C_{1-5}$aminoalkyl group, a $C_{1-5}$ mercaptoalkyl group, or a $C_{1-5}$ haloalkyl group.

The $C_{1-10}$ alkyl group mentioned above includes but is not limited to acyclic (linear) alkyl groups such as methyl, ethyl, propyl, n-butyl, etc. and cyclic alkyl groups such as cyclopentyl, cyclohexyl, and so forth. Particularly preferred are methyl, ethyl, and n-butyl, in view of their higher reactivity for hydrolysis and condensation.

The $C_{2-11}$ epoxyalkyl group mentioned above includes but is not limited to said γ-glycidoxypropyl and 3,4-epoxycyclohexyl. The $C_{6-12}$ aryl group includes but is not limited to phenyl, tolyl, and xylyl. The $C_{2-11}$ alkenyl group includes but is not limited to vinyl, allyl, γ-acryloyloxypropyl, and γ-methacryloyloxypropyl. The $C_{7-11}$ aralkyl group includes but is not limited to benzyl.

The $C_{2-4}$ acyl group includes but is not limited to acryloyl, methacryloyl, formyl, acetyl, and propionyl. The $C_{1-5}$ aminoalkyl group includes but is not limited to γ-aminopropyl. The $C_{1-5}$ mercaptoalkyl group includes but is not limited to γ-mercaptopropyl. The $C_{1-5}$ haloalkyl group includes but is not limited to γ-chloropropyl.

$R^1$ can be judicially selected in consideration of the desired physical properties of the paint film as well as reactivity. When, for example, inhibition of cracking and/or increase of alkali resistance is desired, phenyl can be selected for R1 as is generally practiced. Usually, $R^1$ is methyl or ethyl, and methyl is universely selected from the standpoint of reactivity.

$R^2$ represents an alkyl group of 1–10 carbon atoms or an acyl group of 2–4 carbon atoms. The $C_{1-10}$ alkyl group mentioned just above includes but is not limited to the species mentioned as examples of $R^1$ above. Particularly, methyl, ethyl, or n-butyl is preferred. The $C_{2-4}$ acyl group mentioned above is not particularly restricted but includes the species mentioned as examples of $R^1$, among others.

In consideration of hydrolyzability and condensibility, methyl or ethyl is generally selected for $R^2$, with methyl being the most universal choice.

The above symbol a represents 1, 2, or 3, although 1 is preferred. When a represents 1, the above-mentioned organoalkoxysilane compound (B-1) is a trifunctional organoalkoxysilane which has satisfactory hydrolyzability and condensibility. On the other hand, when a represents 2 or 3, the organoalkoxysilane compound (B-1) is a bifunctional or monofunctional organoalkoxysilane compound. In this case, because of fewer alkoxysilyl groups taking part in the reaction, the hydrolyzability and condensibility are comparatively low.

The organoalkoxysilane compound (B-1) which corresponds to the case of a=1 includes but is not limited to methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane, phenyltrimethoxysilane, phenyltriethoxysilane, vinyltrimethoxysilane, γ-glycidoxypropyltrimethoxysilane, γ-glycidoxypropyltriethoxysilane, γ-mercaptopropyltrimethoxysilane, γ-methacryloxytrimethoxysilane, γ-aminopropyltrimethoxysilane, and 3,4-epoxycyclohexylethyltrimethoxysilane. Particularly preferred is methyltrimethoxysilane or ethyltrimethoxysilane. Those organoalkoxysilanes can be used each alone or in combination.

All of said organoalkoxysilane compounds (B-1) are monomers and, as such, liable to undergo hydrolysis and condensation when included in a one-package coating system. Therefore, they must be kept separate from the catalyst component in the form of a two-package coating system. However, a two-package system is inferior in workability, for one has to wait, after mixing of the components, until the necessary hydrolysis-condensation reaction has gone to completion. To overcome this disadvantage, the monomeric organoalkoxysilane compound (B-1) can be partially hydrolyzed and condensed beforehand. The product of such reaction is the partial hydrolyzed condensate (B-2).

The partial hydrolyzed condensate (B-2) mentioned above is not particularly restricted only if it has been produced by partial hydrolysis and condensation of said organoalkoxysilane (B-1). This hydrolysis-condensation reaction can be carried out by a known procedure, e.g. by adding calculated amounts of water and a catalyst to at least one species of said organoalkoxysilane compound (B-1).

The tetrafunctional alkoxysilane compound (B-3) mentioned above is a compound of the following general formula (2):

$$\text{Si}(OR^3)_4 \quad (2)$$

wherein $R^3$ represents an alkyl group of 2–10 carbon atoms or an acyl group of 2–4 carbon atoms.

$R^3$ represents a $C_{2-10}$ alkyl group or a $C_{2-4}$ acyl group. This $C_{2-10}$ alkyl-group includes but is not limited to ethyl, propyl, and n-butyl. Particularly, ethyl or n-butyl is preferred. When $R^3$ is methyl, the condensation reactivity is so high that when the compound is used as a binder component, the paint film tends to develop cracks and is deficient in acid and alkali resistance. The $C_{2-4}$ acyl group mentioned above includes but is not limited to the species mentioned as examples of $R^1$.

The above-mentioned tetrafunctional alkoxysilane compound (B-3) includes but is not limited to tetraethoxysilane, tetrapropoxysilane, and tetrabutoxysilane. In particular, tetraethoxysilane is preferred.

The tetrafunctional alkoxysilane compound (B-3) is a monomer and therefore, as it is the case of said organoalkoxysilane compound (B-1), cannot be formulated in a one-package coating system but must be provided only in a two-package system. In order that it may be used in a one-package system, the tetrafunctional alkoxysilane compound (B-3) must be partially hydrolyzed and condensed as in the case of said organoalkoxysilane compound (B-1). The product of such hydrolysis-condensation reaction is the above-mentioned partial hydrolyzed condensate (B-4).

The above-mentioned partial hydrolyzed condensate (B-4) can be prepared from said tetrafunctional alkoxysilane compound (B-3) by a known procedure. A typical procedure comprises adding a calculated amount of water and a catalyst, optionally as well as an organic solvent, to at least one species of tetrafunctional alkoxysilane compound (B-3) and removing the byproduct alcohol formed on hydrolysis-condensation. As an alternative, the tetrafunctional alkoxysilane compound (B-3) is first precondensed to prepare an oligomer which is then subjected to a further reaction.

The water for the hydrolysis reaction is not particularly restricted in kind but since residual ions and other impurities occurring in a coating composition generally tend to adversely affect the properties of the paint film, it is preferable to use deionized water, pure water, or ultrapure water depending on the required physical properties of the paint film.

The above-mentioned catalyst is not particularly restricted but includes inorganic acids such as hydrochloric acid, sulfuric acid, nitric acid, phosphoric acid, etc.; organic acids such as carboxylic acids, sulfonic acids; and inorganic or organic bases such as ammonia, sodium hydroxide, amines, and so forth.

The solvent mentioned above is not restricted, either, but includes various organic solvents such as alcohols, ethers, and ketones.

The partial hydrolyzed condensate (B-4) thus prepared is a mixture of the monomer, dimer, trimer, and polymer. However, the monomer, if included, will not only detract from the storage stability of the very partial hydrolyzed condensate (B-4) but adversely affect the shelf-life of the coating composition. Moreover, the monomer is considered to decrease the water resistance, acid resistance, alkali resistance, and crack resistance of the paint film. Therefore, the monomer should be removed, by a known procedure, for instance.

The quantity of water required for the production of said partial hydrolyzed condensate (B-4) is dependent on the desired hydrolysis degree. The hydrolysis degree may generally range from 0 to 100%. Theoretically, the hydrolysis degree necessary for preparing the partial hydrolyzed condensate (B-4) is 0%<(hydrolysis degree)<100%. The condensate with a hydrolysis degree of 100% is a solid $SiO_2$, the condensate with a hydrolysis degree of 70% or more is a gelatinous gel or solid, and the condensate with a hydrolysis degree of 65–70% is a highly viscous fluid which reacts with even a small amount of moisture in the atmosphere to form a gel, thus causing poor storage stability. The preferred partial hydrolyzed condensate is a compound with a hydrolysis degree of about 30–60%. However, even a condensate with a hydrolysis degree close to 100% may show satisfactory storage stability when a suitable solvent is used. Therefore, the hydrolysis degree is not necessarily restricted to the preferred range mentioned above.

When the hydrolysis degree of the condensate is close to 100%, its storage stability can be improved typically by allowing the alcohol or other organic solvent used to remain after completion of the hydrolysis-condensation reaction and thereby maintaining the partial hydrolyzed condensate in a diluted condition. When the partial hydrolyzed condensate is so diluted with said organic solvent, it may be a compound with a hydrolysis degree between 20% and 100%. If the hydrolysis degree is less than 20%, the unwanted monomer tends to remain as a contaminant.

The preferred partial hydrolyzed condensate (B-4) is a partial hydrolyzed condensate of tetraethoxysilane. The reasons are as follows.

1) When a partial hydrolyzed condensate of tetramethoxysilane, for instance, is used as the binder component, the high condensation reactivity of the methoxy group results in an increased incidence of cracking and decreases in chemical resistance, such as acid resistance and alkali resistance.

2) When a partial hydrolyzed condensate of a tetraalkoxysilane containing a greater number of carbon atoms than tetraethoxysilane, such as tetrapropoxysilane or tetrabutoxysilane, is used as the binder component, the rate of hydrolysis-condensation is decreased to retard the curing and drying of the paint, thus being of poor practical utility. Moreover, when the paint film has not been sufficiently cured, unreacted alkoxysilyl groups undergo hydrolytic condensation during exposure to weather to cause cracking.

The preferred $SiO_2$ content of the tetraethoxysilane partial hydrolyzed condensate is 40%. There are commercial products with a $SiO_2$ content of 40%. For example, ES-40 (Colcoat), Silicate 40 (Tama Chemical), TES40 (Hoechst), Silbond 40 (Stoffer), Ethyl Silicate 40 (Union Carbide), etc. can be mentioned. Those commercial products are oligomers, including the monomer, dimer, trimer, and polymers. Since products rich in a monomer and other low molecular weight fraction may cause deleterious effects on the coating composition and paint film as mentioned above, it is preferable to select a product lean in such a low molecular weight fraction. It is also possible to use a condensate obtained by carrying out the hydrolytic condensation further in the known manner.

The above-mentioned partial hydrolyzed condensate (B-4) may contain many SiOH groups, which are reactive curing groups, and many SiOR groups, which are their precursors. The number of the reactive curing groups is overwhelmingly large as compared with dry silica, e.g. fumed silica, or wet silica, e.g. silica sols, which are conventionally used in coating compositions. The preferred proportion of said reactive curing groups in the partial hydrolyzed condensate (B-4), taking the tetraethoxysilane partial hydrolyzed condensate as an example, is 0.1–3 moles per mole of Si element. The still more preferred proportion is 0.5–2.7 moles.

Meanwhile, the available number of SiOH groups, which are reactive curing groups, may be reckoned taking the number of SiOR groups into account. The reason is as follows.

The relative amount of said SiOH and SiOR groups depends on the species of monomer used, the degree of hydrolysis-condensation, the kind of solvent used in the hydrolysis-condensation reaction, and the kind of solvent used for dilution after condensation. For example, when an alcohol series solvent is used as a dilution solvent after condensation, the SiOH group undergoes alcohol exchange reaction with the alkoxyl group of the solvent to become a SiOR group. However, since the SiOR group is capable of regenerating the reactive curing SiOH group on hydrolysis, both SiOR and SiOH can be reckoned as reactive curing groups.

When a tetraethoxysilane partial hydrolyzed condensate is selected as said partial hydrolyzed condensate (B-4) and suspended in isopropyl alcohol, the amount of reactive curing groups available per mole Si atom after 2 days of hydrolysis, as deduced from $^1$H-NMR integration data and CHN analysis data, is SiOH=0.72±0.13 mole, SiOEt (Et=ethyl)=0.64±0.12 mole, and SiO-iPr (iPr=isopropyl)=0.30±0.06 mole. On the other hand, in the case of dry silica (Aerosil 200, particle diameter ca 100 Å, Japan Aerosil), the amount of SiOH/mole Si atom is $2\times10^{-5}$ mole and the corresponding value for silica sol (Snowtex O, particle diameter ca 100 Å, Nissan Chemical) is $4\times10^{-5}$ mole SiOH/mole Si atom.

The number of reactive curing groups changes slightly with time. However, the amount of the reactive curing group per mole of Si atom after 60 days of standing at room temperature following hydrolysis is SiOH=0.4 mole, SiOEt=0.36 mole, and SiO—iPr=0.17 mole. Thus, this partial hydrolyzed condensate is superior in storage stability.

It is, thus, clear that unlike silica which is generally used in coating compositions, the partial hydrolyzed condensate (B-4) contains a remarkably large number of reactive curing groups. Those functional groups react with each other or with other components in the coating system in the curing stage.

The siloxane polymer (B-5) mentioned above is a polymer in which a substituent group of the following general formula (3):

$$R^4{}_b\text{—Si}[(OR^5)_{3-b}]\text{—O—} \quad (3)$$

(wherein $R^4$ represents an alkyl group of 1–10 carbon atoms, an epoxyalkyl group of 2–11 carbon atoms, an aryl group of 6–12 carbon atoms, an alkenyl group of 2–11 carbon atoms, an aralkyl group of 7–11 carbon atoms, an acyl group of 2–4 carbon atoms, an aminoalkyl group of 1–5 carbon atoms, a mercaptoalkyl group of 1–5 carbon atoms, or a haloalkyl group of 1–5 carbon atoms; $R^5$ represents an alkyl group of 1–10 carbon atoms or an acyl group of 2–4 carbon atoms; b represents 0, 1, 2, or 3)
and/or a substituent group of the following general formula (4):

$$R^6O\text{—} \quad (4)$$

(wherein $R^6$ represents an alkyl group of 1–10 carbon atoms or an acyl group of 2–4 carbon atoms)
has been attached to the Si atom of the backbone chain.

The substituent group attached to said Si atom of the backbone chain is at least one member selected from the group consisting of substituent groups of the above general formula (3) and substituent groups of the above general formula (4). $R^4$, above, represents an alkyl group of 1–10 carbon atoms, an epoxyalkyl group of 2–11 carbon atoms, an aryl group of 6–12 carbon atoms, an alkenyl group of 2–11 carbon atoms, an aralkyl group of 7–11 carbon atoms, an acyl group of 2–4 carbon atoms, an aminoalkyl group of 1–5 carbon atoms, a mercaptoalkyl group of 1–5 carbon atoms, or a haloalkyl group of 1–5 carbon atoms.

The above-mentioned alkyl group of 1–10 carbon atoms includes but is not limited to the species mentioned for $R^1$. Particularly preferred is methyl, ethyl, or n-butyl. The epoxyalkyl group of 2–11 carbon atoms includes but is not limited to the species mentioned for $R^1$. The aryl group of 6–12 carbon atoms includes but is not limited to the species mentioned for $R^1$. The alkenyl group of 2–11 carbon atoms includes but is not limited to the species mentioned for $R^1$.

The aralkyl group of 7–11 carbon atoms includes but is not limited to the species mentioned for $R^1$. The acyl group of 2–4 carbon atoms includes but is not limited to the species mentioned for $R^1$. The aminoalkyl group of 1–5 carbon atoms includes but is not limited to the species mentioned for $R^1$. The mercaptoalkyl group of 1–5 carbon atoms includes but is not limited to the species mentioned for $R^1$. The haloalkyl group of 1–5 carbon atoms includes but is not limited to the species mentioned for $R^1$.

$R^5$ represents an alkyl group of 1–10 carbon atoms or an acyl group of 2–4 carbon atoms. This alkyl group of 1–10 carbon atoms includes but is not limited to the species mentioned for $R^1$. The acyl group of 2–4 carbon atoms includes but is not limited to the species mentioned for $R^1$.

The substituent group of the above general formula (4) is converted to an alkoxysilyl group on attachment to the Si atom of the backbone chain. $R^6$, above, represents an alkyl group of 1–10 carbon atoms or an acyl group of 2–4 carbon atoms. This alkyl group of 1–10 carbon atoms includes but is not limited to the species mentioned for $R^1$. Particularly preferred is methyl, ethyl, or n-butyl. The acyl group of 2–4 carbon atoms, mentioned just above, also includes but is not limited to the acyl groups mentioned for $R^1$.

The siloxane polymer (B-5) in which at least one member selected from the group consisting of substituent groups of the above general formula (3) and substituent groups of the above general formula (4) has been attached to the Si atom of its backbone chain can be typically synthesized by hydrolysis-condensation of an organoalkoxysilane monomer.

The hydrolysis-condensation reaction of an organoalkoxysilane monomer gives rise to an organopolysiloxane. Thus, for example, the organoalkoxysilane monomer is first provided, and where necessary, a water-soluble organic solvent is added. Then, colloidal alumina and, where necessary, water, a stabilizer, etc. are added and the mixture is heated at a temperature between about 20° C. and the reflux temperature of the system, preferably at 50–80° C., for about 30 minutes to 20 hours to complete the hydrolysis-condensation reaction.

The organoalkoxysilane monomer mentioned above includes but is not limited to methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane, phenyltrimethoxysilane, phenyltriethoxysilane, vinyltrimethoxysilane, γ-glycidoxypropyltrimethoxysilane, γ-glycidoxypropyltriethoxysilane, γ-mercaptopropyltrimethoxysilane, γ-methacryloxytrimethoxysilane, γ-aminopropyltrimethoxysilane, and [β(3,4-epoxycyclohexyl)ethyl]trimethoxysilane.

The above-mentioned water-soluble organic solvent is not particularly restricted but includes alcohol series solvents, cellosolve series solvents, and cellosolve acetate series solvents, among others.

The hydrolysis-condensation reaction of said organoalkoxysilane monomer is well known and, as disclosed in Japanese Kokai Publication Hei-3-126780 inter alia, can be represented by the following reaction schema [(i)–(iii)]. From the schema, it can be understood that the theoretical amount of water necessary to hydrolyze all the available SiOR groups is 1. 5 moles per mole of said organoalkoxysilane monomer.

$$RSi(OR')_3 + 3H_2O \leftrightarrows RSi(OH)_3 + 3R'OH \qquad (i)$$

$$nRSi(OR')_3 \leftrightarrows (RSiO_{1.5})_n + 1.5nH_2O \qquad (ii)$$

Thus, $$nRSi(OR')_3 + 1.5nH_2O \leftrightarrows (RSiO_{1.5})_n + 3nR'OH \qquad (iii)$$

In the reaction described in the above Japanese Kokai Publication Hei-3-126789, the above-mentioned amount of water is preferably 1.0–4.0 moles per mole of the organoalkoxysilane monomer. If it is less than 1.0 mole, many alkoxysilyl groups remain unreacted and the coating composition may not cure sufficiently on the substrate surface, with the result that the adhesion between the coat and the substrate will be poor and the hardness of the paint film will also be insufficient. If the amount of water exceeds 4.0 moles, the existence of an excess of water in the reaction system will make it difficult to control the reaction and the storage stability of the solution will also be adversely affected.

As the water mentioned above, the water contained in said colloidal alumina is chiefly utilized. However, where necessary, tap water, distilled water, or deionized water is added so as to adjust the available amount of water. Preferably, distilled water and deionized water are added.

The resulting siloxane polymer is preferably a polymer with a molecular weight of about 3000–50000. The molecular weight mentioned above is a value measured by gel permeation chromatography and calculated by the polystyrene method. The still more preferred molecular weight is 4000–30000.

As the siloxane polymer (B-5), commercially available organopolysiloxanes can be utilized. For example, KR31-B2681 (Toshiba Silicone) and NR-02C (Toray-Dow) can be mentioned.

In the raindrop fouling-resistant paint film according to the present invention, the following ingredients can be added to said inorganic binder (B).

(D-1): an alkoxysilyl-containing vinyl resin having an alkoxysilyl group of the following general formula (5) either at the terminal or in the side chain of a vinyl polymer and an alkoxysilyl equivalent of not less than 300:

$$R^7{}_c-Si[(OR^8)_{3-c}]- \qquad (5)$$

wherein $R^7$ represents an alkyl group of 1–5 carbon atoms, an aryl group of 6–12 carbon atoms, an aralkyl group of 7–11 carbon atoms, or an acyl group of 2–4 carbon atoms; $R^8$ represents an alkyl group of 1–10 carbon atoms or an acyl group of 2–4 carbon atoms; c represents 0, 1, 2, or 3.

(D-2) at least one metal alkoxide selected from the group consisting of titanium tetraalkoxides and zirconium tetraalkoxides.

(D-3) a hydrolyzed condensate of said metal alkoxide (D-2)

(D-4) silica sol (D-5) alumina sol.

These additives can be used each alone or in combination.

The above alkoxysilyl-containing vinyl resin (D-1) is a vinyl polymer having an alkoxysilyl group of the general formula (5) at its terminal or as a side chain. In the formula, $R^7$ represents an alkyl group of 1–5 carbon atoms, an aryl group of 6–12 carbon atoms, an aralkyl group of 7–11 carbon atoms, or an acyl group of 2–4 carbon atoms. The $C_{1-5}$ alkyl group mentioned just above includes methyl, ethyl, propyl, isopropyl, n-butyl, pentyl, etc.

The $C_{6-12}$ aryl group mentioned above includes but is not limited to the aryl groups mentioned for $R^1$. The $C_{7-11}$ aralkyl group also includes but is not limited to the aralkyl groups mentioned for $R^1$. The $C_{2-4}$ acyl group mentioned above includes but is not limited to the acyl groups mentioned for $R^1$.

In the formula, $R^8$ represents an alkyl group of 1–10 carbon atoms or an acyl group of 2–4 carbon atoms. The $C_{1-10}$ alkyl group mentioned above includes but is not limited to the alkyl groups mentioned for $R_1$. The $C_{2-4}$ acyl group also includes but is not limited to the acyl groups mentioned for $R^1$.

The above alkoxysilyl-containing vinyl resin (D-1) can be produced by the known technology, for example 1) a process which comprises copolymerizing an acryloxy functional silane with a radical-polymerizable monomer or 2) a process which comprises reacting a hydrosilane compound of the following general formula (10) with a vinyl polymer containing a carbon-carbon double bond.

Those processes are now described in the order mentioned.

$$HSi-(R^{14})_{3-b} \atop | \atop (R^{13})_h \qquad (10)$$

where $R^{13}$ represents an alkoxy group; $R^{14}$ represents a hydrogen atom or an organic group containing 1–8 carbon atoms; h represents an integer of 1 to 3, inclusive.

Referring to the above process 1), it should be understood that if the product alkoxysilyl-containing vinyl resin (D-1) is rich in alkoxysilyl functionality, not only the shelf-life of the coating composition will be sacrificed but the residual alkoxysilyl groups after curing undergo hydrolysis-condensation with time to cause cracking of the paint film. Therefore, such a resin can hardly be used as a binder component. Therefore, it is preferable to synthesize the resin (D-1) using a reduced proportion of the acryloxy-functional silane so that the alkoxysilyl equivalent of the product alkoxysilyl-containing vinyl resin (D-1) will be not less than 300.

The above process 2) comprises reacting a hydrosilane compound of general formula (10) with a carbon-carbon double bond-containing vinyl polymer. In the formula, $R^{13}$ represents an alkoxy group and $R^{14}$ represents a hydrogen atom or an organic group of 1–8 carbon atoms. The symbol h represents an integer of 1–3, inclusive.

The hydrosilane compound of general formula (10) is not particularly restricted but includes, among others, halogenated silane compounds such as methyldichlorosilane, ethyldichlorosilane, phenyldichlorosilane, trichlorosilane, etc.; alkoxysilane compounds such as methyldimethoxysilane, methyldiethoxysilane, ethyldimethoxysilane, ethyldiethoxysilane, phenyldimethoxysilane, trimethoxysilane, triethoxysilane, etc.; acyloxysilane compounds such as methyldiacetoxysilane, phenyldiacetoxysilane, triacetoxysilane, etc.; and aminosilane compounds such as methyldiaminooxysilane, triaminooxysilane, triaminosilane, and so forth. Those compounds can be used each alone or in combination.

The carbon-carbon double bond-containing vinyl polymer is not particularly restricted but includes the vinyl polymers obtainable by reacting various vinyl compounds, e.g. acrylic acid, methacrylic acid, mono(meth)acrylate monomers such as methyl (meth)acrylate, ethyl (meth)acrylate, t-butyl (meth)acrylate, isobutyl methacrylate, glycidyl methacrylate, dimethylaminoethyl methacrylate, methoxydiethylene glycol mono(meth)acrylate, methoxytetraethylene glycol mono(meth)acrylate, allyl acrylate, etc.; di(meth)acrylate monomers such as ethylene glycol di(meth)acrylate, diethylene glycol di(meth)acrylate, 1,3-butylene glycol di(meth)acrylate, etc.; tri(meth)acrylate monomers such as trimethylolpropane tri(meth)acrylate, trimethylolethane tri(meth)acrylate, etc.; tetra(meth)acrylate monomers such as tetramethylolmethane tetra(meth)acrylate, etc.; modified acrylate monomers; styrene, α-methylstyrene, vinyl chloride, vinyl acetate, etc., with conjugated diene compounds such as butadiene, isoprene, chloroprene, etc.; and vinyl polymers of said vinyl compounds with acrylic acid derivatives containing a carbon-carbon double bond not taking part in polymerization. Those vinyl polymers can be used either alone or in combination.

Referring to the above process 2), the alkoxysilyl-containing vinyl resin (D-1) can be obtained by subjecting said hydroxysilane compound and said carbon-carbon double bond-containing vinyl polymer to addition reaction in a suitable known manner.

As said alkoxysilyl-containing vinyl resin (D-1), commercial resins can be employed. Among such resins are Gemlac (KANEKA CORPORATION), Sylyl (Toshiba Silicone), and Silakote SC8101 (Chisso Corporation).

The above-mentioned alkoxysilyl-containing vinyl resin (D-1) has an alkoxysilyl equivalent of not less than 300. The term "alkoxysilyl equivalent" means the weight (g) of the resin per mole of the alkoxysilyl group. If the alkoxysilyl equivalent is less than 300, Si—O—Si and Si—O—C bonds tend to form on curing so that although a sufficient film hardness can be obtained, the acid resistance and alkali resistance of the paint film are sacrificed. Furthermore, because of the presence of an excessive number of alkoxysilyl groups, the coating composition tends to undergo gelation on exposure to moisture and, after cure, is liable to develop troubles such as cracking.

When said alkoxysilyl-containing vinyl resin (D-1) is added to said inorganic binder (B), a polymer can be formed by causing the resin (D-1) to undergo hydrolytic condensation with said inorganic binder (B). This method is advantageous particularly when at least one member selected from the group consisting of said organoalkoxysilane compound (B-1), said tetrafunctional alkoxysilane compound (B-3), and said siloxane polymer (B-5) is employed. Water is necessary for the hydrolysis-condensation reaction. The preferred proportion of water is generally 1.0–4.0 moles per mole of the alkoxysilyl group contained in said inorganic binder (B) and alkoxysilyl-containing vinyl resin (D-1). If the proportion of water is less than 1.0 mole, the number of residual alkoxysilyl groups is increased and when the coating composition is applied to a substrate surface, no sufficient cure may be obtained and the film-substrate adhesion and hardness will be sacrificed. If the proportion of water exceeds 4.0 moles, the presence of excess water in the reaction system will make the reaction hardly controllable, with the result that the shelf-life of the coating composition will be decreased.

When at least one of the partial hydrolyzed condensate (B-2) of organoalkoxysilane compound (B-1) and the partial hydrolyzed condensate (B-4) of tetrafunctional alkoxysilane compound (B-3) is employed, said alkoxysilyl-containing vinyl resin (D-1) can be simply blended with said inorganic binder (B). In this case, the resulting coating composition is chiefly of the two-package type and the objective film is formed as the hydrolysis-condensation reaction takes place in the course of film formation under heating.

The preferred addition level of said alkoxysilyl-containing vinyl resin (D-1) is 1–100 parts by weight relative to each 100 parts by weight of said inorganic binder (B) on a nonvolatile matter basis. If the proportion of (D-1) is less than 1 part by weight, the resulting paint film will not be fully satisfactory in chemical resistance and, when a thick coat is formed, it will tend to develop cracks. On the other hand, if more than 100 parts by weight of (D-1) is used, not only the scratch resistance, heat resistance, and shelf-life will be sacrificed but the water-repellency of the paint film will be enhanced so that despite inclusion of said tetramethoxysilane partial hydrolyzed condensate (I) in said inorganic binder (B), the effect of imparting hydrophilicity will hardly be expressed.

The metal alkoxide (D-2) mentioned hereinbefore is at least one member selected from the group consisting of titanium tetraalkoxides and zirconium tetraalkoxides. The metal alkoxide (D-2) undergoes hydrolysis in the presence of water and the resulting hydrolyzate undergoes polycondensation to yield a partial polycondensate. When this polycondensate further gains in molecular weight, it hardens under the influence of heat to function as a binder together with said inorganic binder (B).

The titanium tetraalkoxide mentioned above is not particularly restricted but includes titanium tetraethoxide, titanium tetra-n-propoxide, titanium tetra-i-propoxide, titanium tetra-n-butoxide, titanium tetra-sec-butoxide, and titanium tetra-t-butoxide, among other tetraalkoxides. Those compounds can be used each alone or in combination.

The zirconium tetraalkoxide mentioned above is not particularly restricted, either, but includes zirconium tetraethoxide, zirconium tetra-n-propoxide, zirconium tetra-i-propoxide, zirconium tetra-n-butoxide, zirconium tetra-sec-butoxide, and zirconium tetra-t-butoxide, among other tetraalkoxides. Those compounds can be used each alone or in combination.

The above-mentioned metal alkoxide (D-2) undergoes rapid hydrolysis to release the corresponding alcohol to give either titanium hydroxide or zirconium hydroxide. Upon this formation of the hydroxide, a polycondensation reaction involving the substituent hydroxyl group occur to give a partial polycondensate and as the polycondensation reaction proceeds further, titania or zirconia is produced as an ultimate polycondensate. The hydrolysis reaction of said metal alkoxide (D-2) is extremely rapid and proceeds even on exposure to atmospheric moisture, thus undergoing condensation. The above-mentioned hydrolyzed condensate (D-3) comprises a partial hydrolyzed condensate so formed or a complete hydrolyzed condensate ultimately formed, and may be whichever of the compound produced in situ from said metal alkoxide (D-2) within said inorganic binder (B) or the compound separately prepared by subjecting said metal alkoxide (D-2) to hydrolysis-polycondensation reaction ahead of time.

When said metal alkoxide (D-2) and/or said hydrolyzed condensate thereof (D-3) is added to said inorganic binder (B) comprising at least one member selected from the group consisting of said organoalkoxysilane compound (B-1), tetrafunctional alkoxysilane compound (B-3), and said siloxane polymer (B-5), it is preferable to include said metal alkoxide (D-2) in the charge formulation for hydrolysis-condensation. On the other hand, when at least one member selected from the group consisting of said partial hydrolyzed condensate (B-2) of organoalkoxysilane compound (B-1) and the partial hydrolyzed condensate (B-4) of tetrafunctional alkoxysilane compound (B-3) is employed, whichever desired of said metal alkoxide (D-2) and said hydrolyzed condensate (D3) can be employed.

The preferred level of addition of said metal alkoxide (D-2) and/or said hydrolyzed condensate (D-3) is 2–100 parts by weight relative to each 100 parts by weight of said inorganic binder (B). If its proportion is less than 2 parts by weight, the film-forming property of the resulting coating composition will be unsatisfactory. If it exceeds 100 parts by weight, the hydrolysis reaction will be liable to take place to adversely affect the shelf-life of the coating composition. The preferred level of addition is 5–30 parts by weight.

In the present invention, said silica sol (D-4) is added to the inorganic binder (B) to relieve the stress on the cured film. This silica sol (D-4) can be added to the film-forming resin (A) as well, not only for relieving the stress but also for improving the chemical resistance and gloss of the paint film. The above-mentioned silica sol (D-4) is preferably an organosilica sol or water-dispersible silica sol with a particle diameter of 10–100 nm. The organosilica sol mentioned above is a colloidal solution in which isolated amorphous colloid particles are dispersed in water or an organic solvent. This colloidal solution generally contains 50 weight % or less of silica and is available in a particle diameter range up to 300 nm. In the present invention, an organosol with a particle diameter from 10 to 100 nm is preferred as mentioned above.

When the above-mentioned silica sol (D-4) is formulated with said inorganic binder (B), the SiOH and SiOR groups present on the particle surface react with each other in the presence of an acid, amine, or tin catalyst and water to thereby sacrifice the shelf-life of the coating composition. Therefore, in the present invention, it is preferable to use a silica sol such that its surface functional groups have been previously blocked. As the surface SiOH groups are blocked, the silica sol particles are rendered hydrophobic.

The degree of hydrophobicity of said silica sol particles is expressed as a hexane tolerance value, which is preferably 10–50 ml. If the hexane tolerance value is less than 10 ml, too many residual SiOH groups will be available so that the shelf-life of the coating composition cannot be improved. If 50 ml is exceeded, the reactivity will be too low to form a tough film so that no sufficient hardness or chemical resistance can be implemented.

Regarding the organosilica sol mentioned above, there are several commercially available products. For example, a sol prepared by using water as the medium (hydrophilic sol, Snowtex, Nissan Chemical) and also containing methanol as the medium (Methanol Silica Sol, Nissan Chemical; hydrophilic sol, hexane tolerance value 7.9 ml) as well as the sols mentioned as examples of said organosilica sol (C) can be used. Particularly preferred are organosilica sols prepared by using xylene/butanol as the medium and sols containing MIBK as the medium.

When a silica sol prepared by using methanol or xylene/butanol as the medium is used in the present invention, the sol is preferably treated with a silane coupling agent to impart hydrophobicity. This silane coupling treatment can be carried out typically by reacting 10–50 parts by weight of a silane coupling agent with 100 parts by weight of the organosilica sol. In the above-mentioned method, the level of addition of the silane coupling agent is preferably confined within the above-mentioned range. If it is less than 10 parts by weight, the storage stability of inorganic binder (B) and the chemical resistance and gloss of the paint film will not be improved. If the upper limit of 50 parts by weight is exceeded, the free coupling agent remains in the inorganic binder (B) to adversely affect the film properties such as hardness, water resistance, and moisture resistance.

Regarding the reaction conditions, it is sufficient to conduct the reaction at room temperature for one day. If it is desirable to accelerate the reaction to curtail the reaction time, the reaction may be carried out under moderate heating. The degree of heating should be controlled so as not to cause self-condensation of the silane coupling agent or a rapid increase in viscosity or gelation due to its abrupt reaction with the silica sol.

The silane coupling agent mentioned above is not particularly restricted but includes (γ-methacryloxypropyl)trimethoxysilane, vinyltrimethoxysilane, and (γ-glycidoxypropyl)trimethoxysilane, among others.

When said silica sol (D-4) is to be added to said inorganic binder (B), the kind of silica sol (D-4) is selected according to whether at least one member selected from the group consisting of said organoalkoxysilane compound (B-1), tetrafunctional alkoxysilane compound (B-3), and siloxane polymer (B-5) is used or at least one member selected from the group consisting of said partial hydrolyzed condensate (B-2) of organoalkoxysilane compound (B-1) and said partial hydrolyzed condensate (B-4) of tetraalkoxysilane compound (B-3) is used.

When at least one member selected from the group consisting of said organoalkoxysilane compound (B-1), tetrafunctional alkoxysilane compound (B-3) and siloxane polymer (B-5) is used, an aqueous colloidal silica is used as said silica sol (D-4). The aqueous colloidal silica has a low degree of hydrophobicity but capable of supplying the water necessary for the hydrolysis-condensation reaction with said organoalkoxysilane compound (B-1), tetrafunctional alkoxysilane compound (B-3) and/or siloxane polymer (B-5). This hydrolysis-condensation reaction can be carried out by any of the known methods described, for example, in Japanese Kokai Publication Sho-51-2736, Kokai Publication Sho-55-94971, and Kokai Publication Sho-59-68377. In this reaction, since all the necessary water is supplied by said colloidal silica, the amount of $SiO_2$ which can be use restricted and cannot be freely controlled.

In the coating composition thus obtained, the SiOR group of said inorganic binder (B) and the SiOH group of said colloidal silica have reacted with each other to form an integral bond.

On the other hand, when a silica sol containing a highly hydrophobic organic solvent is used as said silica sol (D-4), a certain amount of water for the hydrolysis-condensation reaction must be added to said inorganic binder (B) and silica sol. This hydrolysis-condensation reaction can be carried out by the known method.

When at least one of said partial hydrolyzed condensate (B-2) of organoalkoxysilane compound (B-1) and said partial hydrolyzed condensate (B-4) of tetrafunctional alkoxysilane compound (B-3) is used, the silica sol (D-4) need not be an aqueous silica sol but usually an organic solvent-based silica sol having comparatively high storage stability is used. The mixing of said partial hydrolyzed condensate with said organic solvent-based silica sol can be carried out by the known technology, for example the method described in Japanese Kokai Publication Sho-62-289279.

The preferred level of addition of said silica sol (D-4) is 5–100 parts byweight relative to 100 parts by weight of said inorganic binder (B) on a nonvolatile matter basis. If the amount of (D-4) is less than 5 parts by weight, only a thin film can be formed and the paint film is liable to develop cracks. On the other hand, if more than 100 parts by weight of silica sol (D-4) is added, the reduced relative proportion of the inorganic binder (B) leads to a decreased film strength and a poor adhesion of the paint to the substrate. The still more preferred level of addition is 10–30 parts by weight.

For use in the present invention, the alumina sol (D-5) mentioned hereinbefore is an alumina sol containing about 5–25 weight % of alumina, hydrated alumina, etc. and, as a dispersion stabilizer, an acid, e.g. hydrochloric acid, nitric acid, or acetic acid and is a sol generally prepared by using water as a dispersant and has a pH value of 2.0–6.0.

The mean particle diameter of said alumina sol (D-5) is $5 \times 10^{-3}$ to $2.5 \times 10^{-1}$ μm, preferably $1 \times 11^{-3}$ to $1 \times 10^{-1}$ μm. The morphology of alumina particles may for example be granular, rod-shaped, or flocculent.

As said alumina sol (D-5), some grades are commercially available. For example, Alumina Sol-100 and Alumina Sol-200 (both available from Nissan Chemical) can be mentioned.

The preferred level of addition of alumina sol (D-5) is 0.5–50 parts by weight relative to 100 parts by weight of said inorganic binder (B) on a nonvolatile matter basis. If the amount of alumina gel is less than 0.5 part by weight, the adhesion between the paint film and the substrate and the alkali resistance of the paint film will not be satisfactory. Moreover, it will be difficult to form a thick coat and the tendency of the paint film to develop cracks is increased. On the other hand, if the amount of alumina sol (D-5) exceeds 50 parts by weight, the amount of water and that of the acid used as a dispersion stabilizer are increased too much so that the coating composition will be liable to undergo gelation and be unstable. The still more preferred level of addition is 1–10 parts by weight.

One of the preferred embodiments of the coating composition according to the present invention comprises a tetramethoxysilane partial hydrolyzed condensate (I), a film-forming resin (A), and an organosilica sol (C) with a particle diameter of 10–100 nm and a hexane tolerance value of not less than 15.0 ml.

In the above coating composition containing said organosilica sol (C), the film-forming resin (A) may be any of thermoplastic resin, thermosetting resin, and room temperature setting resin.

The thermosetting resin mentioned above is preferably a polyol resin (a1) which is used in combination with a curing agent (a2) reactive therewith.

The preferred polyol resin (a1) has a solubility parameter (SP) value of 9.5–12.

The SP value mentioned above is a measure of solubility and can be determined, for example by the method of Suh & Clarke [J. P. S. A-1, 5, 1671–1681 (1967)] as follows.

The test resin, 0.5 g, is weighed into a 100 ml beaker and using a whole pipette, 10 ml of a good solvent (dioxane, acetone) is added. The mixture is stirred with a magnetic stirrer to prepare a solution. To this solution, a poor solvent (n-hexane, deionized water) is added dropwise using a 50 ml biuret, and the point at which a turbidity was formed at 20° C. is taken as the titration end-point.

From the above result, the SP value (δ) of the resin can be calculated by means of the following equation.

$$\delta = (V_{ml}^{1/2} \delta_{m1} + V_{mh}^{1/2} \delta_{mh})/(V_{ml}^{1/2} + V_{mh}^{1/2})$$

wherein $V_{ml}$ represents the molecular volume (ml/mol) of the solvent in the low SP poor solvent system; $V_{mh}$ represents the molecular volume (ml/mol) of the solvent in the high SP poor solvent system; $\delta_{ml}$ represents the SP value of the solvent in the low SP poor solvent system, and $\delta_{mh}$ represents the SP value of the solvent in the high SP poor solvent system.

Now, $$v_m = V_1 V_2/(\phi_1 V_2 + \phi_2 V_1)$$

$$\delta_m = \phi_1 \delta_1 + \phi_2 \delta_2$$

wherein $V_m$ represents the molecular volume (ml/mol) of the solvent mixture; $V_1$ and $V_2$ represents the molecular volumes (ml/mol) of respective solvents used; $\phi_1$ and $\phi_2$ represents the volume fractions of the respective solvents at the turbidly point; $\delta_m$ represents the SP value of the solvent mixture; and $\delta_1$, $\delta_2$ represent the SP values of respective solvents.

The other physical properties of said polyol resin (a1) are preferably adjusted so as to fall within the ranges necessary for a film-forming resin for coating use. For example, the glass transition temperature (Tg) of (a1) is preferably in the range of −20° C. to 60° C. If it is below −20° C., the resulting film will be soft and fragile. If Tg exceeds 60° C., the film will not be homogeneous and too hard, thus being liable to crack. The acid value is preferably less than 30. If the acid value is higher than 30 and the organosilica sol (C) used in combination contains residual alkoxysilyl groups, the polyol may catalyze their hydrolysis-condensation so that the stability of the coating composition, namely resistance to moisture-curing during exposure to air and shelf-life, will be adversely affected.

The curing agent (a2) reactive with said polyol resin (a1) is not particularly restricted but includes isocyanate compounds, blocked isocyanate compounds, and amino resins, among others. Preferred are blocked isocyanates and amino resins.

In the coating composition containing said organosilica sol (C), the above-mentioned isocyanate compound, blocked isocyanate compound or said amino resin can be used in combination with the polyol resin (a1) as said curing agent (a2) but the two curing agents (a2-1) and (a2-2) can also be used in combination as explained below. Thus, said curing agent (a2) preferably comprises a curing component (a2-1) having a solubility parameter (SP) value of not more than ($SP_{a1}$−0.5), where $SP_{a1}$ represents the solubility parameter (SP) of said polyol resin (a1), and a curing component (a2-2) having a solubility parameter (SP) value of more than ($SP_{a1}$−0.5), where $SP_{a1}$ is as defined above. By using two curing components (a2-1) and (a2-2) which are dissimilar in the difference (ΔSP) from the SP value of said polyol resin (a1), the raindrop fouling resistance of the paint film can be further improved.

The above-mentioned curing component (a2-1) has an SP value of not more than ($SP_{a1}$−0.5) where $SP_{a1}$ is the solubility parameter (SP) value of said polyol resin (a1). If the SP value is outside the range, the compatibility with the polyol resin (a1) is too great so that the curing component is retained in the interior of the film and does not migrate onto the surface in the baking stage. Therefore, the raindrop fouling resistance as well as processability is not satisfactory.

The curing component (a2-1) is not particularly restricted but can be selected typically from among the species mentioned as examples of said curing agent (a2). Particularly preferred are amino resins, with melamine resin being most preferred. In consideration of the difference of its SP from that of said polyol (a1) and the need for assuring that it will not self-condense before migration onto the film surface, said melamine resin is preferably a butylolmelamine resin as etherified by n-butyl or i-butyl or a methylol/butylolmelamine resin as etherified by n- or i-butyl and methyl.

Regarding the alkyl-etherified melamine resin with an SP value of not more than ($SP_{a1}$–0.5), several grades are commercially available. For example, Cymel 238 (methoxy/isobutoxy mole ratio 60/40, SP 10.5, Mitsui Cytech), Cymel 235 (methoxy/butoxymole ratio 60/40, SP 10.5, Mitsui° Cytech), Cymel 232 (methoxy/butoxy mole ratio 65/35, SP 10.4, Mitsui Cytech), Cymel 236 (methoxy/butoxy mole ratio 40/60, SP 10.1, Mitsui Cytech), Cymel 266 (methoxy/butoxy mole ratio 70/30, SP 10.6, Mitsui Cytech), Cymel 267 (methoxy/butoxy mole ratio 70/30, SP 10.6, Mitsui Cytech), Mykote 506 (butylolmelamine resin, SP 9.5, Mitsui Cytech), Uban 20SE (butylolmelamine resin, SP 10.0, Mitsui-Toatsu), Uban 20N-60 (butylolmelamine resin, SP 10.5, Mitsui-Toatsu), etc. can be mentioned. Aside from the above resins, other amino resins meeting the above-mentioned requirements, for example benzoguanamine resin, can also be employed.

The above-mentioned curing component (a2-2) is a curing agent with an SP value of more than ($SP_{a1}$–0.5) where $SP_{a1}$ is the solubility parameter (SP) value of said polyol resin (a1). If the SP value is outside this range, the compatibility with the polyol resin (a1) is so low that the effect of addition will not be expressed. Moreover, since the compatibility of this curing component (a2-2) with polyol resin (a1) is greater as compared with said curing component (a2-1), it is retained in the interior of the film in the baking stage so that it assists in making the density of crosslinks uniform throughout the film.

The curing component (a2-2) is not particularly restricted but can be selected typically from among the species mentioned as examples of curing agent (a2). Particularly preferred are alkyl-etherified melamine resins and blocked isocyanate compounds.

As the alkyl-etherified melamine resin with an SP value of more than ($SP_{a1}$–0.5), a commercial resin can be employed. A specific example of such commercial resin is Sumimal M40S (SP 12.9, Sumitomo Chemical).

The blocked isocyanate compound with an SP value of more than ($SP_{a1}$–0.5)) is a polyisocyanate compound blocked with a blocking agent. The polyisocyanate compound mentioned above is a compound containing at least 2 isocyanate groups within the molecule. The polyisocyanate and the blocking agent mentioned above include the various isocyanate compounds and blocking agents described and mentioned for the curing agent (a2).

The reaction start temperature of said blocked isocyanate compound is dependent upon the deblocking temperature and, generally speaking, is preferably not higher than 150° C. As blocking agents meeting this requirement, methyl ethyl ketoxime (MEK oxime) and β-diketones can be typically mentioned. By using a polyisocyanate compound blocked with such a blocking agent, the cure rate in the interior part of the coat is accelerated and the raindrop fouling resistance of the paint film is improved.

In the present invention, said curing component (a2-1) preferably has a low reaction start temperature as compared with said curing component (a2-2). The reaction start temperature mentioned above is the temperature determined by dynamic spring analysis (DSA), i.e. plotting relative dynamic elastic modulus (Er) against temperature using a heating rate of 3° C./minute and reading a point of inflection. The relatively low reaction start temperature of curing component (a2-1) coupled with its high compatibility with said polyol resin (a1) leads to the result that the interior of the film begins to cure earlier than the surface owing to said curing component (a2-2) so that the paint film tends to be shrunken.

When said curing component (a2-1) and curing component (a2-2) are used together as said curing agent (a2), their formulating amounts relative to 100 parts by weight of said polyol resin (a1) are preferably 0.5–10 parts by weight and 10–50 parts by weight, respectively. Thus, the curing component (a2-2) functions as a predominant curing component and the curing component (a2-1) functions as an auxiliary curing component. If this ratio is reversed, it will become difficult to reconcile raindrop fouling resistance and hardness with processability. The still more preferred proportions are 2–7 parts by weight of said curing component (a2-1) and 20–40 parts by weight of said curing component (a2-2).

When said curing component (a2-1) and curing component (a2-2) are used together as said curing agent (a2) and a catalyst (E) is further employed, the preferred formulating amount of said catalyst (E) is 0–2 parts by weight on a nonvolatile matter basis with respect to 100 parts by weight of said polyol resin (a1), curing component (a2-1) and curing component (a2-2) combined. If the amount of (E) exceeds 2 parts by weight, shrinking and other coat flaws will develop and the acid resistance and alkali resistance of the paint film will also sacrificed. The still more preferred amount of (E) is 0.5–1.5 parts by weight.

The organosilica sol (C) mentioned above has a particle diameter of 10–100 nm and a hydrophobicity of not less than 15.0 ml in terms of hexane tolerance.

In the case of a coating composition containing said organosilica sol (C), a silica sol based on a hydrophobic medium, e.g. xylene/butanol or methyl isobutyl ketone, can be employed. However, even an organosilica sol based on a hydrophilic medium, e.g. methanol or xylene/butanol, can also be used only if it is previously silanated. This silane coupling treatment can be carried out by the method described for said silica sol (D-4).

The silane coupling agent which can be used for this purpose is not particularly restricted but is preferably a silane coupling agent of the following general formula (6):

$$R^9\text{—}Si\text{—}(R^{10})_d(OR^{10})_{3-d} \tag{6}$$

wherein $R^9$ represents an alkyl group of 1–6 carbon atoms, an epoxyalkyl group of 2–11 carbon atoms, an aryl group of 6–12 carbon atoms, an alkenyl group of 2–11 carbon atoms, an aminoalkyl group of 1–5 carbon atoms, a mercaptoalkyl group of 1–5 carbon atoms, or a haloalkyl group of 1–5 carbon atoms, which may be unsubstituted or substituted by an organic group; $R^{10}$ represents an alkyl group of 1–6 carbon atoms; d represents 0, 1, or 2.

The silane coupling agent mentioned above specifically includes but is not limited to trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexadecyltrimethoxysilane, 1,6-bis-(trimethoxysilyl)hexane, γ-ureidopropyltriethoxysilane, γ-dibutylaminopropyltrimethoxysilane, nonafluorobutylethyltrimethoxysilane, γ-glycidoxypropylmethyldimethoxysilane, γ-(2-aminoethyl)aminopropyltrimethoxysilane, γ-(2-aminoethyl)aminopropylmethyldimethoxysilane, γ-methacryloxypropyltrimethoxysilane, γ-glycidoxypropyltrimethoxysilane, γ-mercaptopropyltrimethoxysilane, methyltrimethoxysilane, methyltriethoxysilane, γ-chloropropyltrimethoxysilane, γ-anilinopropyltrimethoxysilane, cyclohexylmethyldimethoxysilane, vinyltrimethoxysilane, dimethyldimethoxysilane, and octadecyldimethyl[3-(trimethoxysilyl)propyl]ammonium chloride.

From the standpoint of high reactivity with the silica sol, trimethoxysilyl compounds of general formula (6) wherein $R^{10}$ represents methyl and d=0 are particularly preferred. In such cases, $R^1$ is preferably γ-methacryloxypropyl, γ-glycidoxypropyl, methyl, ethyl, vinyl, phenyl, n-propyl, i-propyl, i-butyl, n-decyl, n-hexadecyl, trimethoxysilylhexyl, γ-dibutylaminopropyl, or nonafluorobutylethyl. Specifically, γ-methacryloxypropyltrimethoxysilane, vinyltrimethoxysilane, and γ-glycidoxypropyltrimethoxysilane can be mentioned.

The preferred formulating amount of said organosilica sol (C) is 0.1–100 parts by weight on a nonvolatile matter basis with respect to 100 parts by weight of said film-forming resin (A). If the amount of (C) is less than 0.1 part by weight, the film hardness will be insufficient. If (C) is used in excess of 100 parts by weight, the hardness will be increased but the shelf-life and coatability of the coating composition will be sacrificed. Moreover, many SiOR and SiOH groups will remain in the film so that the acid resistance, alkali resistance, and water resistance of the paint film will be sacrificed and the risk for cracking be increased. The preferred amount of organosilica sol (C) is 10–100 parts by weight, with the range of 20–100 parts by weight being particularly preferred.

When said organosilica sol (C) is included in a coating system comprising said polyol resin (a1) and, as (a2), said blocked isocyanate compound, it appears that urethane bonds tend to form on baking at the cost of Si—O—Si or Si—O—C bonds involved in the formation of a cured film, with the result that the loss of chemical resistance can be suppressed while maintaining a sufficiently high film hardness.

In the coating composition containing said organosilica sol (C), the proportion of said tetramethoxysilane partial hydrolyzed condensate (I) is preferably 0.1–100 parts by weight on a nonvolatile matter basis with respect to 100 parts by weight of said film-forming resin (A) on a nonvolatile matter basis. If its proportion is less than 0.1 part by weight, the hydrophilicity imparting effect will not be sufficiently developed. If the proportion of (I) exceeds 100 parts by weight, no commensurate increase in the hydrophilicity imparting effect will be obtained and rather the shelf-life of the coating composition will be curtailed and, because of the resulting high structural viscosity, coatability will also be sacrificed.

The coating composition containing said organosilica sol (C) and, as curing agent (a2), said curing component (a2-1) and curing component (a2-2) in combination is preferably a composition prepared by formulating 0.5–10 parts by weight of curing component (a2-1) and 10–50 parts by weight of curing component (a2-2) relative to 100 parts by weight of polyol resin (a1), 0.5–10 parts by weight of organosilica sol (B) relative to 100 parts by weight of said polyol resin (a1), curing component (a2-1), and curing component (a2-2) combined, on a nonvolatile matter basis, and 0.5–10 weight parts of tetramethoxysilane partial hydrolyzed condensate (I) relative to 100 parts by weight of said polyol resin (a1), curing component (a2-1), and curing component (a2-2) combined, on a nonvolatile matter basis, and processing the mixture in the manner described elsewhere in this specification.

The coating composition containing said organosilica sol (C) is preferably prepared to satisfy the following conditions in order that the raindrop fouling resistance, ultra-low foulability, and other characteristics of the paint film may be improved. Thus, said film-forming resin (A) is a polyol resin (a1); said polyol resin (a1) is a lactone-modified acrylic polyol resin or polyester polyol resin having a hydroxyl value of 10–100 mg KOH/g and an SP value of 9.5–12; said curing component (a2-1) is an alkyl-etherified melamine resin and said curing component (a2-2) is a diisocyanate compound blocked by at least one blocking agent selected from the group consisting of a lactam series blocking agent, an oxime series blocking agent, and a diketone series blocking agent; said organosilica sol (C) is a silica sol prepared by using MIBK as the dispersing medium or an organosilica sol modified by a silane coupling agent; said tetramethoxysilane partial hydrolyzed condensate (I) is a partial hydrolyzed condensate obtainable by the hydrolysis at a hydrolysis degree of less than 100% and condensation of tetramethoxysilane, with a silanol (SiOH)/methoxysilyl (SiOMe) molar ratio of (SiOH)/(SiOMe)=not greater than $\frac{1}{10}$, a dimer-octamer content of 0–30 weight %, and an average molecular weight of 1500–5000; said catalyst (E) is at least one member selected from the group consisting of an aromatic sulfonic acid, an aromatic sulfonic acid amine salt, and a tin compound; said curing component (a2-1) and curing component (a2-2) being formulated in the proportions of 0.5–10 parts by weight and 10–50 parts by weight, respectively, relative to 100 parts by weight of said polyol resin (a1), said organosilica sol (C) being formulated in a proportion of 1–100 parts by weight relative to 100 parts by weight of said polyol resin (a1), curing component (a2-1) and curing component (a2-2) combined, said tetramethoxysilane partial hydrolyzed condensate (I) being formulated in a proportion of 0.5–50 parts by weight relative to 100 parts by weight of said polyol resin (a1), curing component (a2-1) and curing component (a2-2) combined, and said catalyst (E) being formulated in a proportion of 0.1–2 parts by weight relative to 100 parts by weight of said polyol resin (a1), curing component (a2-1) and curing component (a2-2) combined.

In the coating composition of the present invention, a catalyst which promotes the hydrolysis-condensation reaction of alkoxysilyl groups may be incorporated. The catalyst mentioned just above is not particularly restricted but includes aluminum acetylacetonate, among others.

The preferred level of addition of such a catalyst is 0.1–10 weight % of the total coating composition. If its proportion is smaller than 0.1 weight %, the effect of addition will not be expressed. On the other hand, if more than 10 weight % is added, the hydrolysis-condensation reaction will take place prematurely. The still more preferred proportion is 1–5 weight %.

The coating composition of the present invention may further contain an organic solvent. From the standpoint of stability of SiOR groups against decomposition during storage, the organic solvent is preferably selected from the group consisting of an alcohol series organic solvent and a glycol derivative. For example, butanol, octanol, and diacetone alcohol can be mentioned as examples of said alcohol series organic solvent. The glycol derivative mentioned above includes but is not limited to ethylene glycol monomethyl ether, ethylene glycol monobutyl ether, ethylene glycol monomethyl ether, diethylene glycol monoethyl ether, propylene glycol monomethyl ether, propylene glycol monoethyl ether, propylene glycol monobutyl ether, ethylene glycol monoethyl ether acetate, ethylene glycol monomethyl ether acetate, and propylene glycol monoethyl ether acetate.

Where necessary, the coating composition of the present invention may be supplemented with a finely-divided filler, a pigment, or other additives as well as other kinds of organic solvents. The finely divided filler mentioned above is not particularly restricted but includes fine powders of $SiO_2$, $TiO_2$, $Al_2O_3$, $Cr_2O_3$, $ZrO_2$, $Al_2O_3.SiO_2$, $3Al_2O_3.2SiO_2$, and zirconia silicate, among others.

The above-mentioned pigment is not particularly restricted but includes colored pigments such as titanium dioxide, carbon black, iron oxide, various calcined pigments, cyanine blue, cyanine gray, etc. and extender pigments such as calcium carbonate, clay, barium sulfate, and so forth.

There is no particular limitation on said other additives, either. Thus, for example, the routine additives such as metal powders, e.g. aluminum dust etc.; dulling or delustering agents such as silica, alumina, etc.; antifoams; leveling agents; antisagging agents; surface conditioners; viscosity modifiers; dispersants; ultraviolet absorbers; waxes, etc. can be added.

The other organic solvents mentioned above are not particularly restricted but may be those solvents which are used in coating jobs in general. Thus, for example, aromatic hydrocarbons such as toluene, xylene, Solvesso 100, Solvesso 150, etc.; esters such as ethyl acetate, butyl acetate, etc.; and ketones such as methyl ethyl ketone, methyl isobutyl ketone, cyclohexanone, isophorone, etc. can be mentioned. Those solvents are selected in consideration of solubility, evaporation rate, and safety, and can be used each alone or in combination.

The coating composition of the present invention can be manufactured, for example by the following method.

When the film-forming resin (A) is used as the binder component, a pigment dispersion paste is first prepared using a machine which is conventionally used for dispersing pigments, such as a roller mill, a paint shaker, a pot mill, Disper, or a bead mill. To this dispersion, said film-forming resin (A), additives, organic solvent, curing agent, catalyst, etc. are added so as to provide a pigment paste. Then, a separately prepared solution varnish of said tetramethoxysilane partial hydrolyzed condensate (I) is mixed with said pigment paste to provide the objective coating composition.

As an alternative, a resin composition is prepared without addition of tetramethoxysilane partial hydrolyzed condensate (I), then said tetramethoxysilane partial hydrolyzed condensate is added thereto, and the whole mixture is homogenized.

Irrespective of whether said film-forming resin (A) and inorganic binder (B) are used in combination or said inorganic binder (B) alone is used as the binder component, the coating composition of the present invention can be manufactured in the same manner as the above composition in which said film-forming resin (A) is used.

Since the coating composition of the present invention contains, as the binder component, at least one of the film-forming resin (A) and inorganic binder (B), both of which have an excellent hardening effect, a sufficient film hardness can be obtained. Moreover, because it contains said tetramethoxysilane partial hydrolyzed condensate (I), a sufficient number of SiOR and SiOH groups are provided to render the coat surface well hydrophilic so that the paint film may have not only high water resistance, acid resistance, and alkali resistance but also remarkably high raindrop fouling resistance.

Furthermore, since the coating composition containing said organosilica sol (C) is formulated with a highly hardenable film-forming resin (A) as a binder component, sufficient hardness and flexibility are imparted to the paint film. Moreover, because of the organosilica sol (c) contained, a sufficient hardness can be assured in the interior layer of the film as well. In addition, because said tetramethoxysilane partial hydrolyzed condensate (I) is contained, a sufficient number of SiOR and SiOH groups are made available for imparting hydrophilicity to the paint film surface. Therefore, not only high water resistance, acid resistance, alkali resistance, and other useful film properties but also excellent raindrop fouling resistance, particularly ultra-low foulability, can be obtained.

Where high hardness and high strength are required of the paint film in addition to raindrop fouling resistance and ultra-low foulability, the following paint formulation can be employed.

This coating composition comprises (A) a film-forming resin; (I) an tetramethoxysilane partial hydrolyzed condensate; and (G) at least one aggregate selected from the group consisting of (g1) an inorganic aggregate having a size of 0.1 to 40 $\mu$m and (g2) a particulate organic polymer with a particle diameter of 0.01–30 $\mu$m.

This coating composition is also an embodiment of the present invention.

The film-forming resin (A) mentioned above may be any of said thermoplastic resin, thermosetting resin, and room temperature setting resin. However, since it is mixed with said tetramethoxysilane partial hydrolyzed condensate (I), a thermoplastic resin which does not require a catalyst is preferred from the standpoint of shelf-life of the coating composition. The reason is that since the tetramethoxysilane partial hydrolyzed condensate (I) contains methoxysilyl groups as mentioned hereinbefore and, when it is formulated together with an acid catalyst or tin catalyst, its methoxysilyl groups undergo hydrolysis and condensation upon exposure to moisture. When the thermosetting resin or room temperature setting resin is used as said film-forming resin (A), said tetramethoxysilane partial hydrolyzed condensate (I) and the catalyst compound are preferably packaged independently.

When the tetramethoxysilane partial hydrolyzed condensate (I) is used in combination with, for example, a thermoplastic fluororesin as said film-forming resin (A), the water dynamic reverse tension (Tr) of the resulting film shows a very high value in the range of 60–68 dyn/cm, with the hydrophilicity of the film surface having been sufficiently expressed, thus exhibiting excellent fouling resistance and ultra-low foulability. Moreover, even if the aggregate (F) described in detail hereinafter is formulated in a large amount, the coating composition shows a very satisfactory shelf-life.

The preferred formulating amount of said tetramethoxysilane partial hydrolyzed condensate (I) is 0.1–30 parts by weight relative to 100 parts by weight of the total coating composition on a nonvolatile matter basis. If it is less than 0.1 part by weight, the hydrophilicity imparting effect is insufficient. If the upper limit of 30 parts by weight is exceeded, no commensurate increase in the hydrophilicity imparting effect will be realized. Moreover, the shelf-life of the coating composition will be decreased and, because of the high structural viscosity, the coatability is sacrificed. The still more preferred formulating amount is 1–10 parts by weight.

The aggregate (G) for use in the present invention is at least one member selected from the group consisting of inorganic aggregates (g1) sized from 0.1–40 $\mu$m and particulate organic polymers (g2) having a particle diameter of 0.01–30 $\mu$m.

The above-mentioned aggregate (G) is used for the purpose of increasing the hardness, strength, and scratch resistance of the paint film.

The size of the inorganic aggregate (g1) is 0.1–40 μm. The term "size" as used herein means the diameter of the aggregate when it is granular, the breadth when the aggregate is flake-like, or the diameter when the aggregate is rod-shaped or fibrous. Where the aggregate is of no definite shape, one of said shapes which is most resembling it is selected and the applicable dimension is regarded as the size of the aggregate.

When the size of the aggregate (g1) is less than 0.1 μm, the hardness and strength of the paint film are insufficient. Conversely if the size is greater than 40 μm, the paint film will not be homogeneous so that the film characteristics and appearance will not be satisfactory. The preferred range is 1–20 μm. Therefore, unlike the conventional pigments for coating use, such as colored pigments, extender pigments, rust-preventive pigments, etc., aggregates finer than 0.1 μm in particle size are not included in the scope of inorganic aggregate (g1) in the context of the present invention.

The above-mentioned inorganic aggregate (g1) preferably has a Mohs hardness of 5–8. When the hardness value is less than 5, the paint film may not be fully satisfactory in hardness, strength, and scratch resistance. An aggregate with a Mohs hardness of more than 8 will be difficult to pulverize to a size suited for coating use, thus detracting from film characteristics. The still more preferred range is 6–7.

The inorganic aggregate (g1) is not restricted in kind but includes silicates such as calcium silicate, feldspar, etc.; sulfates such as gypsum, barium sulfate, etc.; various types of silica such as fused silica, quartz, wet silica, dry silica, etc.; various metal oxides; diatomaceous earth; glass; natural or synthetic mica; silas balloon; fused alloys of inorganic powders such as kaolin, clays, and talc; calcium ions supported by silica; and so forth. Among them, silicates, sulfates, silica, metal oxides, diatomaceous earth, glass, and natural or synthetic mica are preferred and calcium silicate, barium sulfate, and glass fiber are particularly preferred. Those aggregates can be used each alone or in combination.

The preferred glass fiber has a Mohs hardness of 5–8, a diameter of 1–30 μm, and a filament length of 1–200 μm. When such a glass fiber is used, the paint film acquires a very high level of hardness and, at the same time, expresses high strength and flexibility, thus being suited for PCM use.

For use as said inorganic aggregate (g1), many commercial products are available. For example, Micromica C4000 (mica, size 10 μm, flakes, Mohs hardness 2.5, Shiraishi Calcium Co.), Micro-Cel C (calcium silicate, size 3.4 μm, amorphous, Mohs hardness 5–6, Shimada Shokai); Micro-Cel E (calcium silicate, size 2.1 μm, amorphous, Mohs hardness 5–6, Shimada Shokai); Minex #7 (feldspar, size 4.5 μm, Mohs hardness 5–6, Shiraishi Industrial Co.); precipitated barium sulfate B54 (barium sulfate, size 1.2 μm, Mohs hardness 3.0–3.5, Sakai Kagaku Kogyo); Harimic S—CO (fused silica, particle diameter 23 μm. spherical, Mohs hardness 7, Micron Co.); Silica Powder SP-10 (quartz, size 8 μm, Mohs hardness 7. Osaka Ceramics Co.); Nipsil SS70B (wet silica, size 3.8–4.5 μm, Mohshardness 7, Nippon Silica Kogyo); Syloid 244 (wet silica, size 1.8 μm, amorphous, Mohs hardness 7, Fuji Davison); MIO #40 (iron oxide, size 21 ‖m, flakes, Mohs hardness 5.5, Kikuchi Color Co.); Microglass Surface Strand REV-1 (alkali-free glass fiber, diameter 13 μm, filament length 35 μm, fibrous, Mohs hardness 6.5, Nippon Glass Fiber); GB210 (glass beads, diameter 30 μm, spherical, Mohs hardness 6.5, Nippon Glass Fiber), etc. can be mentioned. Aside from the above products, Sankilite YO4 ($SiO_2.Al_2O_3$ hollow beads, diameter 40 μm, spherical, Sanki Kogyo Sha); Burgess Iceberg ($SiO_2.Al_2O_3.TiO_2$, size 1.4 μm, Burgess Pigment Co.); Sepiolite (milled $SiO_2.Al_2O_3.Fe_2O_3.CaO.MgO$, size 30 μm, Shiraishi Calcium Co.); etc. can also be used.

In the present invention, for improved stability of inorganic aggregate (g1) in the coating composition, a silanated aggregate is preferably used. This silanation treatment with a silane coupling agent can be carried out typically by reacting 10–50 parts by weight of a silane coupling agent with 100 parts by weight of inorganic aggregate (g1). When the relative amount of the silane coupling agent is less than 10 parts by weight, the shelf-life of the coating composition and the acid resistance, alkali resistance and gloss of the paint film are not improved. When the relative amount exceeds 50 parts by weight, the film characteristics such as hardness, water resistance, and moisture resistance are not sufficiently improved.

The above silanation treatment can be carried through in about one day at room temperature. However, when it is necessary to hasten the reaction, the treatment may be conducted at a suitable elevated temperature. However, the temperature should be controlled at a moderate level in order to prevent viscosity buildup and gelation due to condensation of the silane coupling agent.

An alternative silanation method comprises adding a silicate capable of functioning as a silane coupling agent in the step of preparing a pigment dispersion paste in the paint production stage. Thus, a typical specific procedure comprises mixing 10–50 parts by weight of a pigment dispersing resin or a main binder acting as a pigment dispersing resin with 1–10 parts by weight of said silicate acting as a silane coupling agent and further with 100 parts by weight of a pigment component, e.g. a colored pigment and/or an extender pigment, and dispersing the mixture uniformly by a conventional procedure, for example using a glass bead mill.

In this case, care should be exercised in the selection of said main binder and said silicate capable of functioning as a silane coupling agent, for unless a suitable combination is used, troubles such as aggregation may take place during the dispersing operation.

The silane coupling agent mentioned above is not particularly restricted but includes the compounds mentioned as examples of the silane coupling agent for use in the silanation of organosilica sol (C).

Particularly preferred is a trimethoxysilyl compound of the general formula (I) wherein e=1 and $R^{12}$ is a methyl group. In this case, $R^{11}$ is preferably a member selected from the class consisting of γ-methacryloxypropyl, γ-glycidoxypropyl, methyl, ethyl, vinyl, phenyl, n-propyl, i-propyl, i-butyl, n-decyl, n-hexadecyl, trimethoxysilylhexyl, γ-dibutylaminopropyl, and nonafluorobutylethyl. Specifically, for example, (γ-methacryloxypropyl)trimethoxysilane, vinyltrimethoxysilane, and (γ-glycidoxypropyl)trimethoxysilane can be mentioned.

For a still more improved stability of said inorganic aggregate (g1), the tetramethoxysilane partial hydrolyzed condensate (I) is preferably used as the silane coupling agent.

As the inorganic aggregate (g1), it is preferable to use silica in combination with a fibrous or particulate inorganic aggregate other than silica, for example a silicate, sulfate, metal oxide, diato aceous earth, glass, or natural or synthetic mica, for such a combination tends to improve the hardness, as well as appearance, of the paint film even at a low addition level. In this case, the ratio of silica to the other fibrous or particulate inorganic aggregate is preferably (silica)/(other aggregate)=2/98–30/70. When the proportion of silica is less than 2/98, the effect of addition of silica is immaterial. When the proportion of silica is larger than 30/70, the hardness of the paint film is not satisfactory.

Among the above-mentioned species of inorganic aggregate (g1), silica preferably has a size of 1–5 μm. Generally, colloidal silica, gas-phase silica and other microfine silicas are small in particle diameter, namely 0.01–0.1 μm, and must be added in a large amount in order that the necessary hardness may be imparted to the paint film. However, such fine silica particles detract from the shelf-life of the coating composition. Therefore, when silica is used in the present invention, a grade having a diameter of 1–5 μm is preferably selected.

The particulate organic polymer (g2) for use in the present invention imparts not only strength and scratch resistance to the paint film but also adds to the decorative effect and snow slidability.

The particle size of the particulate organic polymer (g2) should be 0.01–30 μm. If the particle size is less than 0.01 μm, the paint film will be vulnerable to pressure marking on takeup in a coil form, cause wear of the forming machine, or sustain damage during forming, washing, or field installation. If the limit of 30 μm is exceeded, the paint film will be non-homogeneous, lacking in strength, and unsatisfactory in other film characteristics and appearance. The preferred particle diameter range is 1–20 μm.

The resin for said particulate organic polymer (g2) is not restricted but includes fluorine-containing resins such as polytetrafluoroethylene etc,; polyolefin resins such as styrene-isoprene copolymer, ethylene-acrylic acid copolymer, polyethylene, polystyrene; etc.; silicone resins; cellulose resins; polyurethane resins such as acrylurethane resin; polyamide resins; polyester resins, phenolic resins, acrylic resins such as polymethyl methacrylate, styrene-acrylic acid resin, polyacrylonitrile, etc.; amino resins such as benzoguanamine condensate resin, melamine-formaldehyde copolymer, urea-formaldehyde copolymer, etc.; and the corresponding modified resins.

For use as said particulate organic polymer (g2), commercial products are available. For example, Lubron L2 (polytetrafluoroethylene, particle diameter 5 μm, Daikin Industries); Zefluor Lube F (polytetrafluoroethylene, particle diameter 5 μm, Central Glass Co.); Fluon L169J (polytetrafluoroethylene, particle diameter 12 μm, Asahi Glass Co.); FR3 (styrene-isoprene copolymer, particle diameter 10–30 μm, Soken Kagaku Co.); Flow Beads EA209 (ethylene-acrylic copolymer, particle diameter 1–25 μm, Sumitomo Seika Chemicals Co.); Flocen UF (polyethylene, particle diameter 25 μm, Gifu Ceramics Co.); Fine Pearl PB3006E (polystyrene, particle diameter 6 μm, Sumitomo Chemical Co.); Tospearl 120 (silicone resin, particle diameter2 μm, Toshiba Silicone Co.); SP104S (acrylurethane resin, particle diameter 10 μm, Nippon Shokubai Co.); Orgasol 2002D (nylon 12, particle diameter 18–22 μm, Nippon Rilsan Co.); Varinax FC600P (polyester resin, particle diameter <25 μm, Mitsui Toatsu Chemicals); Bellpearl R900 (phenolic resin, particle diameter 1–20 μm, Kanebo); MP100 Series (polymethyl methacrylate, particle diameter 0.35–2.0 μm, Soken Kagaku Co.); SGP-70C (styrene-acrylic copolymer, particle diameter 20–30 μm, Soken Kagaku Co.); Julimer MB10A (polyacrylonitrile, particle diameter 20–30 μm, Nippon Junyaku); Epostar L (benzoguanamine condensate, particle diameter 10–20 μm, Nippon Shokubai Co.); Epostar S12 (melamine-formaldehyde copolymer, particle diameter 1.2 μm, Nippon Shokubai Co.) Epostar M30 (formaldehyde condensate, particle diameter 3 μm, Nippon Shokubai Co.); Percopac M3 (urea-formaldehyde copolymer, particle diameter of 5 μm, Lonza Japan); etc. can be mentioned.

In the present invention, the aggregate (G) is preferably a combination of said inorganic aggregate (g1) and said particulate organic aggregate (g2). The preferred examples of the combination include feldspar/polytetrafluoroethylene, feldspar/wet silica/polytetrafluoroethylene, feldspar/dry silica/polytetrafluoroethylene, glass fiber/polytetrafluoroethylene, glass fiber/wet silica/polytetrafluoroethylene, glass fiber/dry silica/polytetrafluoroethylene, glass fiber/nylon 12, glass fiber/wet silica/nylon 12, glass fiber/polymethyl methacrylate, glass fiber/wet silica/polymethyl methacrylate, glass fiber/polyacrylonitrile, and glass fiber/wet silica/polyacrylonitrile.

The compounding ratio of said inorganic aggregate (g1) to said particulate organic aggregate (g2) can be selected according to the desired paint film characteristics, for example hardness, scratch resistance, snow slidability, and appearance.

The preferred formulating amount of said aggregate (G) is 0.5–30 parts by weight relative to 100 parts by weight of the total coating composition on a nonvolatile matter basis. If the amount of (G) is less than 0.5 part by weight, the expected hardness and strength for attaining the necessary scratch resistance will not be expressed. If it exceeds the upper limit of 100 parts by weight, both film strength and processability will be sacrificed and the surface smoothness and gloss of the paint film will also be unsatisfactory. The still more preferred formulating amount is 0.5–20 parts by weight.

In the case of the coating composition of the present invention, the necessary shelf-life (stability against precipitation of aggregate etc.) can be secured even when the formulating amount of aggregate (G) is comparatively large. It is generally known that when an inorganic aggregate (g1) is used as aggregate (G), the aggregate settles with time to adversely affect the shelf-life of the coating composition. Such a coating composition fails to yield a homogeneous paint film and the resulting high permeability of the film to moisture results in poor corrosion resistance.

The inventors of the present invention did much research for avoiding the above trouble and found that when the aggregate (G) and the tetramethoxysilane partial hydrolyzed condensate (I) are formulated together in a coating system, the stability of the $SiO_2$-containing aggregate can be dramatically improved. Thus, in the coating composition of the present invention which includes said tetramethoxysilane partial hydrolyzed condensate (I), the silicate component reacts and/or is adsorbed around the inorganic aggregate (g1) so that even though the inorganic aggregate (g1) has a relatively large specific gravity among various aggregates (G), it is effectively stabilized against settling. Moreover, the shelf-life can be further improved by treating the inorganic aggregate (g1) with a silane coupling agent ahead of time. In addition, in the coating composition of the invention containing the inorganic aggregate (g1), the stabilization of the inorganic aggregate (g1) which is comparatively ready to settle is thus achieved. The particulate organic polymer as an organic aggregate (g2) is likewise stabilized. Therefore, the aggregate (G) to be added for the purpose of increasing the hardness and strength of the paint film can be formulated in an increased amount.

Furthermore, in the coating composition of the present invention, an improved fouling resistance of the paint film is further assured by said tetramethoxysilane partial hydrolyzed condensate (I). Therefore, a paint film satisfactory in hardness, scratch resistance, fouling resistance, and other properties can be provided. Therefore, the coating composition can be used with great advantage in outdoor applications. Furthermore, when said particulate organic polymer (g2) is used as aggregate (G), a paint film having sufficient strength and good slidability can be obtained. Therefore, the coating composition can be applied to roof shingles and other architectural members requiring snow-shedding properties for use in districts frequented by heavy snowfalls.

The method for forming a fouling-resistant paint film according to the present invention is now described in detail.

The coating method of the present invention comprises applying a primer to a metal substrate in the first place and then applying the coating composition of the invention which has been described hereinbefore.

The metal substrate mentioned above is not particularly restricted but includes a variety of plates or sheets such as galvanized steel sheets, alloyed zinc-plated steel sheets, zinc/aluminum-plated steel sheets, aluminum-plated steel sheets, sheets or plates made of aluminum and its alloys, copper and its alloys, titanium and its alloys, etc., vapor-deposited metal sheets, stainless steel plates, cold rolled steel plates, and articles or structures formed from such metallic materials.

As such metal substrates, it is preferable to use plates or sheets subjected to zinc phosphate treatment, reactive chromate treatment, coating chromate treatment, etc. A thin-film organic composite coat may have been deposited on the chromate-treated surface.

In carrying out the coating method of the invention, a primer is first applied to the metal substrate for improved adhesion between the substrate and the coating composition of the invention. The primer mentioned above is preferably one or more members selected from the class consisting of epoxy resin primer, polyurethane-modified epoxy resin primer, and polyester resin primer.

In order to achieve a further improvement in hardness of the paint film, said primer preferably contains at least one aggregate (G) selected from the class consisting of (g1) a fibrous or granular inorganic aggregate having a filament length or particle diameter of 0.1–40 $\mu$m and a Mohs hardness of 5–8 and (g2) a particulate organic polymer (g2) having a particle diameter of 0.01–30 $\mu$m.

The above-mentioned fibrous or granular inorganic aggregate having a filament length or diameter of 0.1–40 $\mu$m and a Mohs hardness of 5–8 (g1) is not particularly restricted but includes the species mentioned as examples of the aggregate (G) for the coating composition of the invention.

The above-mentioned particulate organic polymer having a particle diameter of 0.01–30 $\mu$m (g2) is not particularly restricted but includes those species mentioned as examples of the aggregate (G) for the coating composition of the invention. Particularly preferred are polyolefin resin, cellulose resin, polyurethane resin, polyamide resin, polyester resin, phenolic resin, acrylic resin, amino resin, and the corresponding modified resins.

The preferred formulating amount of the aggregate (G) is 0.5–30 parts by weight relative to 100 parts by weight of said primer on a nonvolatile matter basis. If it is less than 0.5 part by weight, the degree of increase in hardness will be immaterial. If it exceeds 30 parts by weight, the surface smoothness and strength as well as processability is decreased.

The coating technique that can be used for application of the coating composition is not particularly restricted but includes the conventional methods such as roll coater, air spray, airless spray, curtain flow coater, and other coating methods. Those techniques are selectively used according to the intended use of the coated substrate.

The thickness of the paint film to be formed is not particularly restricted but, generally speaking, is preferably 5–100 $\mu$m on a dry film basis.

According to the coating method of the present invention, the water dynamic reverse tension (Tr) value of the paint film can be easily adjusted to not less than 55 dyn/cm. When the Tr value is less than 55 dyn/cm, the fouling resistance, particularly resistance to raindrop fouling on long-term exposure to weather, is insufficient. More preferably, Tr should be not less than 60 dyn/cm.

The baking conditions can be adjusted according to the response temperature of the coating composition so as to insure that the water dynamic reverse tension (Tr) of the paint film will be 55 dyn/cm or higher. Usually, the baking is preferably carried out under the conditions of 140° C.×20 minutes to 250° C.×30 seconds. When the baking is to be performed in a short time, for example about 30 seconds to 2 minutes, it is generally advisable to control the baking temperature according to the ultimate substrate temperature and set it at 190–230° C. When said coating composition is of the room temperature-drying type, the applied paint film is dried at room temperature for one day or longer, preferably 2–3 days, more preferably not less than 1 week.

The coating method of the present invention can be carried out in a two-coat/two-bake system, that is to say the application and baking of the primer followed by the application and baking of the coating composition or in a two-coat/one-bake system, that is to say the application of the primer followed by the application and baking of the coating composition omitting the baking of the primer.

The coating method of the present invention preferably comprises applying the coating composition to a metal substrate, baking the coat in situ, and contacting the coated metal article with water for causing a further hydrolysis reaction to proceed. The SiOR groups exposed on the surface of the paint film applied are efficiently hydrolyzed to SiOH groups when the coated substrate is thus contacted with water. Therefore, this procedure is effective in enhancing the fouling resistance of the paint film.

The thus-coated article shows very satisfactory resistance to fouling, high hardness, and high scratch resistance, thus being suited for use as weather-exposed members of buildings, roadside installations, and other outdoor applications. The coated article also falls within the scope of the invention.

Since, according to the film-forming method of the invention, the primer is first applied to a metal surface and then the coating composition is applied, an intimate adhesion can be assured between the paint film and the substrate. Therefore, in addition to said high fouling resistance, high hardness and high scratch resistance, the paint film exhibits a very satisfactory overall performance. Furthermore, when the primer contains said aggregate (G), the hardness and strength of the paint film are further improved so that the film is more resistant to damages.

The coating method of the present invention is remarkably superior to the prior art technology in at least the following two respects. Thus, (1) the water dynamic reverse tension (Tr) of the paint film can be increased to not less than 55 dyn/cm by causing the SiOR and/or SiOH groups of tetramethoxysilane partial hydrolyzed condensate (I) to be selectively distributed on the surface layer of the paint film and (2), because of the low volatility of said tetramethoxysilane partial hydrolyzed condensate (I) under baking conditions, a paint film having excellent water wettability and durability can be provided.

Stately differently, the coating method of the present invention overcomes the disadvantages of the prior art technology which employs the conventional alkoxysilane condensate as an additive. Thus, the prior art is disadvantageous in that it takes time for the hydrolysis reaction to proceed to a sufficient extent and, hence, the risk is high for deposition of foulants during the intervening time period when the hydrophilicity of the film remains to be fully expressed, that the SiOR and SiOH groups present in the paint film undergo condensation under the influence of rainwater or the like to cause cracking, that because the molecular weight of the alkoxysilane condensate is low, it is liable to be evaporated in a baked-on enamel system, and that because the alkoxysilane condensate must be formulated in a large amount, the risk for cracking is high and the shelf-life of the paint composition is poor.

The raindrop fouling-resistant paint film and coating composition of the present invention can be used in PCM and post-coated metal applications and because of the satisfactory anti-raindrop fouling effect and crackproofing effect that can be achieved, are especially suited for use in such applications as roof shingles, sidings and other architectural members; roadside installations such as the fence, pole, guardrail, sound barrier, girder cover, tunnel lining, etc.; exterior furniture such as the bench etc., and other outdoor metal members such as waterway components.

By taking advantage of its excellent fouling resistance, hardness, scratch resistance, and slidability, the coating composition comprising said film-forming resin (A), tetramethoxysilane partial hydrolyzed condensate (I), and aggregate (G) can be used with particular advantage not only in the above-mentioned applications but also in other applications where fouling resistance, scratch resistance, and snow-shedding properties are important requirements.

As described in detail above, the present invention is superior to the prior art technology in that because in the paint film formed from the composition of the invention, a tetramethoxysilane partial hydrolyzed condensate provides for a sufficiently high water dynamic reverse tension (Tr), the paint film is remarkably satisfactory in fouling resistance, particularly raindrop fouling resistance, water resistance, acid resistance, alkali resistance, and crack resistance. Therefore, the coating composition of the present invention is particularly suited for coating exterior surfaces of buildings, signboards, sound barriers, and so forth.

Furthermore, when the present invention is embodied using a film-forming resin as a coating binder, a very remarkable crack resistance is expressed. When said tetramethoxysilane partial hydrolyzed condensate and organosilica sol are formulated in combination, still higher raindrop fouling resistance and ultra-low foulability can be accomplished.

When the aggregate-containing formulation is selected, high hardness and high strength are expressed so that a highly scratch-resistant and fouling-resistant film can be obtained. Although the aggregate is thus added for enhanced hardness and strength, the aggregate is prevented from setting during storage so that a long shelf-life can be insured. Moreover, when a particulate organic polymer is used as the aggregate, high slidability or surface lubricity can be attained so that the coating composition can be applied advantageously to substrates which are required to have snow-shedding properties.

Referring to the coating method of the present invention, use of an aggregate-containing primer results in still higher hardness and strength so that the scratch resistance of the paint film can be further improved.

BEST MODE FOR CARRYING OUT THE INVENTION

The following examples illustrate the present invention in further detail and should by no means be construed as defining the scope of the invention.

Production Example 1

Synthesis of Acrylpolyol Resin

A reactor equipped with a heater, stirrer and reflux condenser was charged with 80 parts by weight of xylene and 20 parts by weight of n-butanol and the temperature was increased to 110° C. while the charge was constantly stirred. Then, a mixture of 36.7 parts by weight of methyl methacrylate, 31.6 parts by weight of ethyl acrylate, 31.9 parts by weight of 2-hydroxyethyl methacrylate/ε-caprolactone (1:2) adduct (Daicell), and 5.0 parts by weight of t-butylperoxy-2-ethyl hexanoate was added dropwise from a drip funnel over 3 hours. After completion of dropwise addition, the reaction system was maintained at 110° C. for 30 minutes, at the end of which time 0.5 part by weight of t-butylperoxy-2-ethyl hexanoate was further added. The mixture was then stirred at 110° C. for 2 hours to provide an acrylpolyol resin (A-1) This acrylpolyol resin (A-1) had a nonvolatile fraction of 50.0%, a hydroxyl value of 50 mg KOH/g, and a number average molecular weight of 5000.

Production Example 2

Synthesis of Acrylpolyol Resin

A reactor equipped with a heater, stirrer and reflux condenser was charged with 49 parts by weight of xylene and 10 parts by weight of cyclohexanone and the temperature was increased to 115° C. while the charge was constantly stirred. Then, 100 parts by weight of a mixture of 36.7 parts by weight of methyl methacrylate, 31.4 parts by weight of ethyl methacrylate, and 31.9 parts by weight of 2-hydroxyethyl methacrylate/ε-caprolactone (1:2) adduct (PCL FM-2, Daicell) as well as 4.5 parts by weight of t-butylperoxy-2-ethyl hexanoate was added from a drip funnel over 3 hours. After completion of dropwise addition, the reaction mixture was incubated at 115° C. for 30 minutes. Then, 0.5 part by weight of t-butylperoxy-2-ethyl hexanoate was further added. The mixture was stirred at 115° C. for a further 2 hours to provide an acrylpolyol resin (A-2). This acrylpolyol resin (A-2) had a nonvolatile fraction of 50.0%, a hydroxyl value of 50 mg KOH/g, an SP value of 11.5. and a number average molecular weight of 5000.

Production Example 3

Synthesis of Alkoxysilyl-Containing Acrylic Resin

A reactor equipped with a heater, stirrer and reflux condenser was charged with 80 parts by weight of xylene and 20 parts by weight of n-butanol and the temperature was increased to 110° C. while the charge was constantly stirred. Then, a mixture of 41.8 parts by weight of methyl methacrylate, 37.0 parts by weight of ethyl acrylate, 8.5 parts by weight of n-butyl methacrylate, 12.7 parts by weight of (γ-methacryloyloxypropyl)trimethoxysilane, and 1.0 part by weight of t-butylperoxy-2-ethyl hexanoate was added dropwise from a drip funnel over 3 hours. After completion of dropwise addition, the reaction system was maintained at 110° C. for 30 minutes, at the end of which time 0.5 part by weight of t-butylperoxy-2-ethyl hexanoate was further added. The mixture was then stirred at 110° C. for 2 hours to provide an alkoxysilyl-containing resin (A-3). This alkoxysilyl-containing resin (A-3) had a nonvolatile fraction of 50.0%, an alkoxysilyl equivalent of 623 g/mol, and a number average molecular weight of 10000.

Production Example 4

Synthesis of Polyester Polyol Resin

A reactor equipped with a heater, stirrer, reflux condenser, Dean-Stark trap, fractional distillation column, and thermometer was charged with 36.2 parts by weight of dimethyl terephthalate, 20.1 parts by weight of neopentyl glycol, and 22.8 parts by weight of 1,6-hexanediol and the temperature was increased. After stirring became feasible, 0.02 part by weight of dibutyltin laurate (DBTL) was added and the stirring was commenced to carry out a transesterification reaction while the methanol was distilled off. After cooling to 100° C., 31.0 parts by weight of isophthalic acid, 4.2 parts by weight of ε-caprolactone (Praccel M, Daicell) were added and the reaction temperature was increased to 250° C. However, between 180 and 250° C., the temperature was increased at a constant rate over 4 hours. The byproduct water was distilled off from the reaction system. After the temperature reached 250° C., the reaction mixture was incubated for 1 hour. Then, 5 parts by weight of xylene was gradually introduced into the reactor for use as the refluxing solvent and a condensation reaction was carried out in the presence of the solvent. The reaction was terminated when an acid value of 1.0 mg KOH/g was attained. After cooling to 100° C., 50 parts by weight of Solvesso 150 and 50 parts by weight of cyclohexanone were added. In this manner, apolyester polyol resin (A-4) was synthesized. This polyester polyol resin (A-4) had a nonvolatile fraction of 50%, a hydroxyl value of 15 mg KOH/g, and a number average molecular weight of 8000.

Production Example 5

Synthesis of Acrylic Resin

In the conventional manner, 210.0 parts by weight of styrene, 160.0 parts by weight of methyl methacrylate, 59.0 parts by weight of n-butyl acrylate, 57.0 parts by weight of 2-hydroxyethyl methacrylate, 5.0 parts by weight of methacrylic acid, 7.0 parts by weight of Kayaester O (t-butylperoxy-2-ethyl hexanoate, Nippon Kayaku-Akzo), 327.0 parts by weight of toluene, and 99.0 parts by weight of butyl acetate were reacted together at 110±2° C. Then, a mixture of 2.5 parts by weight of Kayaester 0 and 20 parts by weight of toluene was added dropwise and the reaction mixture was incubated at 250° C. for 1.5 hours to provide an acrylic resin (A-5). This acrylic resin (A-5) had an acid value of 6.0 mg KOH/g, a hydroxyl value of 50 mg KOH/g; a number average molecular weight of 13000, a glass transition temperature of 67° C., and a nonvolatile fraction of 50%.

Production Example 6

Synthesis of Silanated silica sol

After 20 parts by weight (net) of (γ-methacryloyloxypropyl)trimethoxysilane and 100 parts by weight (net) of methanol-based silica sol were evenly admixed, the mixture was incubated at 40° C. for 8 hours to provide a silanated silica sol (C-1) as a liquid dispersion containing the silanated silica.

In the following description, all the formulating amounts are shown on a nonvolatile matter basis.

Example 1

As the base coating, Uniflon C (white) (polyvinylidene fluoride-acrylic mixed resin-based thermoplastic coating material, Nippon Paint Co.) was used. Uniflon C (white) is a coating material prepared by adding 100 parts by weight of a titanium dioxide (Tipaque CR97, Ishihara Sangyo) to 100 parts by weight (on a nonvolatile basis) of the resin and dispersing the pigment in the resin using a glass bead mill. Based on 100 parts by weight of the nonvolatile fraction of the above base coating, 8 parts by weight of the tetramethoxysilane partial hydrolyzed condensate (1) (hydrolysis rate 60%, weight average molecular weight 2000, a dimer-octamer content 21.9 weight %) was added and the mixture was redispersed using a glass bead mill to provide a coating composition.

Using a 0.4 mm-thick galvanized steel sheet subjected to zinc phosphate treatment as the substrate, a polyester resin primer (Flexoat P600 primer, Nippon Paint Co.) was applied in a dry thickness of 5 μm using a bar coater and then baked at an ultimate substrate temperature of 220° C. for 60 seconds. Thereafter, using a bar coater, the coating composition prepared above was applied in a dry film thickness of 20 μm onto the baked primer coat and baked at the ultimate substrate temperature of 245° C. for 60 seconds to provide a cured paint film.

Example 2

A coating composition was prepared using a tetramethoxysilane partial hydrolyzed condensate (2) (hydrolysis rate 55%, weight average molecular weight 1800, dimer-octamer content 26.8 weight %) in lieu of said tetramethoxysilane partial hydrolyzed condensate (1) under otherwise the same conditions as in Example 1. Then, a paint film was prepared in the same manner as in Example 1.

Comparative Example 1

A coating composition was prepared using a tetramethoxysilane partial hydrolyzed condensate (6) (hydrolysis rate 50%, weight average molecular weight 1020, dimer-octamer content 41.0 weight %) in lieu of said tetramethoxysilane partial hydrolyzed condensate (1) under otherwise the same conditions as in Example 1. Then, a paint film was formed in the same manner as in Example 1.

Comparative Example 2

A coating composition was prepared using a tetramethoxysilane partial hydrolyzed condensate (7) (hydrolysis rate 40%, weight average molecular weight 580, dimer-octamer content 77.2 weight %) in lieu of said tetramethoxysilane partial hydrolyzed condensate (1) under otherwise the same conditions as in Example 1. Then, a paint film was formed in the same manner as in Example 1.

Comparative Example 3

Except that the tetramethoxysilane partial hydrolyzed condensate (1) was not added, a coating composition was prepared in otherwise the same manner as in Example 1 and a paint film was formed as in Example 1.

Example 3

Using an SG mill, 23 parts by weight of the acrylpolyol resin obtained in Production Example 1, 50 parts by weight of titanium dioxide (Typaque CR97, Ishihara Sangyo), and 20 parts by weight of a tetramethoxysilane partial hydrolyzed condensate (3) (hydrolysis rate 60%, weight average molecular weight 2500, dimer-octamer content 16.8 weight %) were dispersed with the aid of glass beads at 30° C. for 1.5 hours. The particle size of the dispersion as measured with a particle gauge was not larger than 5 microns. Then, based on the nonvolatile matter, 7 parts by weight of MEK oxime-blocked HMDI (Desmodur BL3175, Sumitomo-Bayer Urethane) and, as a catalyst, 0.1 weight % of dibutyltin laurate were added, and the mixture was stirred using Disper to provide a coating composition.

Using a 0.4 mm-thick galvanized steel sheet subjected to zinc phosphate treatment as the substrate, a polyester resin primer (Flexcoat P600 Primer, Nippon Paint Co.) was applied in a dry film thickness of 5 μm with a bar coater and baked at an ultimate sheet temperature of 220° C. for 1 minute. Thereafter, the above coating composition was applied in a dry film thickness of 20 μm using a bar coater and baked at an ultimate sheet temperature of 220° C. for 1 minute to provide a cured paint film.

Comparative Example 4

A coating composition was prepared using a tetramethoxysilane partial hydrolyzed condensate (7) (hydrolysis rate 40%, weight average molecular weight 580, dimer-octamer content 77.2 weight %) in lieu of the tetramethoxysilane partial hydrolyzed condensate (3) under otherwise the same conditions as in Example 3. Then, a paint film was formed as in Example 3.

Comparative Example 5

Except that the tetramethoxysilane partial hydrolyzed condensate (3) was not added, a coating composition was prepared under otherwise the same conditions as in Example 3 and using this coating composition, a paint film was formed in the same manner as in Example 3.

Example 4

Using a SG mill, 23 parts by weight of the acrylpolyol resin obtained in Production Example 1, 50 parts by weight of titanium dioxide (Typaque CR97, Ishihara Sangyo), 15 parts by weight of methanol-based silica sol (Nissan Kagaku), and 5 parts by weight of a tetramethoxysilane partial hydrolyzed condensate (4) (hydrolysis rate 60%, weight average molecular weight 3400, dimer-octamer content 14.5 weight %) were dispersed with the aid of glass beads at 30° C. for 1.5 hours. The particle size of the dispersion as measured with a particle gauge was not larger than 5 microns. Then, 7 parts by weight of MEK oxime-blocked HMDI (Desmodur BL3175, Sumitomo-Bayer Urethane) and, as a catalyst, 0.1 weight % of dibutyltin laurate were added on a nonvolatile matter basis and the mixture was stirred with Disper to prepare a coating composition. Then, a paint film was prepared as in Example 3.

Comparative Example 6

Using a tetramethoxysilane partial hydrolyzed condensate (6) (hydrolysis rate 50%, weight average molecular weight 1020, dimer-octamer content 41.0 weight %) in lieu of tetramethoxysilane partial hydrolyzed condensate (4), a coating composition was prepared under otherwise the same conditions as in Example 4. Then, a paint film was formed as in Example 4.

Comparative Example 7

Except that the tetramethoxysilane partial hydrolyzed condensate (4) was not added, a coating composition was prepared in the same manner as in Example 4 and a paint film was formed as in Example 4.

Example 5

A reactor equipped with a reflux condenser and a stirrer was charged with 100 parts by weight of methyl trimethoxysilane, 1 part by weight of Alumina Sol-100 (Nissan Kagaku, a HCl-stabilized aqueous dispersion of flocculent alumina, solids content 10 weight %), and 20 parts by weight of water and the reaction was carried out at 60° C. with stirring for about 3 hours. The reaction system was then cooled to room temperature to provide an alumina-containing organopolysiloxane with a weight average molecular weight of 6000. The molecular weight was determined by gel permeation chromatography using the polystyrene method. Then, based on 100 parts by weight of the nonvolatile matter of the resin, 10 parts by weight of a tetramethoxysilane partial hydrolyzed condensate (5) (hydrolysis rate 60%, weight average molecular weight 1800, dimer-octamer content 27.0 weight %) was added to provide a coating composition.

This coating composition was spray-coated onto an aluminum plate (1050P) and baked at 180° C. for 20 minutes. The thickness of the dried film was 15±5 μm.

Example 6

A reactor equipped with a reflux condenser and a stirrer was charged with 100 parts by weight of methyltrimethoxysilane, 100 parts by weight of OS309D (alkoxysilyl-containing acrylic resin, Daihachi Kagaku Kogyo), 20 parts by weight of isopropyl alcohol, and 40 parts by weight of water and the reaction was carried out at 70° C. with stirring for 8 hour. Then, 40 parts by weight of isopropyl alcohol, 2 parts by weight of aluminum tris (acetylacetonate), and 8 parts by weight of tetramethoxysilane partial hydrolyzed condensate (1) (hydrolysis rate 60%, weight average molecular weight 2000, dimer-octamer content 21.9 weight %) were added, followed by addition of 100 parts by weight of titanium dioxide (CR95, Ishihara Sangyo). This mixture was dispersed with the aid of glass beads for 30 minutes to provide a coating composition. Using this coating composition, a paint film was formed as in Example 5.

Comparative Example 8

Except that the tetramethoxysilane partial hydrolyzed condensate (1) was not added, a coating composition was prepared as in Example 6 and, then, a paint film was formed as in Example 5.

Using the paint films obtained in Examples 1–6 and Comparative Examples 1–8 as samples, water dynamic reverse tension (Tr), raindrop fouling resistance, and dust fouling resistance were determined. The determination methods were as follows.

Measurement of water dynamic reverse tension (Tr)

Using each coating composition, a paint film was formed on a 50 mm×25 mm×0.5 mm (thick) testpiece back-sealed with a polytetrafluoroethylene tape. Then, using the measuring apparatus illustrated in FIG. 1, the load acting on the coated testpiece was measured while the platform was cyclically driven at a speed of 20 mm/minute and the water dynamic reverse tension was calculated. The girth of the coated testpiece was 150 mm. The results are shown in Table 1.

Raindrop fouling resistance

Each coated plate was erected in a vertical position in such a manner that the rainwater would flow down the surface from a pent roof made of a 30 cm corrugated sheet (grooved 3 mm deep at a pitch of 3 mm) at a grade of 10°. The test setup was allowed to sit for 5 months and the degree of fouling was visually examined and rated according to the following evaluation criteria. The results are shown in Table 1.

⊚: No rain streaks
○: Slight rain streaks
Δ: Fair rain streaks
X: Marked rain streaks Dust fouling resistance According to the method of Yoshizawa et al. (Japanese Society of Architectural Finishing, Synopsis of the Lectures at the 1995 Congress, p. 203–206, Accelerated Fouling Test Method A), each paint film was fouled for 15 minutes, rinsed with water, and the color change ΔE from the initial baseline value was measured. The results were evaluated according to the following criteria. The measurement of the surface color was made using a commercial color difference meter. The results are shown in Table 1.

⊚: ΔE<1
○: ΔE=1–<10
Δ: ΔE=10–<20
X: ΔE≧20

TABLE 1

|  | Water dynamic reverse tension (dyn/cm) | Raindrop fouling resistance | Dust fouling resistance |
| --- | --- | --- | --- |
| Example 1 | 67.5 | ⊚ | ⊚ |
| Example 2 | 64.8 | ⊚ | ⊚ |
| Example 3 | 67.9 | ⊚ | ⊚ |
| Example 4 | 55.7 | ⊚ | ⊚ |
| Example 5 | 67.9 | ⊚ | ⊚ |
| Example 6 | 67.9 | ○ | ⊚ |
| Comparative Example 1 | 55.7 | Δ | Δ |
| Comparative Example 2 | 56.3 | Δ | Δ |
| Comparative Example 3 | 45.8 | X | X |
| Comparative Example 4 | 56.3 | Δ | Δ |
| Comparative Example 5 | 23.7 | X | X |
| Comparative Example 6 | 54.1 | Δ | Δ |
| Comparative Example 7 | 31.9 | X | X |
| Comparative Example 8 | 33.0 | X | X |

The above results indicate that the tetramethoxysilane partial hydrolyzed condensates (1) through (5) used as hydrophilicity-imparting agents in Examples 1–6 impart greater raindrop fouling resistance and dust fouling resistance as compared with the cases in which none of them was used and even with the case in which the tetramethoxysilane partial hydrolyzate (6) or (7) was used. It was also clear that while the tetramethoxysilane partial hydrolyzed condensates (6) and (7) are effective in imparting raindrop fouling resistance and dust fouling resistance each to a certain extent, the use of the tetramethoxysilane partial hydrolyzed condensates (1)–(5) as in Examples 1–6 result in still remarkable resistance to raindrop fouling and dust fouling.

Examples 7 and 8, and Comparative Examples 9 and 10

The coating compositions prepared in Examples 1 and 2 and in Comparative Examples 2 and 3 were respectively applied to aluminum plates and baked as in Example 1. The resulting baked testpieces were designated Example 7, Example 8, Comparative Example 9, and Comparative Example 10, respectively. After baking, each testpiece was immersed in water at room temperature for 5 seconds. The resulting coated aluminum plates were analyzed by secondary ion mass spectrometry. The conditions of analysis were as follows.

Instrument: a secondary ion mass spectrometer (A-DIDA 3000, Atomica Co.).
Primary ion species: $O_2^+$ ion
Primary ion energy: 12 keV
Primary ion current: 50 nA
Raster area: 200×200 μm
Gating rate: 20%
Analytical area: 40×40 μm
Detected ions: positive ions
Electron spray conditions: 0.7 kV-30A
Degree of vacuum: $1.3×10^{-6}$ Pa The $O_2^+$ ion sputtering was carried out across the depth of 0–550 nm from the surface of each coated aluminum plate and the intensity counts of output secondary ions ($^{28}Si^+$, $^{50}Ti^+$, $^{12}C^+$) were determined. The creator depth was measured to a sufficient depth with a surface profile analyzer (Sloan, DEKTAK 3030ST) and the sputter rate was calculated from the data and used as a conversion factor. The results are shown in FIGS. 6, 7, 8, and 9.

In Examples 7 and 8 and Comparative Examples 9 and 10 in which the same amount of titanium oxide pigment was included, the concentration of titanium oxide in the paint film was invariably high (50 weight % of the total nonvolatile fraction of the paint. Therefore, the titanium oxide count, i.e. the SIMS count of $^{50}Ti^+$, in a deep region from 400–500 nm from the surface was substantially uniform over all the samples. While it is common practice to correct the profile of various impurity elements by the intensity profile of the matrix element $^{12}C^+$, the amount of titanium in this region was used as a reference and the distribution of elemental Si concentration was corrected with the reference value. The thus-corrected value was regarded as the Si element secondary ion intensity count.

In addition, using the above data, the integral secondary Si ion intensity from the surface to a depth of 400 nm was calculated. Moreover, the ratio of the secondary ion intensity count of Si element on the level of 30 mm deep from the film surface to the mean secondary ion intensity count of Si element in the center of the film (400–500 nm) was calculated. The above-mentioned mean secondary ion intensity value is the mean of secondary ion intensity counts across the depth of 400 and 400 nm. The results are shown in Table 2. Moreover, as in Example 1, the water dynamic reverse tension, raindrop fouling resistance, and dust fouling resistance of each coated aluminum plate were measured or evaluated. The results are shown in Table 2.

TABLE 2

| Example | Secondary Si ion integral intensity at 0–400nm [ratio to Comparative Ex. 10 in parentheses] | Ratio of Si secondary ion at 30 nm [ratio to Comparative Ex. 10 in parentheses] | Dynamic reverse tension (dyn/cm) | Raindrop fouling resistance | Dust fouling resistance |
| --- | --- | --- | --- | --- | --- |
| 7 | $3.98 × 10^6$ (5.23) | 7.5 (6.25) | 67.5 | ⊚ | ⊚ |

TABLE 2-continued

| | Secondary Si ion integral intensity at 0–400nm [ratio to Comparative Ex. 10 in parentheses] | Ratio of Si secondary ion at 30 nm [ratio to Comparative Ex. 10 in parentheses] | Dynamic reverse tension (dyn/cm) | Raindrop fouling resistance | Dust fouling resistance |
|---|---|---|---|---|---|
| Example 8 | 3.89 × 10⁶ (5.11) | 6.2 (5.17) | 64.8 | ◉ | ◉ |
| Comparative Example | | | | | |
| 9 | 1.38 × 10⁶ (1.82) | 1.3 (1.08) | 56.3 | Δ | Δ |
| 10 | 0.76 × 10⁶ (1.00) | 1.2 (1.00) | 45.8 | X | X |

It is apparent from the above results that in Examples 7 and 8 wherein tetramethoxysilane partial hydrolyzed condensates (1) through (5) are used, Si ions derived from the tetramethoxysilane partial hydrolyzed condensate are concentrated in the superficial layer of the paint film to present a gradient profile. On the other hand, in Example 9 wherein tetramethoxysilane partial hydrolyzed condensate (7) is used as a hydrophilicity-imparting agent, Si ions are not presenting a gradient profile. Therefore, it is evident that when any of the tetramethoxysilane partial hydrolyzed condensates (1)–(5) is used as a hydrophilicity-imparting component, a large number of SiOR groups is distributed in the surface layer and those SiOR groups are hydrolyzed to SiOH groups to render the film surface hydrophilic and improve the raindrop fouling resistance.

Example 9

To Uniflon C (white), the silanated silica sol (C-1) prepared in Production Example 4 was added in a proportion of 10 parts by weight relative to 100 parts by weight of the nonvolatile fraction of the above coating material and, then, the tetramethoxysilane partial hydrolyzed condensate (1) (hydrolysis rate 60%, weight average molecular weight 2000, 2–8 mer content 21.9 weight %) was further added in a proportion of 8 parts by weight relative to 100 parts by weight of the nonvolatile fraction of the coating material. This mixture was stirred with Disper to provide a coating composition.

Using this coating composition, a paint film was formed as in Example 1.

Example 10

Using tetramethoxysilane partial hydrolyzed condensate (2) (hydrolysis rate 55%, weight average molecular weight 1800, dimer-octamer content 26.8 weight %) in lieu of tetramethoxysilane partial hydrolyzed condensate (1), the procedure of Example 9 was otherwise repeated to provide a coating composition. Using this coating composition, a paint film was formed as in Example 1.

Example 11

Using tetramethoxysilane partial hydrolyzed condensate (3) (hydrolysis rate 60%, weight average molecular weight 2500, dimer-octamer content 16.8 weight %) in lieu of tetramethoxysilane partial hydrolyzed condensate (1), the procedure of Example 9 was otherwise repeated to provide a coating composition. Using this coating composition, a paint film was formed as in Example 1.

Comparative Example 11

Using the tetramethoxysilane partial hydrolyzed condensate (6) (hydrolysis rate 50%, weight average molecular weight 1020, dimer-octamer content 41.0 weight %) in lieu of the tetramethoxysilane partial hydrolyzed condensate (1), the procedure of Example 9 was otherwise repeated to provide a coating composition. Using this coating composition, a paint film was formed as in Example 1.

Comparative Example 12

Using tetramethoxysilane partial hydrolyzed condensate (7) (hydrolysis rate 40%, weight average molecular weight 580, 2–8 mer content 77.2 weight %) in lieu of tetramethoxysilane partial hydrolyzed condensate (1), the procedure of Example 7 was otherwise repeated to provide a coating composition. Using this coating composition, a paint film was formed as in Example 1.

Comparative Example 13

Except that tetramethoxysilane partial hydrolyzed condensate (1) was not added, the procedure of Example 9 was otherwise repeated to provide a coating composition. Then, using this coating composition, a paint film was formed as in Example 1.

TABLE 3

| Formulation | Example | | | Comparative Example | | |
|---|---|---|---|---|---|---|
| (part by weight) | 9 | 10 | 11 | 11 | 12 | 13 |
| Pigment (Tipaque CR97) | 50 | 50 | 50 | 50 | 50 | 50 |
| PVDF/acrylic resin | 50 | 50 | 50 | 50 | 50 | 50 |
| Silanated silica sol (C-1) | 10 | 10 | 10 | 10 | 10 | 10 |
| Partial hydrolyzed condensate (1) | 8 | — | — | — | — | — |
| Partial hydrolyzed condensate (2) | — | 8 | — | — | — | — |
| Partial hydrolyzed condensate (3) | — | — | 10 | — | — | — |
| Partial hydrolyzed condensate (6) | — | — | — | 8 | — | — |
| Partial hydrolyzed condensate (7) | — | — | — | — | 8 | — |

Example 12

Using a SG mill, 23 parts by weight of the acrylpolyol resin (A-2) obtained in Production Example 2, 50 parts by weight of titanium dioxide (Tipaque CR97, Ishihara Sangyo), and 10 parts by weight of the silanated silica sol (C-1) prepared in Production Example 4 were dispersed together with glass beads at 30° C. for 1.0 hour. The particle size of the dispersion as measured with a particle gauge was not larger than 5 μm. Then, 10 parts by weight of tetramethoxysilane partial hydrolyzed condensate (3) (hydrolysis rate 60%, weight average molecular weight 2500, dimer-octamer content 16.8 weight %) was added and the whole mixture was stirred with Disper. Thereafter, 7 parts by weight of MEK oxime-blocked HMDI (Desmodur BL3175, Sumitomo-Bayer Urethane) and, as a catalyst, 0.1 weight %, based on the nonvolatile fraction, of DBTU and the mixture was stirred with Disper to provide a coating composition.

Using this coating composition, a paint film was formed as in Example 3.

Comparative Example 14

Using tetramethoxysilane partial hydrolyzed condensate (7) (hydrolysis rate 40%, weight average molecular weight 580, dimer-octamer content 77.2 weight %) in lieu of tetramethoxysilane partial hydrolyzed condensate (3), the procedure of Example 12 was otherwise repeated to provide a coating composition. Then, as in Example 3, a paint film was formed.

Comparative Example 15

Except that the tetramethoxysilane partial hydrolyzed condensate (3) was not added, the procedure of Example 12 was otherwise repeated to provide a coating composition. Using this coating composition, a paint film was formed as in Example 3.

Examples 13–15 and Comparative Examples 16–18

An SG mill was charged with the pigment, film-forming resin (A), and organosilica sol (C) according to the recipe shown in Table 4, and the charge was dispersed with glass beads at 30° C. for 1.0 hour. The size of this dispersion as measured with a particle gauge was not larger than 5 μm. Then, the tetramethoxysilane partial hydrolyzed condensate (I) and curing agent (a2) were added in the amounts shown in Table 4. In addition, based on the nonvolatile matter, 0.1 weight % of DBTL, as a catalyst, was added. To the polyester-melamine resin system, 0.3 weight % of dimethylaminoethyl p-toluenesulfonate was added. Each mixture was stirred with Disper to provide a coating composition. The amounts indicated in Table 4 are on a nonvolatile matter basis. Using each coating composition thus obtained, a paint film was formed as in Example 3.

Using the paint films obtained in Examples 9–15 and Comparative Examples 11–18, dust fouling resistance and water dynamic reverse tension (Tr) were evaluated and measured in accordance with the methods described hereinbefore. In addition, resistances to various kinds of stains (raindrop, oil based fast-drying ink, carbon), pencil hardness, acid resistance, alkali resistance, flexibility, and raindrop fouling resistance were evaluated by the following methods. The results are shown in Table 5.

Fouling resistance [natural precipitation removal test]

The test film was exposed to natural precipitation for 3 months and, then, flushed with water. The surface condition was visually evaluated.

◯: Stains removed

Δ: Slight residues

X: Definite residues

Fouling resistance [oil-based fast-drying ink]

Using a felt-point pen (oil-based marking ink, red, Teranishi Chemical), a line was drawn and dried at room temperature for 24 hours. Then, using an ethanol-soaked pad, the line was erased and the surface was examined for possible traces.

◯: No trace

Δ: Slight trace

X: Definite trace

Fouling resistance [carbon]

About 2 ml of a 10% aqueous dispersion of carbon black was dripped onto the coated testpiece and dried at 80° C. for 24 hours. Then, using a color difference meter, the color difference ΔE between the intact area and the soiled area after wiping with a water-soaked pad was measured.

◉: ΔE: <1

◯: ΔE: 1–<10

Δ: ΔE: 10–<20

X: ΔE: >20

TABLE 4

| Formulation | Example | | | | Comparative Example | | | | |
|---|---|---|---|---|---|---|---|---|---|
| (part by weight) | 12 | 13 | 14 | 15 | 14 | 15 | 16 | 17 | 18 |
| Pigment (Tipaque CR97) | 50 | 50 | 50 | 100 | 50 | 50 | 50 | 50 | 50 |
| Acrylpolyol resin (A-2) | 23 | — | — | 100 | 23 | 23 | 23 | — | — |
| Alkoxysilyl-containing acrylic resin (A-3) | — | 50 | — | — | — | — | — | 50 | — |
| Polyester polyol resin (A-4) | — | — | 25 | — | — | — | — | — | 25 |
| MIBK-silica sol (C-2) | 10 | 10 | 10 | 60 | 10 | 10 | — | — | — |
| Partial hydrolyzed condensate | | | | | | | | | |
| (1) | — | 5 | — | 20 | — | — | — | — | — |
| (2) | — | — | — | — | — | — | 8 | — | — |
| (3) | 8 | — | — | — | — | — | — | — | — |
| (5) | — | — | 10 | — | — | — | — | — | — |
| Partial hydrolyzed condensate (7) | — | — | — | — | 10 | — | — | — | — |
| Desmodur BL3175 | 7 | — | — | 30 | 7 | 7 | 7 | — | — |
| Cyrnel 235 | — | — | 10 | 7 | — | — | — | — | 10 |
| DBTL | 0.1 | 0.1 | — | 0.2 | 0.1 | 0.1 | 0.1 | 0.1 | — |
| Dimethylaminoethyl p-toluenesulfonate | — | — | 0.3 | 0.9 | — | — | — | — | 0.3 |

In Table 4, the pigment is Tipaque CR97 (titanium dioxide, Ishihara Sangyo); the partial hydrolyzed condensate (5) is a condensate with a hydrolysis rate of 60%, a weight average molecular weight of 1800, and a dimer-octamer content of 27.0 weight %; Desmodur BL3175 is an MEK oxime-blocked HMDI (Sumitomo-Bayer Urethane); and Cymel 235 is an alkyl-etherified melamine resin (methoxy 60/butoxy 40, Mitsui-Cytec).

Pencil hardness

According to JIS K5400, the paint film dried for at least 1 hour was subjected to a pencil test using lead pencils and color pencils as defined in JIS S6006 and the hardness code of the pencil causing a scratch mark was taken as the hardness of the paint film.

Acid resistance

The paint film was immersed in 5% HCl solution at 20° C. for 24 hours and the appearance of the film was visually evaluated.

◯: no change

Δ: blisters formed

X: paint film dissolved

Alkali resistance

The paint film was immersed in 5% aqueous solution of NaOH at 20° C. for 24 hours and the appearance of the paint film was evaluated.

◯: no change

Δ: blisters formed

X: paint film dissolved

Flexibility

The coated testpiece was bent by 180° and the minimum T number not causing cracks in the bend was recorded. The T number represents the number of steel sheets of the same thickness inserted at bending. 2T, for instance, means that two steel sheets of the same thickness were inserted.

Raindrop fouling resistance (ultra-low foulability)

The coated plate was erected in a vertical position in such a manner that rainwater falls down its coated surface from a pent roof made of 30 cm-wide corrugated sheet (3 mm-deep grooves at a 3 mm pitch) at a grade of 10°. This setup was allowed to sit in Neyagawa City, Osaka Prefecture for 6 months. Then, using a color difference meter, the color difference ΔE between the intact area and the exposed area was determined.

◉: ΔLE: <1

◯: ΔE: 1–<10

Δ: ΔE: 10–<20

Figure 10:
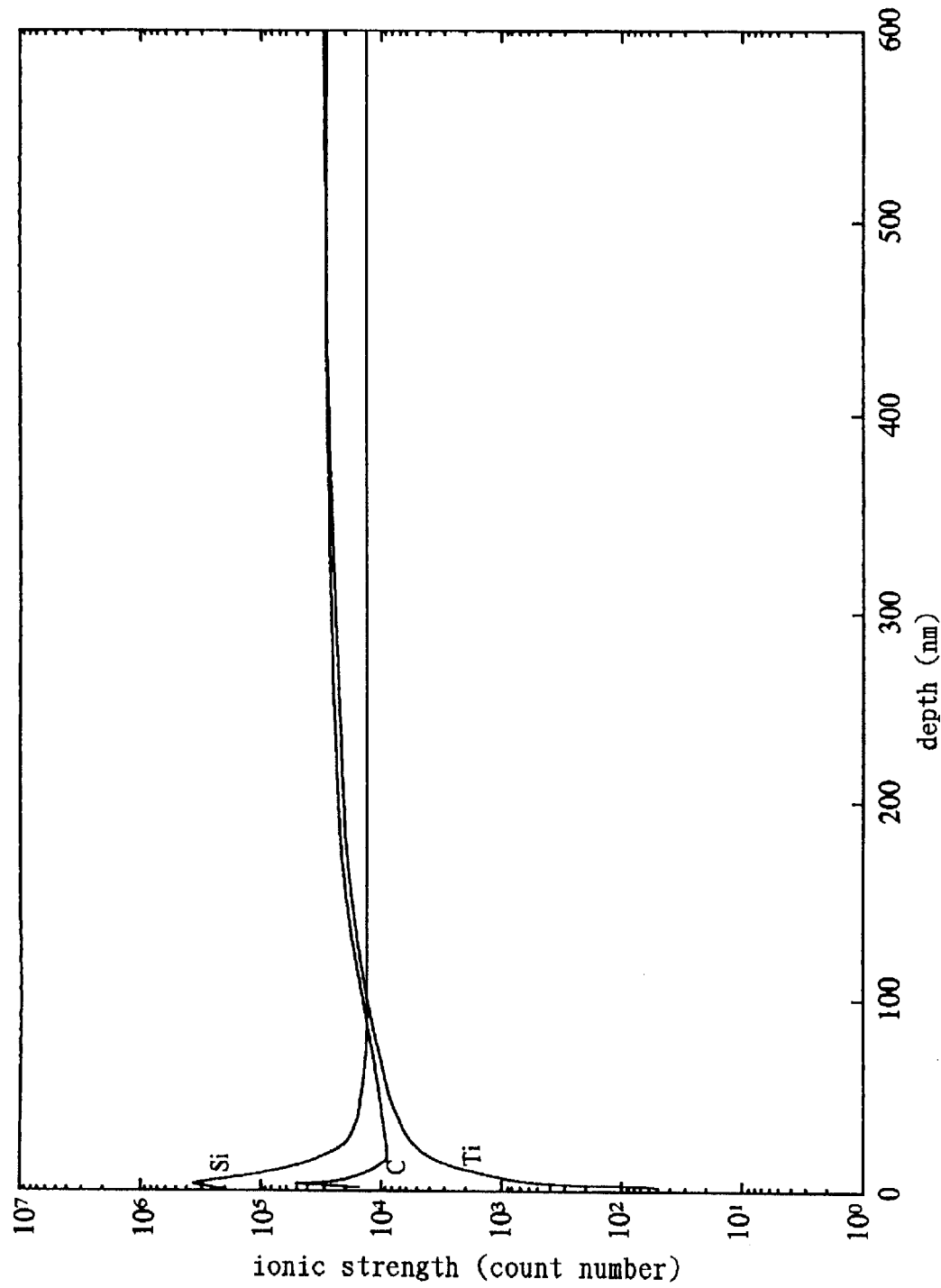
FIG. 10 shows test results from secondary ion mass spectrometry.
Figure 11:
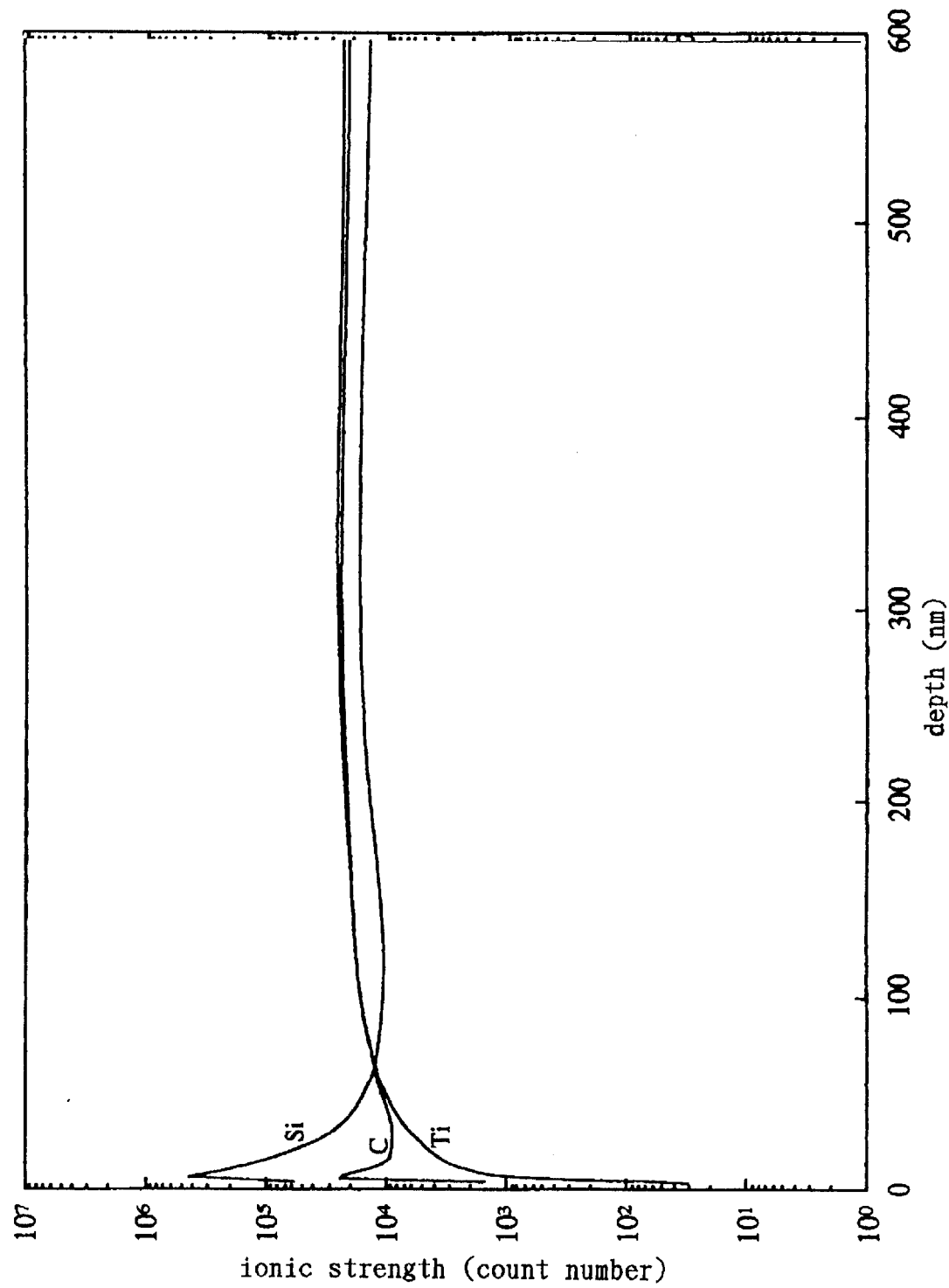
FIG. 11 shows test results from secondary ion mass spectrometry.
Figure 12:
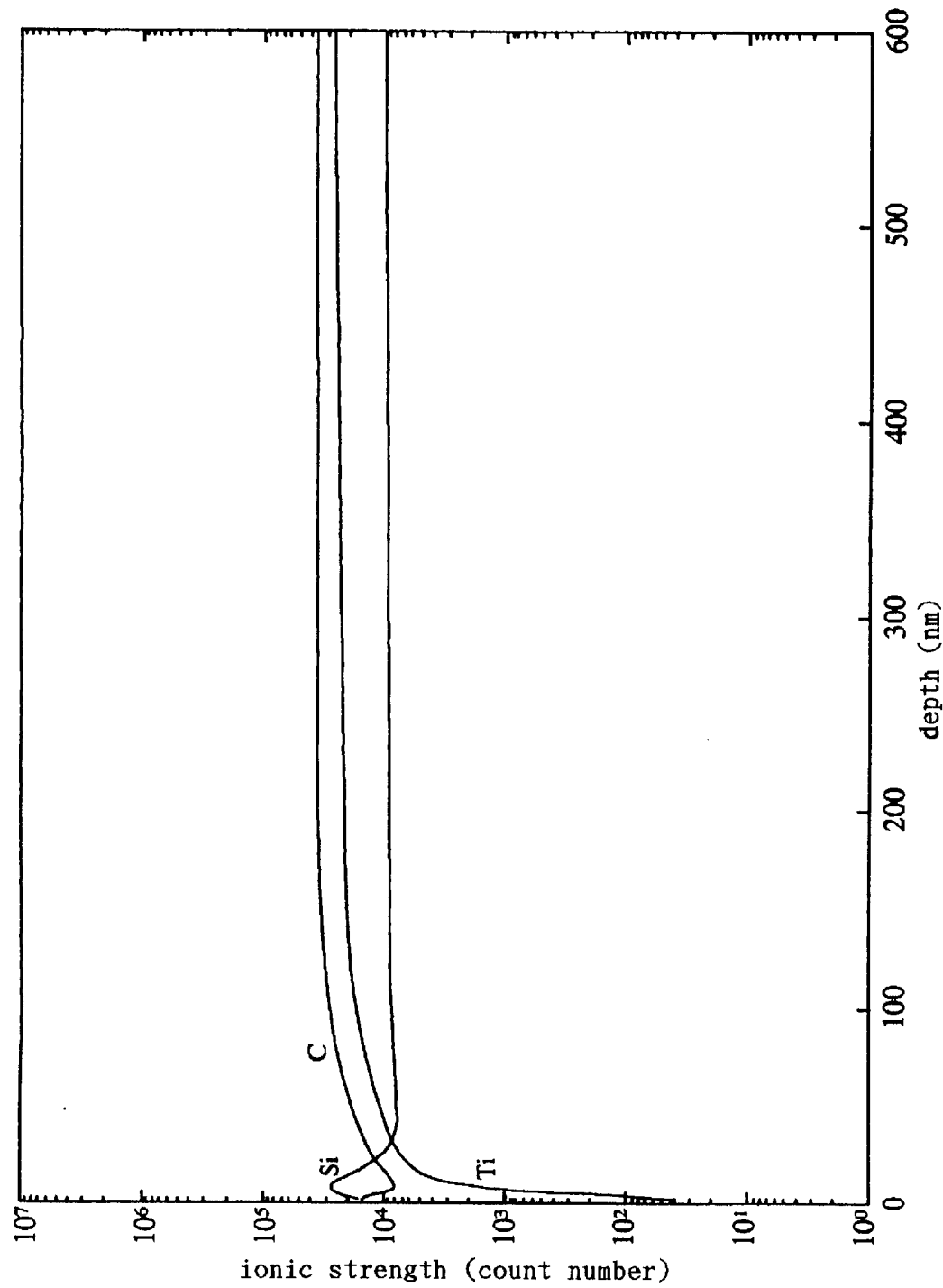
FIG. 12 shows test results from secondary ion mass spectrometry.

X: ΔE: >20 num plates and baked under the same conditions as in Example 1. The paint films thus obtained were designated Example 16-1, Example 16-2, and Comparative Example 19, respectively. After baking, the testpieces were immersed in water at room temperature for 5 seconds. The coated aluminum plates thus prepared were analyzed by secondary ion mass spectrometry. The analytical conditions were the same as those used in Example 7 except that the scanned depth was 0–600 nm. The results are shown in FIGS. 10, 11, and 12, respectively.

The coating compositions according to Example 16-1, Example 16-2, and Comparative Example 19 contained the same amount of titanium dioxide as the pigment component and, therefore, the concentration of titanium dioxide in each film was invariably high (50 weight % of the nonvolatile fraction). Moreover, in the deep stratum of the film from 400 to 600 nm from the surface, the titanium dioxide count, i.e. the SIMS count of $^{50}Ti^+$, was substantially uniform over all the coated aluminum testpieces. Therefore, although it is common practice to correct the profile of each impurity element by the profile of the matrix element $^{12}C^+$, the amount of titanium in the above stratum was selected as a reference to correct the profile of Si element and the corrected value was taken as the secondary ion intensity count of Si element.

Furthermore, from the data generated above, the integral secondary ion intensity count of Si element across a depth of 400 nm from the surface was calculated. In addition, the ratio of the Si element secondary ion intensity count on the level of 30 nm from the surface to the Si element secondary ion intensity count in the center (400 nm) of thickness of the film was calculated. The results are shown in Table 6.

Furthermore, the fouling (stain) resistance (natural precipitation, oil-based fast-drying ink, carbon), pencil hardness, acid resistance, alkali resistance, flexibility, rain-

TABLE 5

|  | Example | | | | | | | Comparative Example | | | | | | | |
|---|---|---|---|---|---|---|---|---|---|---|---|---|---|---|---|
|  | 9 | 10 | 11 | 12 | 13 | 14 | 15 | 11 | 12 | 13 | 14 | 15 | 16 | 17 | 18 |
| Fouling resistance, natural precipitation removal test (3 months) | ◯ | ◯ | ◯ | ◯ | ◯ | ◯ | ◯ | ◯ | ◯ | Δ | ◯ | ◯ | ◯ | ◯ | Δ |
| Fouling resistance, oil-based fast-drying ink | ◯ | ◯ | ◯ | ◯ | ◯ | ◯ | ◯ | ◯ | ◯ | Δ | ◯ | ◯ | ◯ | ◯ | X |
| Fouling resistance, carbon | ◉ | ◉ | ◉ | ◉ | ◉ | ◉ | ◉ | ◯ | ◯ | X | ◯ | ◯ | ◯ | ◯ | X |
| Pencil hardness | 2H | 2H | 2H | 4H | 5H | 3H | 3H | H | F | F | 3H | H | H | 3H | H |
| Acid resistance | ◯ | ◯ | ◯ | ◯ | ◯ | ◯ | ◯ | Δ | Δ | ◯ | X | ◯ | ◯ | Δ | ◯ |
| Alkali resistance | ◯ | ◯ | ◯ | ◯ | ◯ | ◯ | ◯ | ◯ | Δ | ◯ | X | ◯ | ◯ | Δ | ◯ |
| Flexibility | 2T | 2T | 3T | 8T | 10T | 8T | 6T | 2T | 2T | 2T | 9T | 8T | 8T | 10T | 8T |
| Ultra-low foulability (6 months) | ◉ | ◉ | ◉ | ◉ | ◉ | ◉ | ◉ | ◯ | Δ | X | Δ | X | ◯ | ◯ | X |
| Dust fouling resistance | ◉ | ◉ | ◉ | ◉ | ◉ | ◯ | ◉ | ◯ | Δ | X | Δ | X | ◯ | Δ | X |
| Tr (dyn/cm) | 65 | 63 | 62 | 60 | 60 | 61 | 58 | 55 | 54 | 46 | 55 | 32 | 64 | 56 | 31 |

Example 16-1, Example 16-2, Comparative Example 19

The coating composition prepared in Example 10 [containing tetramethoxysilane partial hydrolyzed condensate (2)], a coating composition prepared using tetramethoxysilane partial hydrolyzed condensate (5) (hydrolysis rate 60%, molecular weight 3400, dimer-octamer content 14.5%) in lieu of tetramethoxysilane partial hydrolyzed condensate (2) under otherwise the same conditions as in Example 10, and the coating composition prepared in Comparative Example 13 (not containing a tetramethoxysilane partial hydrolyzed condensate) were respectively applied to alumidrop fouling resistance, dust fouling resistance, and water dynamic reverse tension (Tr) were also evaluated or measured by the same methods as used in Example 9. The results are shown in Table 6.

TABLE 6

|  | Example 16-1 | Example 16-2 | Comparative Ex. 19 |
|---|---|---|---|
| Si secondary ion integral intensity for 0–400 nm | $1.69 \times 10^6$ | $2.25 \times 10^6$ | $0.76 \times 10^6$ |

TABLE 6-continued

|  | Example 16-1 | Example 16-2 | Comparative Ex. 19 |
|---|---|---|---|
| [ratio to Comparative Ex. 10 in parentheses] | (2.22) | (2.96) | (1.00) |
| Si secondary ion intensity ratio: 300 nm/400 nm | 2.0 | 3.2 | 1.2 |
| Fouling resistance, natural precipitation removal test (3 months) | ○ | ○ | Δ |
| Fouling resistance, oil-based fast-drying ink | ○ | ○ | Δ |
| Fouling resistance, carbon | ◎ | ◎ | X |
| Pencil hardness | 2H | 2H | F |
| Acid resistance | ○ | ○ | ○ |
| Alkali resistance | ○ | ○ | ○ |
| Flexibility | 2T | 2T | 2T |
| Ultra-low foulability (6 months) | ◎ | ◎ | Δ |
| Dust fouling resistance | ◎ | ◎ | Δ |
| Tr (dyn/cm) | 63 | 62 | 54 |

It is clear from the above results that in Example 16-1 and Example 16-2 wherein tetramethoxysilane partial hydrolyzed condensate (2) and tetramethoxysilane partial hydrolyzed condensate (5) are used, respectively, many Si ions derived from the tetramethoxysilane partial hydrolyzed condensate are concentrated in the superficial layer of the paint film, presenting a gradient profile. On the other hand, in Comparative Example 19, wherein the tetramethoxysilane partial hydrolyzed condensate is not used as a hydrophilicity imparting component, Si ions are distributed in the whole stratum of the paint film, instead of being concentrated in the superficial layer. Therefore, it is clear that when a tetramethoxysilane partial hydrolyzed condensate satisfying the conditions of the present invention is used as a hydrophilicity-imparting agent, the surfade layer of the paint has many residual SiOR groups which are hydrolyzed to SiOH groups, thus contributing to the resistance to raindrop fouling.

Example 17

An SG mill was charged with 50 parts by weight of acrylpolyol resin (A-2), 50 parts by weight of titanium dioxide (Tipaque CR91, Ishihara Sangyo), 8 parts by weight of tetramethoxysilane partial hydrolyzed condensate (5) (hydrolysis rate 60%, weight average molecular weight 1800, dimer-octamer content 27.0 weight %), and 5 parts by weight of glass fiber (Microsurface Strand REV-1, 13 μm in diameter, 35 μm long, Mohs hardness 6.5, Japan Glass Fiber Co.)and the mixture was dispersed with the aid of glass beads at 30° C. for 1.5 hours. The particle size of the dispersion as measured with a particle gauge was not over 5 microns. Then, relative to the total nonvolatile matter, 15 parts by weight of blocked isocyanate (Desmodur BL3175, Sumitomo-Bayer Urethane) and, as a catalyst, 0.1 weight % of DBTL were added and the whole mixture was stirred with Disper to provide a coating composition.

Example 18

An SG mill was charged with 50 parts by weight of polyester polyol resin (A-4), 50 parts by weight of titanium dioxide (Tipaque CR91, Ishihara Sangyo), 5 parts by weight of tetramethoxysilane partial hydrolyzed condensate (2) (hydrolysis rate 55%, weight average molecular weight 1800, dimer-octamer content 26.8 weight %), and 5 parts by weight of glass fiber (Microsurface Strand REV-1, 13 μm in diameter, 35 μm long, Mohs hardness 6.5, Japan Glass Fiber Co.), polymethyl methacrylate beads (Tecpolymer MBX20, particle diameter 20 μm, Sekisui Chemical Co.) and the mixture was dispersed with the aid of glass beads at 30° C. for 1.5 hours. The particle size of the dispersion as measured with a particle gauge was not over 5 microns. Then, 5 parts by weight of melamine resin (Sumimal M40S, Sumitomo Chemical Co.), 15 parts by weight of blocked isocyanate (Coronate 2515, Nippon Polyurethane) and, based on the nonvolatile fraction, 0.3 weight % of dimethylaminoethyl p-toluenesulfonate and 0.1 weight % of DBTL were added and the whole mixture was stirred with Disper to provide a coating composition.

Example 19

An SG mill was charged with 50 parts by weight of polyester polyol resin (A-4), 50 parts by weight of titanium dioxide (Tipaque CR91, Ishihara Sangyo), 5 parts by weight of tetramethoxysilane partial hydrolyzed condensate (1) (hydrolysis rate 60%, weight average molecular weight 2000, dimer-octamer content 21.9 weight %), 20 parts by weight of glass beads (GB210, particle diameter 17 μm, Mohs hardness 6.5, Toshiba-Balotini), and 2 parts by weight of polytetrafluoroethylene powder (Zefluor F, particle diameter 5 μm, Central Glass Co.) and the mixture was dispersed with the aid of glass beads at 30° C. for 1.5 hours. The particle size of the dispersion as measured with a particle gauge was not over 5 microns. Then, 15 parts by weight of melamine resin (Cymel 235, methoxy/butoxy mixed-modified melamine resin, Mitsui Cytec) and, as a catalyst, 0.3 weight %, relative to the total nonvolatile matter, of dimethylaminoethyl p-toluenesulfonate were added and the whole mixture was stirred with Disper to provide a coating composition.

Example 20

Using Disper, a coating composition was prepared by stirring 100 parts by weight of Uniflon C (white), 5 parts by weight of tetramethoxysilane partial hydrolyzed condensate (3) (hydrolysis rate 60%, weight average molecular weight 2500, dimer-octamer content 16.8 weight %), and 5 parts by weight of polyacrylonitrile beads (Toughtic AM, particle diameter 11 μm, Toyobo).

Example 21

Using Disper, a coating composition was prepared by stirring 100 parts by weight of Uniflon C (white), 5 parts by weight of tetramethoxysilane partial hydrolyzed condensate (2) (hydrolysis rate 55%, weight average molecular weight 1800, dimer-octamer content 26.8 weight %), and 10 parts by weight of polymethyl methacrylate beads (Tecpolymer MBX20, particle diameter 20 μm, Sekisui Chemical Co.).

Example 22

Using Disper, a coating composition was prepared by stirring 100 parts by weight of Uniflon C (white), 5 parts by weight of tetramethoxysilane partial hydrolyzed condensate (1) (hydrolysis rate 60%, weight average molecular weight 2000, dimer-octamer content 21.9 weight %), and 5 parts by weight of glass fiber (Microsurface Strand REV-1, 13 μm in diameter, 35 μm long, Mohs hardness 6.5, Japan Glass Fiber Co.), and 2 parts by weight of polytetrafluoroethylene powder (Maxifluor White 2BI-A, particle diameter 5–7 μm, Rotor International).

Example 23

Using Disper, a coating composition was prepared by stirring 100 parts by weight of Uniflon C (white), 8 parts by weight of tetramethoxysilane partial hydrolyzed condensate (1) (hydrolysis rate 60%, weight average molecular weight 2000, dimer-octamer content 21.9 weight %), and 5 parts by weight of glass fiber (Microsurface Strand REV-1, 13 μm in diameter, 35 μm long, Mohs hardness 6.5, Japan Glass Fiber Co.), and 5 parts by weight of polymethyl methacrylate beads (Tecpolymer MBX20, particle diameter 20 μm, Sekisui Chemical Co.).

Example 24

A SG mill was charged with 50 parts by weight of acrylic resin (A-5), 50 parts by weight of titanium dioxide (Tipaque CR91, Ishihara Sangyo), 10 parts by weight of tetramethoxysilane partial hydrolyzed condensate (1) (hydrolysis rate 60%, weight average molecular weight 2000, dimer-octamer content 21.9 weight %), and 5 parts by weight of glass fiber (Microsurface Strand REV-1, 13 μm in diameter, 35 μm long, Mohs hardness 6.5, Japan Glass Fiber Co.) and the mixture was dispersed with the aid of glass beads at 30° C. for 1.5 hours. The particle size of this dispersion as measured with a particle gauge was not over 5 microns. On the other hand, 5 parts by weight of an isocyanate (Sumidur N75, Sumitomo-Bayer Urethane) was separately prepared. A two-package coating system was thus provided.

Example 25

A SG mill was charged with 50 parts by weight of acrylic resin (A-5), 50 parts by weight of titanium dioxide (Tipaque CR91, Ishihara Sangyo), 7 parts by weight of tetramethoxysilane partial hydrolyzed condensate (1) (hydrolysis rate 60%, weight average molecular weight 2000, dimer-octamer content 21.9 weight %), and 5 parts by weight of glass fiber (Microsurface Strand REV-1, 13 μm in diameter, 35 μm long, Mohs hardness 6.5, Japan Glass Fiber Co.), 2 parts by weight of silica (Nipsil SS170X, size 2.7–3.5 μm, Mohs hardness 7, Nippon Silica Kogyo), and 15 parts by weight of polymethyl methacrylate beads (Tecpolymer MBX20, particle diameter 20 μm, Sekisui Chemical Co.), and the mixture was dispersed with the aid of glass beads at 30° C. for 1.5 hours. The particle size of this dispersion as measured with a particle gauge was not over 5 microns. On the other hand, 5 parts by weight of an isocyanate (Sumidur N75, Sumitomo-Bayer Urethane) was separately prepared. A two-package coating system was thus provided.

Comparative Example 20

Except that glass fiber was not included, the procedure of Example 17 was otherwise repeated to provide a coating composition.

Comparative Example 21

Except that tetramethoxysilane partial hydrolyzed condensate (5) was not added, the procedure of Example 17 was otherwise repeated to provide a coating composition.

Comparative Example 22

Except that 20 parts by weight of organosilica sol (MIBK-ST, particle diameter 0.01 μm, Mohs hardness 7, Nissan Chemical Co.) was used in lieu of 5 parts by weight of glass fiber, the procedure of Example 17 was otherwise repeated to provide a coating composition.

Comparative Example 23

Except that 5 parts by weight of coarse silica (Nipsil SS30S, particle diameter 100 μm, Mohs hardness 7, Nippon Silica Kogyo Co.) was used in lieu of 5 parts by weight of glass fiber, the procedure of Example 17 was otherwise repeated to provide a coating composition.

Comparative Example 24

Except that tetramethoxysilane partial hydrolyzed condensate (3) and polyacrylonitrile beads were not added, the procedure of Example 20 was otherwise repeated to provide a coating composition.

Using the coating compositions obtained in Examples 17–25 and Comparative Examples 20–24, the water dynamic reverse tension (Tr) was measured and evaluated. The shelf-life (Storage Stability) of each composition was also evaluated according to the following criteria. The results are shown in Table 7.

Shelf-life

The viscosity of each coating composition was adjusted with a thinner to 60 seconds (Ford Cup #4, 20° C.) and stored at a constant temperature of 20° C. for 1 week. The composition was then checked for precipitates.

○: substantially no precipitate or a precipitate forms but can be liquidated by gentle manual stirring.

Δ: a precipitate forms but the initial homogeneity resumes upon stirring with Disper (1000 rpm) (soft cake)

X: a precipitate forms a hard cake and conglomerates remain even after stirring with Disper.

Method for preparing a coated sheet

Using a 0.4 mm-thick galvanized steel sheet subjected to zinc phosphate treatment as the substrate, a polyester resin series primer (Flexcoat P600 Primer, Nippon Paint Co.) was coated with a bar coater in a dry film thickness of 6±1 μm and baked at an ultimate sheet temperature of 220° C. for 1 minute. Then, the coating compositions obtained in Examples 17–25 and Comparative Examples 20–24 were respectively coated on the baked primer coat with a bar coater in a dry film thickness of 20 μm and baked at an ultimate sheet temperature of 220° C. for 1 minutes to provide a paint film. Using these paint films as samples, the pencil hardness, scratch resistance, and fouling (strain) resistance (oil-based fast-drying ink, carbon) were measured and evaluated. In addition, raindrop fouling resistance was evaluated according to the following criteria. The results are shown in Table 7.

Raindrop fouling resistance (ultra-low foulability)

The coated plate was erected in a vertical position in such a manner that rainwater falls down its coated surface from a pent roof made of 30 cm corrugated sheet (3 mm-deep grooves at a 3 mm pitch) at a grade of 10°. This setup was allowed to sit in Neyagawa City, Osaka Prefecture for 6 months. Then, the degree of fouling was visually evaluated according to the following criteria.

⊚: No rain streaks

○: Slight rain streaks

Δ: Fair rain streaks

X: Marked rain streaks

TABLE 7

| Formulation (part by weight) | Example | | | | | | | | | Comparative Ex. | | | | |
|---|---|---|---|---|---|---|---|---|---|---|---|---|---|---|
| | 17 | 18 | 19 | 20 | 21 | 22 | 23 | 24 | 25 | 20 | 21 | 22 | 23 | 24 |
| Typaque CR97 | 50 | 50 | 50 | — | — | — | — | 50 | 50 | 50 | 50 | 50 | 50 | — |
| Acrylpolyol (A-2) | 50 | — | — | — | — | — | — | — | — | 50 | 50 | 50 | 50 | — |
| Polyester polyol (A-4) | — | 50 | 50 | — | — | — | — | — | — | — | — | — | — | — |
| Acrylid resin (A-5) | — | — | — | — | — | — | — | 50 | 50 | — | — | — | — | — |
| Uniflon C | — | — | — | 100 | 100 | 100 | 100 | — | — | — | — | — | — | 100 |
| Desmodur BL3175 | 15 | — | — | — | — | — | — | — | — | 15 | 15 | 15 | 15 | — |
| Coronate 2515 | — | 15 | — | — | — | — | — | — | — | — | — | — | — | — |
| Sumimal M40S | — | 5 | — | — | — | — | — | — | — | — | — | — | — | — |
| Cymel 235 | — | — | 15 | — | — | — | — | — | — | — | — | — | — | — |
| Sumidur N75 | — | — | — | — | — | — | — | 5 | 5 | — | — | — | — | — |
| Partial hydrolyzed condensate (5) | 8 | — | — | — | — | — | — | — | — | — | — | — | — | — |
| Partial hrdrolyzed condensate (6) | — | — | — | — | — | — | — | — | — | 8 | — | 8 | 8 | — |
| Partial hydrolyzed condensate (2) | — | 5 | — | — | 5 | — | — | — | — | — | — | — | — | — |
| Partial hydrolyzed condensate (1) | — | — | 5 | — | — | 5 | 8 | 10 | 7 | — | — | — | — | — |
| Partial hydrolyzed condensate (3) | — | — | — | 5 | — | — | — | — | — | — | — | — | — | — |
| Microsurface Strand REV-1 | 5 | 5 | — | — | — | 5 | 5 | 5 | 5 | — | 5 | — | — | — |
| GB210 | — | — | 20 | — | — | — | — | — | — | — | — | — | — | — |
| Sankilite Y04 | — | — | — | — | — | — | — | — | — | — | — | — | — | — |
| Nipsil SS170X | — | — | — | — | — | — | — | — | 2 | — | — | — | — | — |
| Tecpolymer MBX20 | — | 5 | — | — | 10 | — | 5 | — | 15 | — | — | — | — | — |
| Zefluor Lube F | — | — | 2 | — | — | — | — | — | — | — | — | — | — | — |
| Toughtic AM | — | — | — | 5 | — | — | — | — | — | — | — | — | — | — |
| MAXIFLOUR WHITA 2BI-A | — | — | — | — | — | 2 | — | — | — | — | — | — | — | — |
| MIBK-ST | — | — | — | — | — | — | — | — | — | — | — | — | 20 | — |
| Nipsil SS30S | — | — | — | — | — | — | — | — | — | — | — | — | 5 | — |
| Shelf-life | ○ | ○ | ○ | ○ | ○ | ○ | ○ | ○ | ○ | ○ | X | ○ | X | ○ |
| Water dynamic reverse tension | 57 | 56 | 60 | 55 | 58 | 61 | 59 | 63 | 62 | 57 | 37 | 55 | 58 | 46 |
| Pencil hardness | 5H | 6H | 6H | 3H | 3H | 4H | 4H | 4H | 4H | H | 5H | H | 5H | F |
| Scratch resistance | ○ | ○ | ○ | ○ | ○ | ○ | ○ | ○ | ○ | X | ○ | X | X | X |
| Fouling resistance, oil-based ink | ○ | ○ | ○ | ○ | ○ | ○ | ○ | ○ | ○ | ○ | X | ○ | X | Δ |
| Fouling resistance, carbon | ○ | ○ | ○ | ○ | ○ | ○ | ○ | ○ | ○ | ○ | X | ○ | Δ | X |
| Raindrop fouling resistance | ○ | ○ | ○ | ○ | ○ | ○ | ○ | ○ | ○ | ○ | X | ○ | ○ | X |

It was, therefore, clear that addition of the tetramethoxysilane partial hydrolyzed condensate results in improved stain/fouling resistance and that addition of the aggregate results in improved scratch resistance. It was also found from Examples 17–25 that despite addition of the aggregate, the shelf-life of the coating composition is still very satisfactory.

Production Example 7
Production of an aggregate-containing primer

Based on 100 parts by weight of Superlac DIFPO1 primer (urethane-modified epoxy resin/melamine-curing primer/strontium chromate contained, Nippon Paint Co.), 5.0 parts by weight of baryta (Precipitated Barium sulfate 100, particle diameter 0.5 μm, Mohs hardness 3.0–3.5, Sakai Kagaku Kogyo Co.) and 5.0 parts by weight of glass fiber (Microsurface Strand REV-1, diameter 13 μm, Mohs hardness 6.5, Nippon Glass Fiber Co.) were added to the primer and the mixture was stirred with Disper to provide an inorganic aggregate-containing primer.

Example 26

A galvanized steel was subjected to coating type chromate treatment and using a bar coater, the aggregate-containing primer obtained in Production Example 7 was coated in a dry film thickness of 6±1 μm and baked at an ultimate sheet temperature of 830° C. for 50 seconds. Then, using a bar coater, the coating composition obtained in Example 17 was coated on the baked primer coat in a dry film thickness of 20 μm and baked at an ultimate sheet temperature of 220° C. for 1 minute to provide a paint film. The pencil hardness of the paint film as determined by the same procedure as in Example 17 was 6H.

Example 27

Using the top coating composition obtained in Example 20 in lieu of the top coating composition obtained in Example 17, a paint film was formed under the same conditions as in Example 26. The pencil hardness of this paint film, as determined by the same procedure as in Example 17, was 4H.

It is clear from Examples 26 and 27 that when the aggregate-containing primer is used, the paint film can be further improved in hardness as compared with Examples 17 and 20 in which the same top coating composition was used.

BRIEF DESCRIPTION OF THE DRAWINGS

FIG. 1 is a schematic sectional view of the apparatus used for measuring the water dynamic reverse tension (Tr) of a testpiece.

FIG. 2 is a schematic view showing the status of the testpiece during measurement of its water dynamic reverse tension (Tr).

FIG. 3 is a graph showing the change in the load acting on the testpiece as tested with the apparatus for measuring its water dynamic reverse tension (Tr). The load is plotted on the ordinate and the amount of displacement is plotted on the abscissa.

Figure 4:
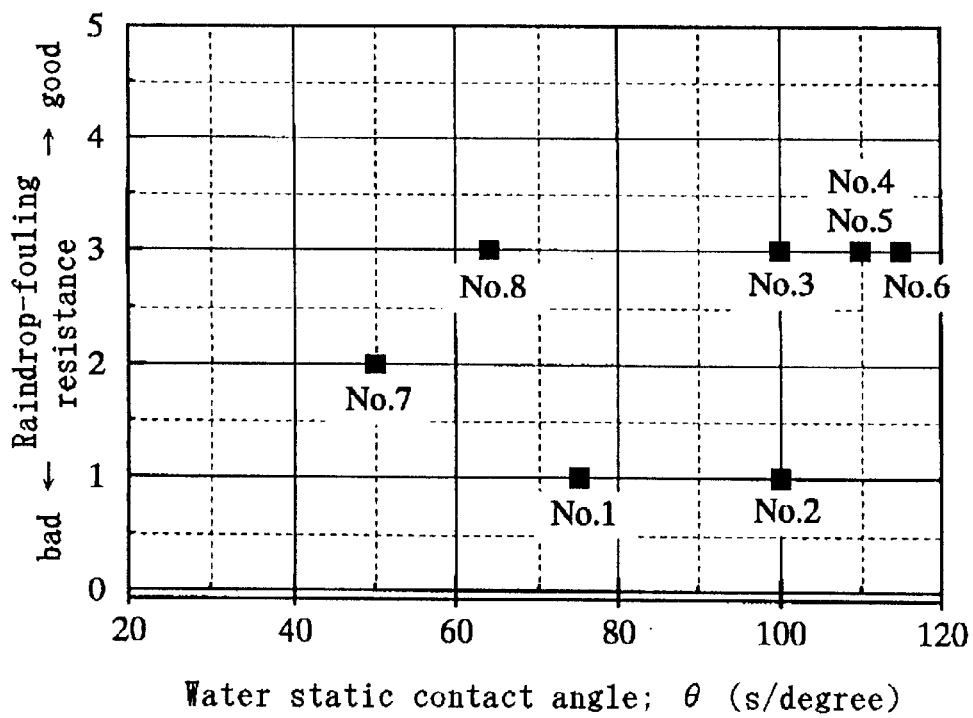
FIG. 4 illustrates results of raindrop fouling resistance tests.

FIG. 4 is a diagrammatic representation of the relation between static contact angle and raindrop fouling resistance.

Figure 5:
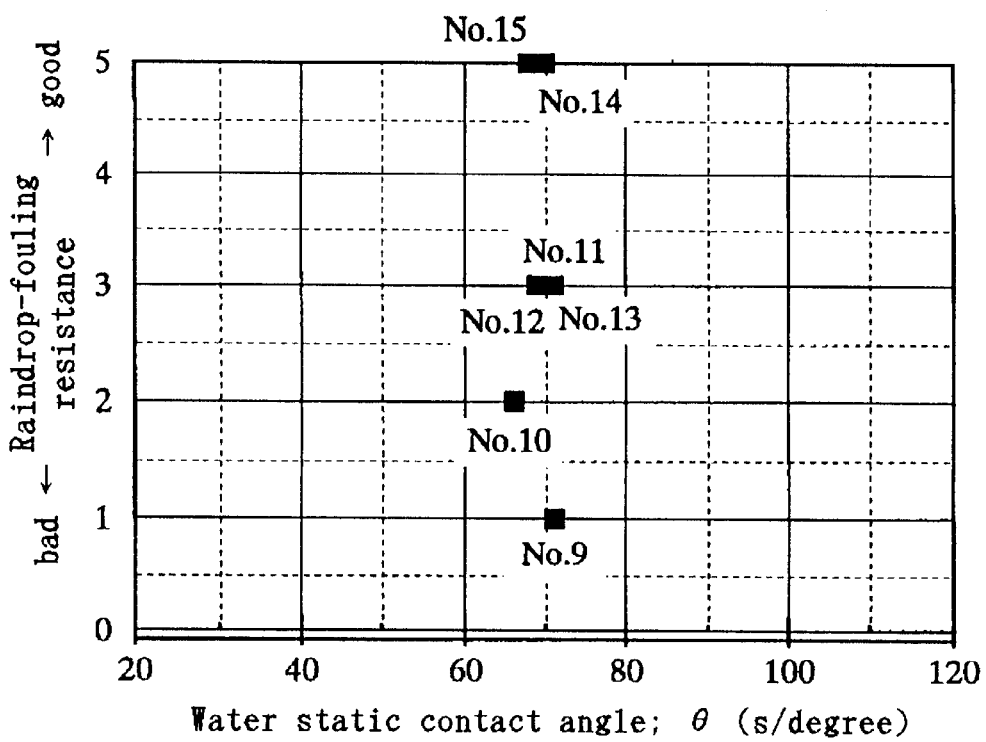
FIG. 5 illustrates results of raindrop fouling resistance tests.

FIG. 5 is a diagrammatic representation of the relation between static contact angle and raindrop fouling resistance at varying levels of addition of an alkoxysilyl-containing polymer.

Figure 6:
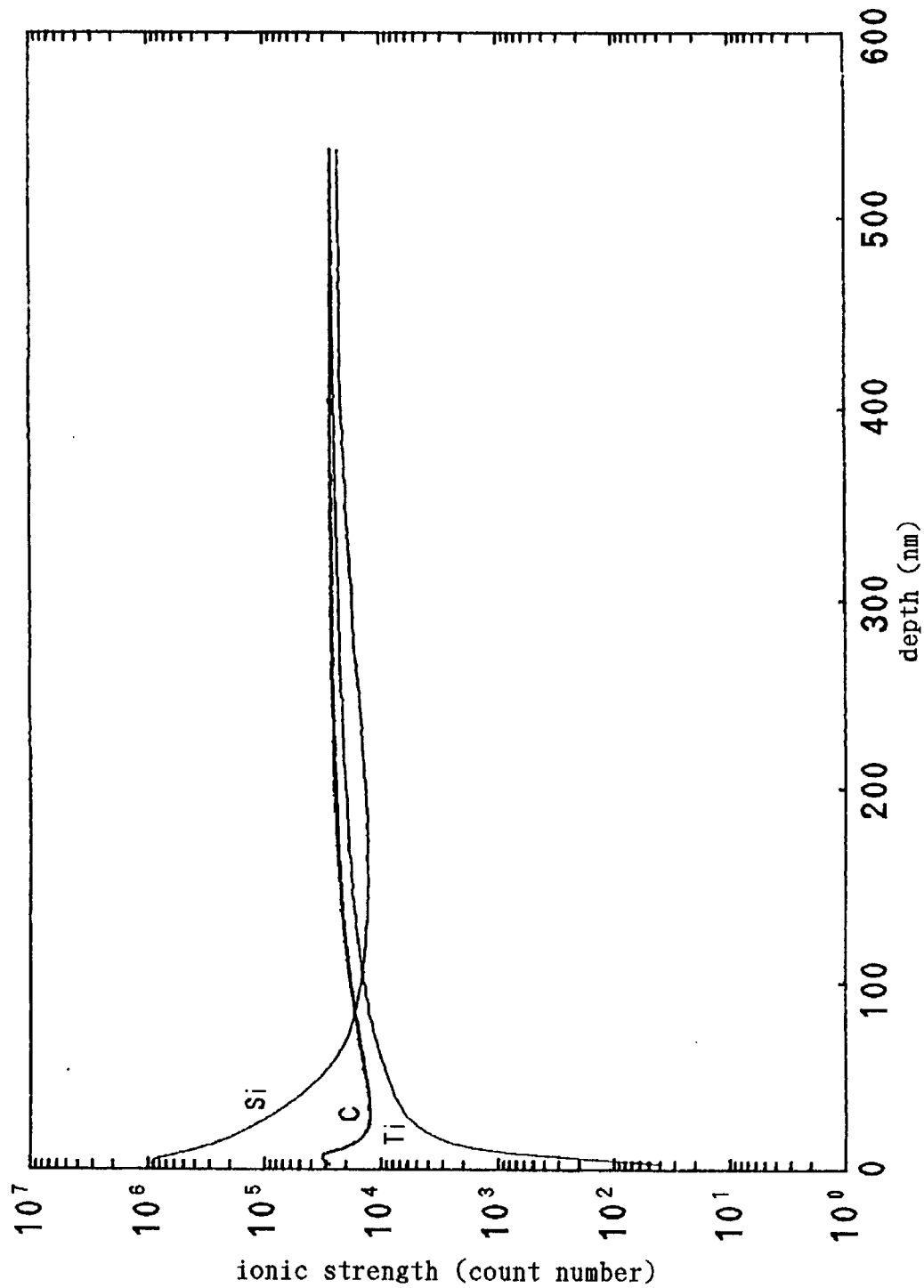
FIG. 6 shows test results from secondary ion mass spectrometry.

FIG. 6 is a chart showing the distribution of elemental Si concentration in Example 7. The secondary ion intensity (count) is plotted on the ordinate and the depth (nm) is plotted on the abscissa.

Figure 7:
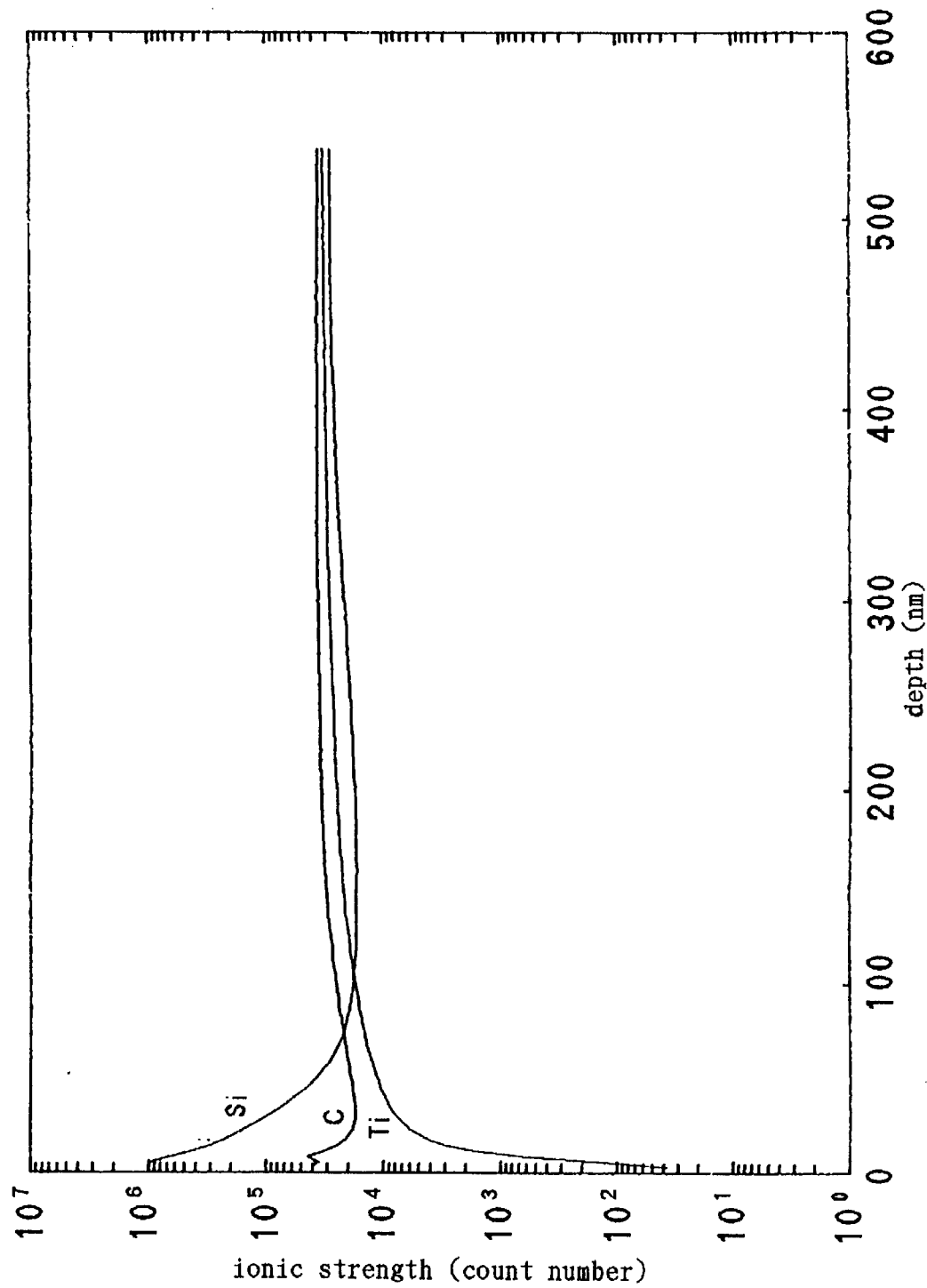
FIG. 7 shows test results from secondary ion mass spectrometry.

FIG. 7 is a chart showing the distribution of elemental Si concentration in Example 8. The secondary ion intensity (count) is plotted on the ordinate and the depth (nm) is plotted on the abscissa.

Figure 8:
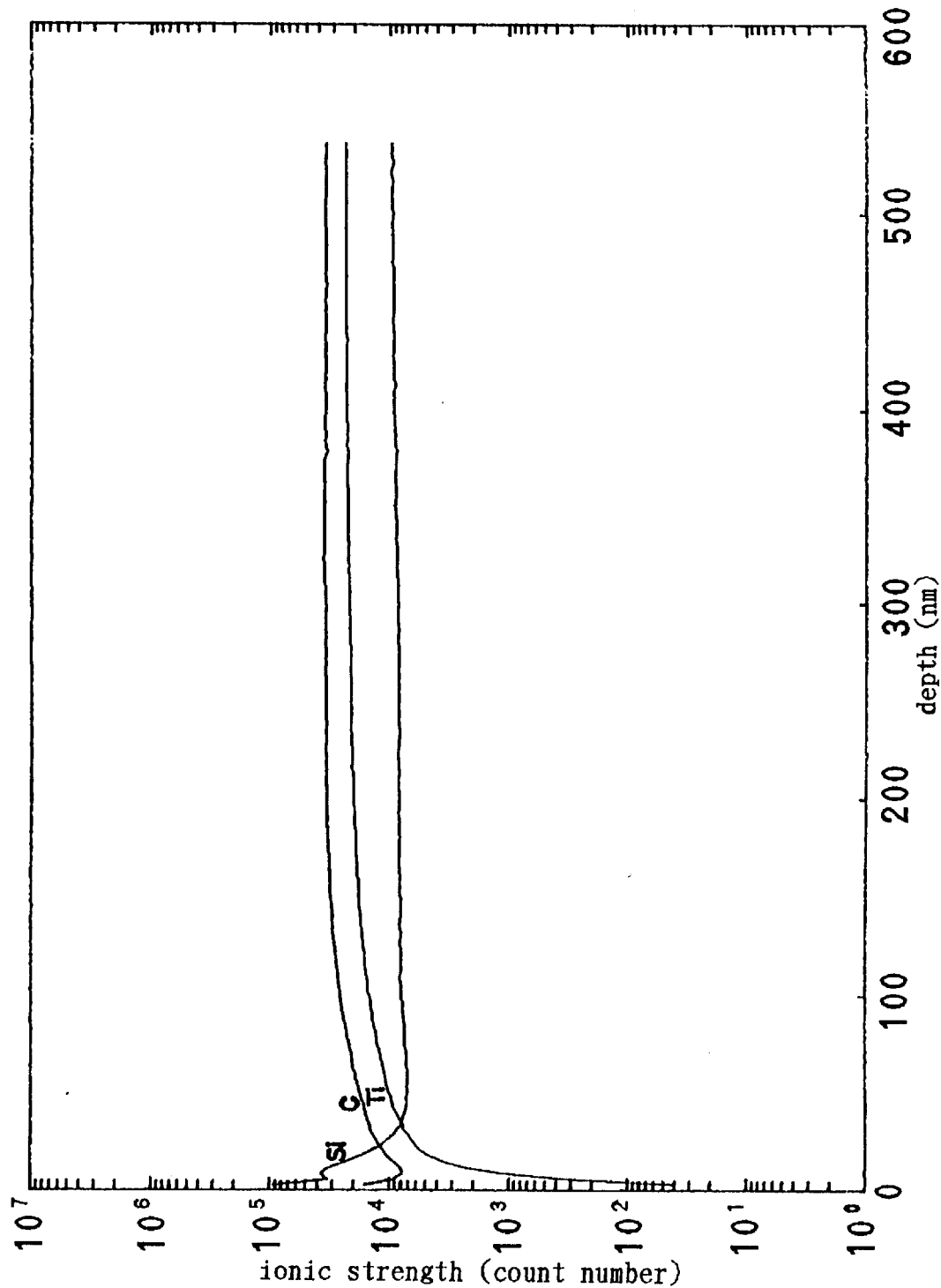
FIG. 8 shows test results from secondary ion mass spectrometry.

FIG. 8 is a chart showing the distribution of elemental Si concentration in Example 9. The secondary ion intensity (count) is plotted on the ordinate and the depth (nm) is plotted on the abscissa.

Figure 9:
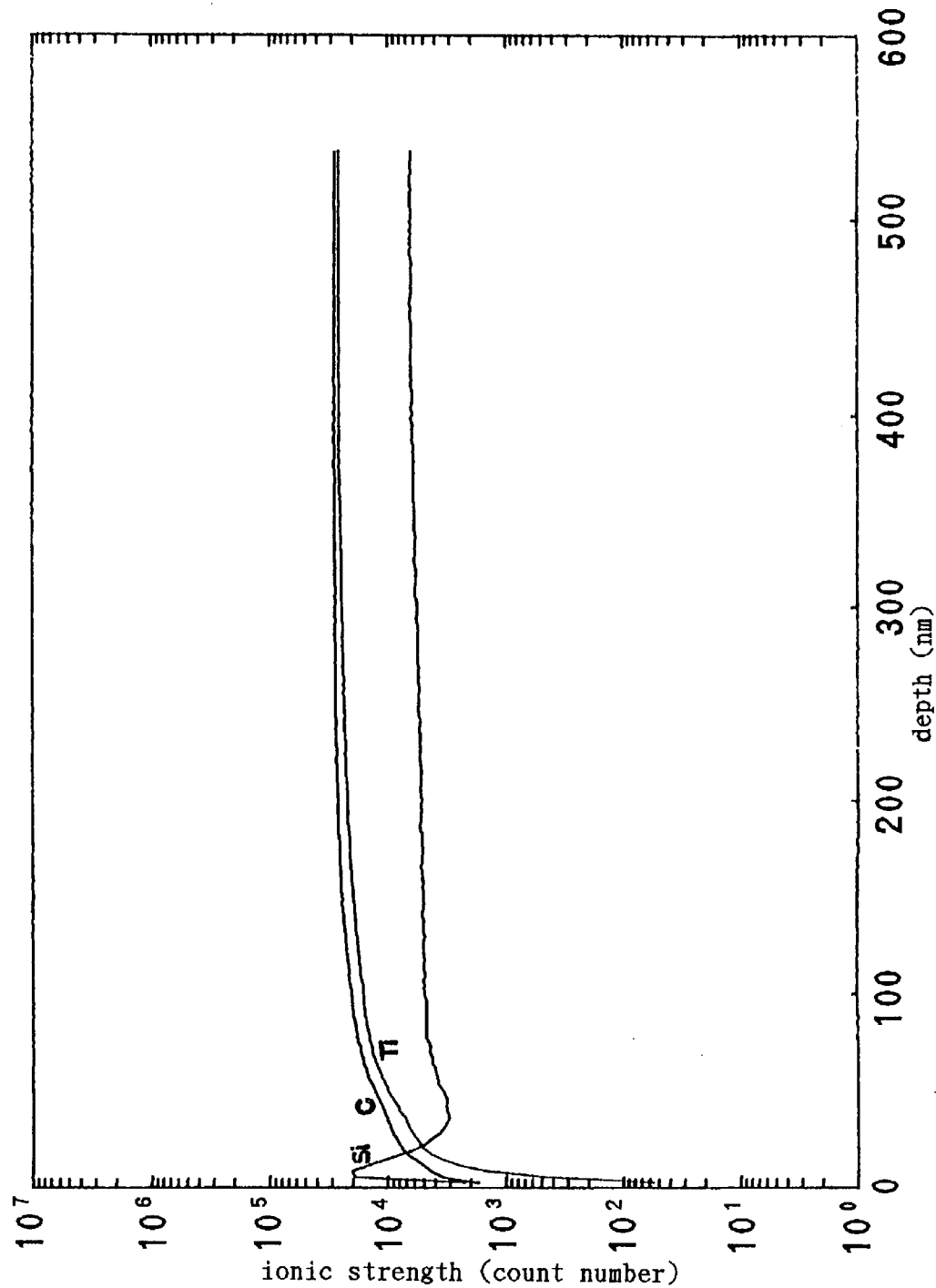
FIG. 9 shows test results from secondary ion mass spectrometry.

FIG. 9 is a chart showing the distribution of elemental Si concentration in Example 10. The secondary ion intensity (count) is plotted on the ordinate and the depth (nm) is plotted on the abscissa.

FIG. 10 is a chart showing the distribution of elemental Si concentration in Example 16-1. The secondary ion intensity (count) is plotted on the ordinate and the depth (nm) is plotted on the abscissa.

FIG. 11 is a chart showing the distribution of elemental Si concentration in Example 16-2. The secondary ion intensity (count) is plotted on the ordinate and the depth (nm) is plotted on the abscissa.

[Legends]
1. Load cell
2. Testpiece
3. Test fluid
4. Vessel
5. Platform

We claim:

1. An raindrop fouling-resistant paint film comprising
   (I) a tetramethoxysilane partial hydrolyzed condensate having a silanol (SiOH)-methoxysilyl (SiOMe) group molar ratio of not more than (SiOH)/(SiOMe)=$1/10$, a dimer through octamer content of 0–30 weight %, and a weight average molecular weight of 1500–5000 as available upon hydrolysis at a hydrolysis degree of less than 100% and condensation of tetramethoxysilane and
   (A) at least one film-forming resin selected from the group consisting of thermoplastic resin, thermosetting resin and room temperature setting resin and/or
   (B) at least one inorganic binder having alkoxysilyl as a reactive curing group as selected from the group consisting of an alkoxysilane compound, a partial hydrolyzed condensate of said alkoxysilane compound, and a siloxane polymer, having a water dynamic reverse tension (Tr) of not less than 55 dyn/cm.

2. The raindrop fouling-resistant paint film according to claim 1 which has a water dynamic reverse tension (Tr) of not less than 60 dyn/cm.

3. The raindrop fouling-resistant paint film according to claim 1 which contains said tetramethoxysilane partial hydrolyzed condensate (I) in a proportion of 0.1–100 parts by weight relative to 100 parts by weight of the total coating composition inclusive of said film-forming resin (A) and/or inorganic binder (B) on a nonvolatile matter basis.

4. The raindrop fouling-resistant paint film according to claim 1 comprising said tetramethoxysilane partial hydrolyzed condensate (I) and said film-forming resin (A), further comprising an organosilica sol having a particle diameter of 10–100 nm and a hydrophobicity of not less than 15.0 ml in terms of hexane tolerance value.

5. The raindrop fouling-resistant paint film according to claim 4 wherein said tetramethoxysilane partial hydrolyzed condensate (I) occurs in a proportion of 0.1–100 parts by weight, on a nonvolatile matter basis, relative to 100 parts by weight of the total coating composition inclusive of said film-forming resin (A) on a nonvolatile matter basis and said organosilica sol (C) occurs in a proportion of 0.1–100 parts by weight, on a nonvolatile basis, relative to 100 parts by weight of the total coating inclusive of said film-forming resin (A), on a nonvolatile matter basis.

6. The raindrop fouling-resistant paint film according to claim 1 wherein, as analyzed by secondary ion mass spectrometry, the total amount of elemental Si present in a stratum of the paint film from 0 nm to 400 nm from its surface is not less than twice the total amount of elemental Si present in the corresponding stratum from 0 nm to 400 nm from the surface of a paint film formed from the remainder of the composition of the raindrop fouling-resistant paint film of claim 1 after exclusion of said tetramethoxysilane partial hydrolyzed condensate (I).

7. The raindrop fouling-resistant paint film according to claim 6 wherein, as analyzed by secondary ion mass spectrometry, the secondary ion intensity of elemental Si in any stratum between 0 and 30 nm from the surface of the paint film is not less than twice the secondary ion intensity of elemental Si at the level of 400 nm from the surface of said paint film.

8. A coating composition comprising (I) a tetramethoxysilane partial hydrolyzed condensate having a silanol (SiOH)-methoxysilyl (SiOMe) group molar ratio of not larger than (SiOH)/(SiOMe)=$1/10$, a dimer through octamer content of 0–30 weight %, and a weight average molecular weight of 1500–5000 as available upon hydrolysis at a hydrolysis degree of less than 100% and condensation of tetramethoxysilane and
   (A) at least one film-forming resin selected from the group consisting of thermoplastic resin, thermosetting resin and room temperature setting resin and/or
   (B) at least one inorganic binder having alkoxysilyl as a reactive curing group as selected from the group consisting of an alkoxysilane compound, a partial hydrolyzed condensate of said alkoxysilane compound, and a siloxane polymer, the final paint film having a water dynamic reverse tension (Tr) of not less than 55 dyn/cm.

9. The coating composition according to claim 8 wherein the formulating amount of said partial hydrolyzed condensate (I) is 0.1–100 parts by weight relative to 100 parts by weight of the total coating composition inclusive of at least one member of said film-forming resin (A) and inorganic binder (B) having alkoxysilyl as a reactive curing group on a nonvolatile matter basis.

10. The coating composition according to claim 8 wherein, said thermoplastic resin is at least one member selected from the group consisting of polyvinylidene fluoride, polyvinylidene fluoride-acrylic acid copolymer, a blend of polyvinylidene fluoride and acrylic resin, and plastisol.

11. The coating composition according to claim 8 wherein said thermosetting resin comprises (a1) a polyol resin having a hydroxyl value of 5–300 mg KOH/g and a number average molecular weight of 500–20,000 and (a2) a curing agent capable of reacting with said polyol resin (a1).

12. The coating composition according to claim 11 wherein said polyol resin (a1) is at least one member selected from the group consisting of acrylic polyol resin, polyester polyol resin, fluorine-containing polyol resin, and silicone polyol resin.

13. The coating composition according to claim 11 wherein said curing agent (a2) is at least one member selected from the group consisting of an isocyanate compound, a blocked isocyanate compound, and an amino resin.

14. The coating composition according to claim 8 wherein said inorganic binder (B) having alkoxysilyl as a reactive curing group is at least one member selected from the group consisting of (B-1) an organoalkoxysilane compound of the following general formula (1)

$$R^1{}_a\text{---}Si(OR^2)_{4-a} \quad (1)$$

wherein $R^1$ represents alkyl having 1 to 10 carbon atoms, epoxyalkyl having 2 to 11 carbon atoms, aryl having 6 to 12 carbon atoms, alkenyl having 2 to 11 carbon atoms, aralkyl having 7 to 11 carbon atoms, acyl having 2 to 4 carbon atoms, aminoalkyl having 1 to 5 carbon atoms, mercaptoalkyl having 1 to 5 carbon atoms, or haloalkyl having 1 to 5 carbon atoms; $R^2$ represents alkyl having 1 to 10 carbon atoms or acyl having 2 to 4 carbon atoms; the symbol a represents 1, 2, or 3;

(B-2) a partial hydrolyzed condensate of said organoalkoxysilane compound (B-1);

(B-3) a tetrafunctional alkoxysilane compound of the following general formula (2)

$$Si(OR^3)_4 \quad (2)$$

wherein R3 represents alkyl having 2 to 10 carbon atoms or acyl having 2 to 4 carbon atoms;

(B-4) a partial hydrolyzed condensate of said tetrafunctional alkoxysilane compound (B-3); and (B-5) a siloxane polymer having at least one substituent group selected from the group consisting of a substituent group of the following general formula (3)

$$R^4{}_b\text{---}Si[(OR^5)_{3-b}]\text{---}O\text{---} \quad (3)$$

wherein $R^4$ represents alkyl having 1 to 10 carbon atoms, epoxyalkyl having 2 to 11 carbon atoms, aryl having 6 to 12 carbon atoms, alkenyl having 2 to 11 carbon atoms, aralkyl having 7 to 11 carbon atoms, acyl having 2 to 4 carbon atoms, aminoalkyl having 1 to 5 carbon atoms, mercaptoalkyl having 1 to 5 carbon atoms, or haloalkyl having 1 to 5 carbon atoms, $R^5$ represents alkyl having 1 to 10 carbon atoms or acyl having 2 to 4 carbon atoms; the symbols b represents 0, 1, 2, or 3 and a substituent group of the following general formula (4)

$$R^6O\text{---} \quad (4)$$

wherein $R^6$ represents alkyl having 1 to 10 carbon atoms or acyl having 2 to 4 carbon atoms as bound to the Si atom of its backbone chain.

15. The coating composition according to claim 8 wherein said inorganic binder (B) having alkoxysilyl as a reactive curing group further contains at least one member selected from the group consisting of (D-1) an alkoxysilyl-containing vinyl resin having an alkoxysilyl group of the following general formula (5)

$$R^7{}_c\text{---}Si[(OR^8)_{3-c}]\text{---} \quad (5)$$

wherein $R^7$ represents alkyl having 1 to 5 carbon atoms, aryl having 6 to 12 carbon atoms, aralkyl having 7 toll carbon atoms, or acyl having 2 to 4 carbon atoms, $R^8$ represents alkyl having 1 to 10 carbon atoms or acyl having 2 to 4 carbon atoms; the symbol c represents 0, 1, 2, or 3 either at the terminus or as a side chain of a vinyl polymer and having an alkoxysilyl equivalent of not less than 300;

(D-2) at least one metal alkoxide selected from the group consisting of titanium tetraalkoxide and zirconium tetraalkoxide;

(D-3) a hydrolyzed condensate of said metal alkoxide (D-2);

(D-4) silica sol, and (D-5) alumina sol.

16. The coating composition according to claim 8 comprising (I) said tetramethoxysilane partial hydrolyzed condensate and (A) said film-forming resin, which further contains (C) an organosilica sol having a particle diameter of 10–100 nm and a hydrophobicity of not less than 15.0 ml in terms of hexane tolerance value.

17. The coating composition according to claim 16 wherein the formulating amount of said tetramethoxysilane partial hydrolyzed condensate (I) is 0.1–100 parts by weight, on a nonvolatile matter basis, relative to 100 parts by weight of the total coating composition inclusive of said film-forming resin (A) on a nonvolatile matter basis and the formulating amount of said organosilica sol (C) is 0.1–100 parts by weight, on a nonvolatile matter basis, relative to the total coating composition inclusive of said film-forming resin (A) on a nonvolatile matter basis.

18. The coating composition according to claim 16 wherein said film-forming resin (A) is a thermosetting resin comprising (a1) a polyol resin having a hydroxyl value of 5–300 mg KOH/g and a number average molecular weight of 500–20,000 and (a2) a curing agent capable of reacting with said polyol resin (a1), said polyol resin (a1) having a solubility parameter (SP) value of 9.5–12.

19. The coating composition according to claim 18 wherein the hydroxyl value of said polyol resin (a1) is 10–200 mg KOH/g.

20. The coating composition according to claim 18 wherein said curing agent (a2) comprises (a2-1) a curing component having a solubility parameter (SP) value of not more than $(SP_{a1}\text{-}0.5)$ where $SP_{a1}$ represents the solubility parameter (SP) value of polyol resin (a1) and (a2-2) a curing component having a solubility parameter (SP) value of more than $(SP_{a1}\text{-}0.5)$ wherein $SP_{a1}$ is as defined above.

21. The coating composition according to claim 20 wherein said curing component (a2-1) is an alkyl-etherified melamine resin containing at least one member selected from the group consisting of n-butyl, i-butyl, and methyl as an ether-forming residue.

22. The coating composition according to claim 20 wherein said curing component (a2-2) is at least one member selected from the group consisting of a blocked polyisocyanate compound as blocked with at least one member selected from the group consisting of a lactam series blocking agent, an oxime series blocking agent and a diketone series blocking agent and an alkyl-etherified melamine resin.

23. The coating composition according to claim 20 wherein said curing component (a2-2) has a lower reaction start temperature than the reaction start temperature of said curing component (a2-1).

24. The coating composition according to claim 18 further comprising (E) a catalyst for promoting the reaction of polyol resin (a1) with curing agent (a2).

25. The coating composition according to claim 16 wherein said organosilica sol (C) is at least one member selected from the group consisting of an organosilica sol prepared by using methyl isobutyl ketone as a dispersion medium and an organosilica sol prepared by using xylene/butanol as a dispersion medium.

26. The coating composition according to claim 16 wherein said organosilica sol (C) contains an organosilica sol modified with a silane coupling agent of the following general formula (6)

$$R^9—Si—(R^{10})_d(OR^{10})_{3-d} \qquad (6)$$

wherein $R^9$ represents alkyl having 1 to 6 carbon atoms, epoxyalkyl having 2 to 11 carbon atoms, aryl having 6 to 12 carbon atoms, alkenyl having 2 to 11 carbon atoms, aminoalkyl having 1 to 5 carbon atoms, mercaptoalkyl having 1 to 5 carbon atoms, or haloalkyl having 1 to 5 carbon atoms, which may be unsubstituted or substituted by an organic group; $R^{10}$ represents alkyl having 1 to 6 carbon atoms; and the symbol d represents 0, 1, or 2.

27. The coating composition according to claim 26 wherein said silane coupling agent is a compound of general formula (6) wherein $R^{10}$ represents methyl and d is 0.

28. The coating composition according to claim 26 wherein said silane coupling agent is a compound of general formula (6) wherein $R^9$ represents at least one member selected from the group consisting of γ-methacryloxypropyl, γ-glycidoxypropyl, methyl, ethyl, vinyl, phenyl, n-propyl, i-propyl, i-butyl, n-decyl, n-hexadecyl, trimethoxysilylhexyl, γ-dibutylaminopropyl, and nonafluorobutylethyl.

29. The coating composition according to claim 20 wherein the formulating amounts of said curing component (a2-1) and curing component (a2-2) are 0.5–10 parts by weight and 10–50 parts by weight, respectively, relative to 100 parts by weight of said polyol resin (a1), the formulating amount of catalyst (E) is 0–2 parts by weight relative to 100 parts by weight of the total amount of said polyol resin (a1), curing component (a2-1), and curing component (a2-2), the formulating amount of organosilica sol (C) is 0.5–10 parts by weight relative to 100 parts by weight of the total amount of said polyol resin (a1), curing component (a2-1), and curing component (a2-2), and the formulating amount of said tetramethoxysilane partial hydrolyzed condensate (I) is 0.5–10 parts by weight relative to 100 parts by weight of said polyol resin (a1), curing component (a2-1), and curing component (a2-2) combined.

30. The coating composition according to claim 24 wherein said polyol resin (a1) is a lactone-modified acrylic polyol resin or polyester polyol resin having a hydroxyl value of 10–100 mg KOH/g and a solubility parameter (SP) value of 9.5–12, the curing component (a2-1) of said curing agent (a2) is an alkyl-etherified melamine resin, the curing component (a2-2) thereof is a blocked diisocyanate compound as blocked with at least one member selected from the group consisting of a lactam series blocking agent, an oxime series blocking agent, and a diketone series blocking agent, said organosilica sol (C) is an organosilica sol prepared by using methyl isobutyl ketone as a dispersion medium or an organosilica sol modified with a silane coupling agent, said tetramethoxysilane partial hydrolyzed condensate (I) is a partial hydrolyzed condensate which is obtainable by hydrolysis at a hydrolysis degree of less than 100% and condensation of tetramethoxysilane and has a silanol (SiOH)-to-methoxysilyl (SiOMe) group molar ratio of (SiOH)/(SiOMe)=not greater than 1/10, a dimer through octamer content of 0–30 weight %, and a weight average molecular weight of 1500–5000, said catalyst (E) is at least one member selected from the group consisting of an aromatic sulfonic acid, an aromatic sulfonic acid amine salt, and a tin compound, the formulating amounts of said curing component (a2-1) and curing component (a2-2) are 0.5–10 parts by weight and 10–50 parts by weight, respectively, relative to 100 parts by weight of said polyol resin (a1), the formulating amount of said organosilica sol (C) is 1–100 parts by weight relative to 100 parts by weight of said polyol resin (a1), curing component (a2-1), and curing component (a2-2) combined, the formulating amount of said tetramethoxysilane partial hydrolyzed condensate (I) is 0.5–50 parts by weight relative to 100 parts by weight of said polyol resin (a1), curing component (a2-1), and curing component (a2-2) combined, and the formulating amount of said catalyst (E) is 0.1–2 parts by weight relative to 100 parts by weight of said polyol (a1), curing component (a2-1), and curing component (a2-2) combined.

31. The coating composition according to claim 8 which comprises (A) said film-forming resin and (I) said tetramethoxysilane partial hydrolyzed condensate, and further (G) at least one aggregate selected from the group consisting of (g1) an inorganic aggregate having a size of 0.1–40 μm and (g2) a particulate organic polymer having a particle diameter of 0.01–30 μm.

32. The coating composition according to claim 31 wherein the amount of aggregate (G) contained is 0.5–30 parts by weight relative to 100 parts by weight of the coating composition on a nonvolatile matter basis.

33. The coating composition according to claim 31 wherein said film-forming resin (A) is a thermoplastic resin which is at least one member selected from the group consisting of polyvinylidene fluoride, polyvinylidene fluoride-acrylic acid copolymer, and a blend of polyvinylidene fluoride and an acrylic resin, and a plastisol.

34. The coating composition according to claim 31 wherein said film-forming resin (A) is a thermosetting resin comprising said polyol resin (a1) having a hydroxyl value of 5–300 mg KOH/g and a number average molecular weight of 500–20000 and said curing agent (a2) capable of reacting with said polyol resin (a1).

35. The coating composition according to claim 34 wherein said polyol resin (a1) is at least one member selected from the group consisting of acrylic polyol resin, polyester polyol resin, fluorine-containing polyol resin, and silicone polyol resin.

36. The coating composition according to claim 34 wherein said curing agent (a2) is at least one member selected from the group consisting of a blocked isocyanate compound and an amino resin.

37. The coating composition according to claim 31 wherein said film-forming resin (A) is a room temperature setting resin comprising a polyol resin (a3) having a hydroxyl value of 5–300 mg KOH/g and a number average molecular weight of 500–20000 and an isocyanate curing agent (a4) capable of reacting with said polyol resin (a3).

38. The coating composition according to claim 37 wherein said polyol resin (a3) is at least one member selected from the group consisting of acrylic polyol resin, polyester polyol resin, fluorine-containing polyol resin, and silicone polyol resin.

39. The coating composition according to claim 31 wherein said inorganic aggregate (g1) is at least one member selected from the group consisting of silicates, sulfates, silica, metal oxides, diatomaceous earth, glass, and natural or synthetic mica and having a Mohs hardness of 5–8.

40. The coating composition according to claim 39 wherein said inorganic aggregate (g1) is a glass fiber having a Mohs hardness of 5–8, a filament diameter of 1–30 $\mu$m, and a filament length of 1–200 $\mu$m.

41. The coating composition according to claim 31 wherein said inorganic aggregate (g1) has been silanated with said partial tetramethoxysilane hydrolyzed condensate (I).

42. The coating composition according to claim 31 wherein said aggregate (g1) comprises
   silica and
   at least one fibrous or particulate inorganic aggregate other than silica which has a Mohs hardness of 5–8 as selected from the group consisting of silicates, sulfates, metal oxides, diatomaceous earth, glass, and natural or synthetic mica,
   the formulating ratio of said silica to said fibrous or particulate inorganic aggregate other than silica being (silica)/(inorganic aggregate other than silica)=2/98–30/70.

43. The coating composition according to claim 31 wherein said particulate organic polymer (g2) comprises at least one member selected from the group consisting of fluororesin, polyolefin resin, silicone resin, cellulose resin, polyurethane resin, polyamide resin, polyester resin, phenolic resin, acrylic resin, amino resin, and the corresponding modified resins.

44. The coating composition according to claim 31 wherein the formulating amount of said tetramethoxysilane partial hydrolyzed condensate (I) is 0.1–30 parts by weight relative to 100 parts by weight of the total coating composition on a nonvolatile matter basis.

* * * * *